United States Patent
Bleecher et al.

(10) Patent No.: US 9,914,849 B2
(45) Date of Patent: Mar. 13, 2018

(54) PLUNGER AND METHODS OF PRODUCING HYDROPHOBIC SURFACES

(75) Inventors: Douglas Bleecher, Lititz, PA (US);
Philip Harsh, Lancaster, PA (US);
Michael Hurley, Lancaster, PA (US);
Andrew K. Jones, Lancaster, PA (US);
Boon Chan Lor, Denver, PA (US);
Vinod K. Sikka, Oak Ridge, TN (US)

(73) Assignee: Ross Technology Corporation, Leola, PA (US)

(*) Notice: Subject to any disclaimer, the term of this patent is extended or adjusted under 35 U.S.C. 154(b) by 376 days.

(21) Appl. No.: 13/618,779

(22) Filed: Sep. 14, 2012

(65) Prior Publication Data

US 2013/0139309 A1    Jun. 6, 2013

Related U.S. Application Data

(63) Continuation of application No. PCT/US2011/028541, filed on Mar. 15, 2011.

(60) Provisional application No. 61/314,137, filed on Mar. 15, 2010.

(51) Int. Cl.
*C09D 175/04* (2006.01)
*E03C 1/308* (2006.01)
*C09D 5/00* (2006.01)

(52) U.S. Cl.
CPC ............ *C09D 175/04* (2013.01); *C09D 5/00* (2013.01); *E03C 1/308* (2013.01)

(58) Field of Classification Search
None
See application file for complete search history.

(56) References Cited

U.S. PATENT DOCUMENTS

| 870,439 | A | | 11/1907 | Kade |
| 2,191,701 | A | | 2/1940 | Wood |
| 2,976,386 | A | | 3/1961 | Salton |
| 3,185,426 | A | | 5/1965 | Bjerke |
| 3,207,698 | A | * | 9/1965 | Liebling ............ B01D 19/0409 516/117 |
| 3,212,106 | A | | 10/1965 | Noel |
| 3,244,541 | A | | 4/1966 | Fain et al. |
| 3,354,022 | A | | 11/1967 | Dettre et al. |
| 3,579,540 | A | | 5/1971 | Ohlhausen |
| 3,716,502 | A | | 2/1973 | Loew |
| 3,861,425 | A | * | 1/1975 | Clark ..................... F16L 57/04 138/145 |

(Continued)

FOREIGN PATENT DOCUMENTS

| CA | 1 002 256 B | 12/1976 |
| CA | 2175848 A1 | 12/1996 |

(Continued)

OTHER PUBLICATIONS

U.S. Appl. No. 60/699,200, filed Jul. 14, 2005, Guire et al. (Innovative Surface Technologies, Inc.).

(Continued)

*Primary Examiner* — Robert S Loewe
(74) *Attorney, Agent, or Firm* — Perkins Coie LLP

(57) ABSTRACT

Highly durable hydrophobic and/or oleophobic coatings and methods and compositions for their production are described herein. Also described herein is a plunger having a hydrophobic surface prepared using the coating compositions described herein.

28 Claims, 6 Drawing Sheets

(56) References Cited

U.S. PATENT DOCUMENTS

| | | |
|---|---|---|
| 3,931,428 A | 1/1976 | Reick |
| 3,950,588 A | 4/1976 | McDougal |
| 3,963,349 A | 6/1976 | Albright et al. |
| 3,967,030 A | 6/1976 | Johnson et al. |
| 3,975,197 A | 8/1976 | Mikelsons |
| 3,976,572 A | 8/1976 | Reick |
| 3,980,153 A | 9/1976 | Andrews |
| 4,142,724 A | 3/1979 | Reick |
| 4,151,327 A | 4/1979 | Lawton |
| 4,199,142 A | 4/1980 | Reick |
| 4,301,197 A | 11/1981 | Franz et al. |
| 4,301,213 A | 11/1981 | Davies |
| 4,308,353 A | 12/1981 | Saito et al. |
| 4,311,755 A | 1/1982 | Rummel |
| 4,377,665 A | 3/1983 | Shiraki et al. |
| 4,397,988 A | 8/1983 | Sherman |
| 4,415,405 A | 11/1983 | Ruddle et al. |
| 4,451,619 A | 5/1984 | Heilmann et al. |
| 4,453,533 A | 6/1984 | Scheidler et al. |
| 4,474,852 A | 10/1984 | Craig |
| 4,492,217 A | 1/1985 | Scheidler |
| 4,536,454 A | 8/1985 | Haasl |
| 4,581,149 A | 4/1986 | Horodysky et al. |
| 4,591,530 A | 5/1986 | Lui |
| 4,614,464 A | 9/1986 | Christensen |
| 4,622,702 A | 11/1986 | Allen |
| 4,624,900 A | 11/1986 | Fau |
| 4,646,948 A | 3/1987 | Jennings |
| 4,680,173 A | 7/1987 | Burger |
| 4,687,707 A | 8/1987 | Matsuo et al. |
| 4,716,183 A | 12/1987 | Gamarra et al. |
| 4,733,843 A | 3/1988 | Bessinger |
| 4,738,426 A | 4/1988 | Bessinger |
| 4,745,139 A | 5/1988 | Haasl et al. |
| 4,749,110 A | 6/1988 | Maeno et al. |
| 4,753,977 A | 6/1988 | Merrill |
| 4,768,237 A | 9/1988 | Torti |
| 4,782,112 A | 11/1988 | Kondo et al. |
| 4,835,014 A | 5/1989 | Roth et al. |
| 4,837,260 A * | 6/1989 | Sato et al. .................. 524/261 |
| 4,855,176 A | 8/1989 | Ohwaki et al. |
| 4,870,907 A | 10/1989 | McKee |
| 4,923,260 A | 5/1990 | Poulsen |
| 4,971,912 A | 11/1990 | Buhl et al. |
| 4,983,459 A | 1/1991 | Franz et al. |
| 5,011,727 A | 4/1991 | Kido et al. |
| 5,011,963 A | 4/1991 | Ogawa et al. |
| 5,032,641 A | 7/1991 | Nanishi et al. |
| 5,041,304 A | 8/1991 | Kusano et al. |
| 5,057,050 A | 10/1991 | Hill |
| 5,084,191 A | 1/1992 | Nagase et al. |
| 5,104,938 A | 4/1992 | Toyama et al. |
| 5,112,911 A | 5/1992 | Mori et al. |
| 5,121,134 A | 6/1992 | Albinson et al. |
| 5,156,611 A | 10/1992 | Haynes et al. |
| 5,192,603 A | 3/1993 | Slater et al. |
| 5,202,361 A | 4/1993 | Zimmerman et al. |
| 5,212,215 A | 5/1993 | Nanri et al. |
| 5,225,274 A | 7/1993 | Ogawa et al. |
| 5,228,764 A | 7/1993 | Cherry et al. |
| 5,228,905 A | 7/1993 | Grunewalder et al. |
| 5,238,746 A | 8/1993 | Soga et al. |
| 5,240,774 A | 8/1993 | Ogawa et al. |
| 5,274,159 A | 12/1993 | Pellerite et al. |
| 5,284,707 A | 2/1994 | Ogawa et al. |
| 5,294,252 A | 3/1994 | Gun |
| 5,300,239 A | 4/1994 | Ozaki et al. |
| 5,308,705 A | 5/1994 | Franz et al. |
| 5,312,573 A | 5/1994 | Rosenbaum et al. |
| 5,314,940 A | 5/1994 | Stone |
| 5,316,799 A | 5/1994 | Brunken et al. |
| 5,317,129 A | 5/1994 | Taplan et al. |
| 5,324,566 A | 6/1994 | Ogawa et al. |
| 5,328,768 A | 7/1994 | Goodwin |
| 5,338,345 A | 8/1994 | Scarborough et al. |
| 5,348,547 A | 9/1994 | Payne et al. |
| 5,352,733 A | 10/1994 | Hart |
| 5,362,145 A | 11/1994 | Bird et al. |
| 5,364,299 A | 11/1994 | Hill et al. |
| 5,366,810 A | 11/1994 | Merrifield et al. |
| 5,368,892 A | 11/1994 | Berquier |
| 5,372,888 A | 12/1994 | Ogawa et al. |
| 5,380,585 A | 1/1995 | Ogawa et al. |
| 5,385,966 A | 1/1995 | Hermansen et al. |
| 5,395,657 A | 3/1995 | Strepparola et al. |
| 5,397,817 A * | 3/1995 | Smith ..................... C08K 3/22 523/213 |
| 5,424,130 A | 6/1995 | Nakanishi et al. |
| 5,429,433 A | 7/1995 | Bird et al. |
| 5,435,839 A | 7/1995 | Ogawa |
| 5,437,894 A | 8/1995 | Ogawa et al. |
| 5,437,900 A | 8/1995 | Kuzowski |
| 5,441,338 A | 8/1995 | Kane et al. |
| 5,441,809 A | 8/1995 | Akhter |
| 5,458,976 A | 10/1995 | Horino et al. |
| 5,466,770 A | 11/1995 | Audenaert et al. |
| 5,489,328 A | 2/1996 | Ono et al. |
| 5,500,216 A | 3/1996 | Julian et al. |
| 5,527,536 A | 6/1996 | Merkle et al. |
| 5,534,580 A | 7/1996 | Mitsui et al. |
| 5,539,054 A | 7/1996 | LaFleur |
| 5,540,493 A | 7/1996 | Kane et al. |
| 5,556,667 A | 9/1996 | Teranishi et al. |
| 5,558,940 A | 9/1996 | Michels et al. |
| 5,564,809 A | 10/1996 | Kane et al. |
| 5,576,096 A | 11/1996 | Ono et al. |
| 5,578,361 A | 11/1996 | Tsujioka et al. |
| 5,584,957 A | 12/1996 | Schultheis et al. |
| 5,585,896 A | 12/1996 | Yamazaki et al. |
| 5,599,893 A | 2/1997 | Asai et al. |
| 5,612,433 A | 3/1997 | Ono et al. |
| 5,618,627 A | 4/1997 | Merrifield et al. |
| 5,618,883 A | 4/1997 | Plamthottam et al. |
| 5,651,921 A | 7/1997 | Kaijou |
| 5,658,969 A | 8/1997 | Gerace |
| 5,674,967 A | 10/1997 | Goodwin |
| 5,679,460 A | 10/1997 | Schakenraad et al. |
| 5,688,864 A | 11/1997 | Goodwin |
| 5,697,991 A | 12/1997 | Frazer |
| 5,707,740 A | 1/1998 | Goodwin |
| 5,719,226 A | 2/1998 | Kegley |
| 5,725,789 A | 3/1998 | Huber et al. |
| 5,735,589 A | 4/1998 | Herrmann et al. |
| 5,747,561 A | 5/1998 | Smirnov et al. |
| 5,753,734 A | 5/1998 | Maruyama |
| 5,777,043 A | 7/1998 | Shafer et al. |
| 5,798,144 A | 8/1998 | Varanasi et al. |
| 5,800,918 A | 9/1998 | Chartier et al. |
| 5,813,741 A | 9/1998 | Fish et al. |
| 5,814,411 A | 9/1998 | Merrifield et al. |
| 5,824,421 A | 10/1998 | Kobayashi et al. |
| 5,830,529 A | 11/1998 | Ross |
| 5,840,201 A | 11/1998 | Elledge |
| 5,843,338 A | 12/1998 | Inoue et al. |
| 5,853,690 A | 12/1998 | Hibino et al. |
| 5,853,800 A | 12/1998 | Dombrowski et al. |
| 5,856,378 A | 1/1999 | Ring et al. |
| 5,858,551 A | 1/1999 | Salsman |
| 5,876,806 A | 3/1999 | Ogawa |
| 5,890,907 A | 4/1999 | Minasian |
| 5,910,557 A | 6/1999 | Audenaert et al. |
| 5,921,411 A | 7/1999 | Merl |
| 5,924,359 A | 7/1999 | Watanabe |
| 5,945,482 A | 8/1999 | Fukuchi et al. |
| 5,947,574 A | 9/1999 | Avendano |
| 5,948,685 A | 9/1999 | Angros |
| 5,952,053 A | 9/1999 | Colby |
| 5,958,601 A | 9/1999 | Salsman |
| 5,980,990 A | 11/1999 | Goodwin |
| 6,013,724 A | 1/2000 | Mizutani et al. |
| 6,017,609 A | 1/2000 | Akamatsu et al. |
| 6,017,831 A | 1/2000 | Beardsley et al. |
| 6,017,997 A | 1/2000 | Snow et al. |
| 6,020,419 A * | 2/2000 | Bock et al. .................. 524/590 |

(56) References Cited

U.S. PATENT DOCUMENTS

| | | | |
|---|---|---|---|
| 6,024,948 | A | 2/2000 | Samain et al. |
| 6,025,025 | A | 2/2000 | Bartrug et al. |
| 6,033,738 | A | 3/2000 | Teranishi et al. |
| 6,040,382 | A | 3/2000 | Hanes |
| 6,045,650 | A | 4/2000 | Mitchnick et al. |
| 6,068,911 | A | 5/2000 | Shouji et al. |
| 6,090,447 | A | 7/2000 | Suzuki et al. |
| 6,093,559 | A | 7/2000 | Bookbinder et al. |
| 6,096,380 | A | 8/2000 | Takebe et al. |
| 6,105,233 | A | 8/2000 | Neal |
| 6,114,446 | A | 9/2000 | Narisawa et al. |
| 6,117,555 | A | 9/2000 | Fujimori et al. |
| 6,119,626 | A | 9/2000 | Miyazawa et al. |
| 6,120,720 | A | 9/2000 | Meier et al. |
| 6,136,210 | A | 10/2000 | Biegelsen et al. |
| 6,153,304 | A | 11/2000 | Smith et al. |
| 6,162,870 | A | 12/2000 | Yamada et al. |
| 6,187,143 | B1 | 2/2001 | Juppo et al. |
| 6,191,122 | B1 | 2/2001 | Lux et al. |
| 6,201,058 | B1 | 3/2001 | Mahr et al. |
| 6,207,236 | B1 | 3/2001 | Araki et al. |
| 6,214,278 | B1 | 4/2001 | Yamada et al. |
| 6,221,434 | B1 | 4/2001 | Visca et al. |
| 6,224,974 | B1 | 5/2001 | Wuu |
| 6,228,435 | B1 | 5/2001 | Yoshikawa et al. |
| 6,228,972 | B1 | 5/2001 | Hikita et al. |
| 6,235,383 | B1 | 5/2001 | Hong et al. |
| 6,235,833 | B1 | 5/2001 | Akamatsu et al. |
| 6,245,387 | B1 | 6/2001 | Hayden |
| 6,248,850 | B1 | 6/2001 | Arai |
| 6,264,751 | B1 | 7/2001 | Kamura et al. |
| 6,280,834 | B1 | 8/2001 | Veerasamy et al. |
| 6,288,149 | B1 | 9/2001 | Kroll |
| 6,291,054 | B1 * | 9/2001 | Thomas et al. ............... 428/141 |
| 6,333,074 | B1 | 12/2001 | Ogawa et al. |
| 6,333,558 | B1 | 12/2001 | Hasegawa |
| 6,337,133 | B1 | 1/2002 | Akamatsu et al. |
| 6,340,502 | B1 | 1/2002 | Azzopardi et al. |
| 6,342,268 | B1 | 1/2002 | Samain |
| 6,352,758 | B1 | 3/2002 | Huang et al. |
| 6,358,569 | B1 | 3/2002 | Badyal et al. |
| 6,361,868 | B1 | 3/2002 | Bier et al. |
| 6,376,592 | B1 | 4/2002 | Shimada et al. |
| 6,379,751 | B1 | 4/2002 | Schafer et al. |
| 6,383,642 | B1 | 5/2002 | Le Bellac et al. |
| 6,403,397 | B1 | 6/2002 | Katz |
| 6,410,673 | B1 | 6/2002 | Arai et al. |
| 6,419,985 | B1 | 7/2002 | Ishizuka |
| 6,423,372 | B1 | 7/2002 | Genzer et al. |
| 6,423,381 | B1 | 7/2002 | Colton et al. |
| 6,432,181 | B1 | 8/2002 | Ludwig |
| 6,451,432 | B1 | 9/2002 | Azzopardi et al. |
| 6,451,876 | B1 | 9/2002 | Koshy |
| 6,458,420 | B1 | 10/2002 | Akamatsu et al. |
| 6,458,467 | B1 | 10/2002 | Mizuno et al. |
| 6,461,537 | B1 | 10/2002 | Turcotte et al. |
| 6,461,670 | B2 | 10/2002 | Akamatsu et al. |
| 6,462,115 | B1 | 10/2002 | Takahashi et al. |
| 6,471,761 | B2 | 10/2002 | Fan et al. |
| 6,476,095 | B2 | 11/2002 | Simendinger, III |
| 6,479,612 | B1 | 11/2002 | Del Pesco et al. |
| 6,482,524 | B1 | 11/2002 | Yamamoto et al. |
| 6,488,347 | B1 | 12/2002 | Bienick |
| 6,495,624 | B1 * | 12/2002 | Brown .................... B01L 3/50 524/462 |
| 6,559,234 | B1 | 5/2003 | Arai et al. |
| 6,564,935 | B1 | 5/2003 | Yamamoto et al. |
| 6,566,453 | B1 | 5/2003 | Arai et al. |
| 6,579,620 | B2 | 6/2003 | Mizunno et al. |
| 6,582,825 | B2 | 6/2003 | Amarasekera et al. |
| 6,584,744 | B1 | 7/2003 | Schultheis et al. |
| 6,589,641 | B1 | 7/2003 | Stirniman et al. |
| 6,596,060 | B1 | 7/2003 | Michaud |
| 6,610,363 | B2 | 8/2003 | Arora et al. |
| 6,613,860 | B1 | 9/2003 | Dams et al. |
| 6,623,863 | B2 | 9/2003 | Kamitani et al. |
| 6,641,654 | B2 | 11/2003 | Akamatsu et al. |
| 6,649,222 | B1 | 11/2003 | D'Agostino et al. |
| 6,652,640 | B2 | 11/2003 | Asai et al. |
| 6,660,339 | B1 | 12/2003 | Datta et al. |
| 6,660,363 | B1 | 12/2003 | Barthlott |
| 6,660,686 | B2 | 12/2003 | Inagaki et al. |
| 6,683,126 | B2 | 1/2004 | Keller et al. |
| 6,685,992 | B1 | 2/2004 | Ogawa et al. |
| 6,689,200 | B2 | 2/2004 | Scarborough et al. |
| 6,692,565 | B2 | 2/2004 | Johansen, Jr. et al. |
| 6,706,798 | B2 | 3/2004 | Kobayashi et al. |
| 6,720,371 | B2 | 4/2004 | Furuta et al. |
| 6,729,704 | B2 | 5/2004 | Ames |
| 6,733,892 | B1 | 5/2004 | Yoneda et al. |
| 6,743,467 | B1 | 6/2004 | Jones et al. |
| 6,767,984 | B2 | 7/2004 | Toui et al. |
| 6,770,323 | B2 | 8/2004 | Genzer et al. |
| 6,780,497 | B1 | 8/2004 | Walter |
| 6,786,562 | B2 | 9/2004 | Obrock et al. |
| 6,793,821 | B2 | 9/2004 | Lee et al. |
| 6,800,354 | B2 * | 10/2004 | Baumann et al. ............ 428/141 |
| 6,806,299 | B2 | 10/2004 | Baumann et al. |
| 6,808,835 | B2 | 10/2004 | Green et al. |
| 6,811,716 | B1 | 11/2004 | Stengaard et al. |
| 6,811,844 | B2 | 11/2004 | Trouilhet |
| 6,811,884 | B2 | 11/2004 | Goodwin |
| 6,835,778 | B2 | 12/2004 | Swisher et al. |
| 6,845,788 | B2 | 1/2005 | Extrand |
| 6,852,389 | B2 | 2/2005 | Nun et al. |
| 6,852,390 | B2 | 2/2005 | Extrand |
| 6,855,375 | B2 | 2/2005 | Nakagawa et al. |
| 6,855,759 | B2 | 2/2005 | Kudo et al. |
| 6,858,284 | B2 * | 2/2005 | Nun et al. .................... 428/149 |
| 6,871,923 | B2 | 3/2005 | Dietz et al. |
| 6,872,441 | B2 | 3/2005 | Baumann et al. |
| 6,884,904 | B2 | 4/2005 | Smith et al. |
| 6,890,360 | B2 | 5/2005 | Cote et al. |
| 6,923,216 | B2 | 8/2005 | Extrand |
| 6,926,946 | B2 | 8/2005 | Ogawa et al. |
| 6,931,888 | B2 | 8/2005 | Shekunov et al. |
| 6,938,774 | B2 | 9/2005 | Extrand |
| 6,942,746 | B2 | 9/2005 | Niejelow et al. |
| 6,966,990 | B2 | 11/2005 | Chattopadhyay et al. |
| 6,976,585 | B2 | 12/2005 | Extrand |
| 6,976,998 | B2 | 12/2005 | Rizzo et al. |
| 6,982,242 | B2 | 1/2006 | Liss et al. |
| 6,992,858 | B2 | 1/2006 | Kaneko |
| 6,994,033 | B2 | 2/2006 | Kweon |
| 6,994,045 | B2 | 2/2006 | Paszkowski |
| 6,998,051 | B2 | 2/2006 | Chattopadhyay et al. |
| 7,004,184 | B2 | 2/2006 | Handique et al. |
| 7,005,372 | B2 | 2/2006 | Levy et al. |
| 7,019,069 | B2 | 3/2006 | Kobayashi et al. |
| 7,022,416 | B2 | 4/2006 | Teranishi |
| 7,026,018 | B2 | 4/2006 | Kranovich |
| 7,037,591 | B2 | 5/2006 | Henze et al. |
| 7,048,889 | B2 | 5/2006 | Arney et al. |
| 7,052,244 | B2 | 5/2006 | Fouillet et al. |
| 7,056,409 | B2 | 6/2006 | Dubrow |
| 7,057,832 | B2 | 6/2006 | Wu et al. |
| 7,057,881 | B2 | 6/2006 | Chow et al. |
| 7,074,273 | B2 | 7/2006 | Shimomura et al. |
| 7,074,294 | B2 | 7/2006 | Dubrow |
| 7,083,748 | B2 | 8/2006 | Chattopadhyay et al. |
| 7,083,828 | B2 | 8/2006 | Muller et al. |
| 7,109,256 | B2 | 9/2006 | Amano et al. |
| 7,112,369 | B2 | 9/2006 | Wang et al. |
| 7,124,450 | B2 | 10/2006 | Davidson |
| 7,141,276 | B2 | 11/2006 | Lehmann et al. |
| 7,148,181 | B2 | 12/2006 | Tanaka et al. |
| 7,150,904 | B2 | 12/2006 | D'Urso et al. |
| 7,153,357 | B2 | 12/2006 | Baumgart et al. |
| 7,157,018 | B2 | 1/2007 | Scheidler |
| 7,166,235 | B2 | 1/2007 | Majeti et al. |
| 7,175,723 | B2 | 2/2007 | Jones et al. |
| 7,179,758 | B2 | 2/2007 | Chakrapani et al. |
| 7,179,864 | B2 | 2/2007 | Wang |
| 7,188,917 | B2 | 3/2007 | Bienick |

(56) References Cited

U.S. PATENT DOCUMENTS

| | | | |
|---|---|---|---|
| 7,198,855 B2 | 4/2007 | Liebmann-Vinson et al. |
| 7,204,298 B2 | 4/2007 | Hodes et al. |
| 7,211,223 B2 | 5/2007 | Fouillet et al. |
| 7,211,313 B2 | 5/2007 | Nun et al. |
| 7,211,329 B2 | 5/2007 | Metz et al. |
| 7,211,605 B2 | 5/2007 | Coronado et al. |
| 7,213,309 B2 | 5/2007 | Wang et al. |
| 7,238,751 B2 | 7/2007 | Wang et al. |
| 7,253,130 B2 | 8/2007 | Chiang et al. |
| 7,258,731 B2 | 8/2007 | D'Urso et al. |
| 7,264,845 B2 | 9/2007 | Papadaki et al. |
| 7,265,468 B1 | 9/2007 | Mancl et al. |
| 7,268,179 B2 | 9/2007 | Brown |
| 7,273,658 B2 | 9/2007 | Banayoun et al. |
| 7,285,331 B1 | 10/2007 | Reihs et al. |
| 7,288,311 B2 | 10/2007 | Kawashima et al. |
| 7,288,592 B2 | 10/2007 | Stark et al. |
| 7,291,653 B2 | 11/2007 | Baumann et al. |
| 7,297,375 B2 * | 11/2007 | Wegner ............... C09D 175/00 427/372.2 |
| 7,306,895 B2 | 12/2007 | Kano et al. |
| 7,309,278 B2 | 12/2007 | Shibata |
| 7,312,057 B2 | 12/2007 | Bookbinder et al. |
| 7,323,033 B2 | 1/2008 | Kroupenkine et al. |
| 7,338,835 B2 | 3/2008 | Bao |
| 7,342,551 B2 | 3/2008 | King |
| 7,344,619 B2 | 3/2008 | Helmeke |
| 7,344,758 B2 | 3/2008 | Franchina et al. |
| 7,344,783 B2 | 3/2008 | Shea |
| 7,354,328 B2 | 4/2008 | Lee |
| 7,354,624 B2 | 4/2008 | Millero et al. |
| 7,354,650 B2 | 4/2008 | Nakajima et al. |
| 7,368,510 B2 | 5/2008 | Lee et al. |
| 7,393,515 B2 | 7/2008 | Hoshino et al. |
| 7,396,395 B1 | 7/2008 | Chen et al. |
| 7,419,615 B2 | 9/2008 | Strauss |
| 7,449,233 B2 | 11/2008 | Arora |
| 7,468,333 B2 | 12/2008 | Kimbrell, Jr. et al. |
| 7,497,533 B2 | 3/2009 | Remmers |
| 7,524,531 B2 | 4/2009 | Axtell, III et al. |
| 7,527,832 B2 | 5/2009 | Sakoske et al. |
| 7,531,598 B2 * | 5/2009 | Muller et al. .................. 524/588 |
| 7,544,411 B2 | 6/2009 | Baumann et al. |
| 7,563,505 B2 | 7/2009 | Reihs |
| 7,568,583 B2 | 8/2009 | Wing et al. |
| 7,607,744 B2 | 10/2009 | Casoli et al. |
| 7,726,615 B2 | 6/2010 | Rutz |
| 7,731,316 B2 | 6/2010 | Wing |
| 7,748,806 B2 | 7/2010 | Egan |
| 7,767,758 B2 | 8/2010 | Moorlag et al. |
| 7,901,731 B2 | 3/2011 | Russell et al. |
| 7,919,180 B2 | 4/2011 | Furukawa |
| 7,935,209 B2 | 5/2011 | Ward |
| 7,950,756 B2 | 5/2011 | Collins et al. |
| 7,989,619 B2 | 8/2011 | Guire et al. |
| 8,231,191 B2 | 7/2012 | Leconte et al. |
| 8,258,206 B2 | 9/2012 | Kanagasabapathy et al. |
| 8,286,561 B2 | 10/2012 | Driver et al. |
| 8,513,342 B2 | 8/2013 | Gao et al. |
| 8,580,884 B2 | 11/2013 | Ding |
| 8,596,205 B2 | 12/2013 | Driver et al. |
| 8,715,906 B2 | 5/2014 | Blanchet et al. |
| 8,779,025 B1 | 7/2014 | Stone |
| 8,899,704 B2 | 12/2014 | Bienick |
| 9,067,821 B2 * | 6/2015 | Bleecher et al. |
| 9,096,786 B2 | 8/2015 | Sikka et al. |
| 9,139,744 B2 | 9/2015 | Sikka et al. |
| 2001/0018130 A1 | 8/2001 | Hayden |
| 2001/0019773 A1 | 9/2001 | Akamatsu et al. |
| 2001/0024728 A1 | 9/2001 | Kamitani et al. |
| 2001/0030808 A1 | 10/2001 | Komatsu et al. |
| 2001/0055677 A1 | 12/2001 | Wuu |
| 2002/0001676 A1 | 1/2002 | Hayden |
| 2002/0034627 A1 | 3/2002 | Jacquiod et al. |
| 2002/0045007 A1 | 4/2002 | Arora et al. |
| 2002/0049276 A1 | 4/2002 | Zwick |
| 2002/0077412 A1 | 6/2002 | Kobayashi et al. |
| 2002/0111402 A1 | 8/2002 | Mizuno et al. |
| 2002/0115736 A1 | 8/2002 | Koshy |
| 2002/0161130 A1 | 10/2002 | Arai et al. |
| 2002/0177655 A1 | 11/2002 | Pratt et al. |
| 2002/0192472 A1 | 12/2002 | Metz et al. |
| 2002/0197490 A1 | 12/2002 | Amidaiji et al. |
| 2003/0009049 A1 | 1/2003 | Smith et al. |
| 2003/0013795 A1 * | 1/2003 | Nun et al. .................. 524/442 |
| 2003/0021902 A1 | 1/2003 | Yamamoto et al. |
| 2003/0026972 A1 | 2/2003 | Reihs |
| 2003/0040243 A1 | 2/2003 | Ward |
| 2003/0040568 A1 | 2/2003 | Furuta et al. |
| 2003/0065093 A1 | 4/2003 | Custro et al. |
| 2003/0070677 A1 | 4/2003 | Handique et al. |
| 2003/0072723 A1 | 4/2003 | Gers-Barlag et al. |
| 2003/0073067 A1 | 4/2003 | Bookfinder et al. |
| 2003/0077533 A1 | 4/2003 | Murota et al. |
| 2003/0091809 A1 | 5/2003 | Scarborough et al. |
| 2003/0096120 A1 * | 5/2003 | Schafheutle ....... C08G 18/0823 428/423.1 |
| 2003/0110976 A1 | 6/2003 | Abidh et al. |
| 2003/0117051 A1 | 6/2003 | Kweon |
| 2003/0119684 A1 | 6/2003 | Tsao |
| 2003/0125656 A1 | 7/2003 | Davankov et al. |
| 2003/0143339 A1 | 7/2003 | Kobayashi |
| 2003/0149218 A1 | 8/2003 | Cote' et al. |
| 2003/0166840 A1 | 9/2003 | Urry et al. |
| 2003/0170401 A1 | 9/2003 | Shimomura et al. |
| 2003/0176572 A1 | 9/2003 | Maekawa et al. |
| 2003/0176574 A1 | 9/2003 | St. Clair et al. |
| 2003/0179494 A1 | 9/2003 | Kaneko |
| 2003/0194565 A1 | 10/2003 | Schaefer |
| 2003/0203771 A1 | 10/2003 | Rosenberg et al. |
| 2003/0203991 A1 * | 10/2003 | Schottman ............... C08K 3/22 523/334 |
| 2004/0005469 A1 | 1/2004 | Metz et al. |
| 2004/0020104 A1 | 2/2004 | Feldhege et al. |
| 2004/0025747 A1 | 2/2004 | Kamitani et al. |
| 2004/0039128 A1 | 2/2004 | Sasagawa et al. |
| 2004/0050297 A1 | 3/2004 | Kobayashi et al. |
| 2004/0053058 A1 | 3/2004 | Kamitani et al. |
| 2004/0056575 A1 | 3/2004 | Dietz et al. |
| 2004/0097616 A1 | 5/2004 | Hoppler et al. |
| 2004/0102124 A1 | 5/2004 | Suzuki |
| 2004/0102588 A1 | 5/2004 | Arai et al. |
| 2004/0121168 A1 | 6/2004 | Goodwin et al. |
| 2004/0137814 A1 | 7/2004 | Kimbrell, Jr. et al. |
| 2004/0138083 A1 | 7/2004 | Kimbrell, Jr. et al. |
| 2004/0142557 A1 | 7/2004 | Levy et al. |
| 2004/0154106 A1 | 8/2004 | Oles et al. |
| 2004/0192844 A1 | 9/2004 | Ikematsu et al. |
| 2004/0201048 A1 | 10/2004 | Seki et al. |
| 2004/0202872 A1 | 10/2004 | Fang et al. |
| 2004/0209203 A1 | 10/2004 | Kano et al. |
| 2004/0213904 A1 | 10/2004 | Muller et al. |
| 2004/0216227 A1 | 11/2004 | Papadaki et al. |
| 2005/0000463 A1 | 1/2005 | Mochizuki |
| 2005/0004264 A1 | 1/2005 | Tanabe |
| 2005/0008859 A1 | 1/2005 | Forgacs |
| 2005/0009953 A1 | 1/2005 | Shea |
| 2005/0020763 A1 | 1/2005 | Milic |
| 2005/0022313 A1 | 2/2005 | Scheidler |
| 2005/0053793 A1 | 3/2005 | Benay-Oun et al. |
| 2005/0075020 A1 | 4/2005 | Benayoun et al. |
| 2005/0075455 A1 | 4/2005 | Chang et al. |
| 2005/0106762 A1 | 5/2005 | Chakrapani et al. |
| 2005/0121782 A1 | 6/2005 | Nakamura et al. |
| 2005/0143547 A1 | 6/2005 | Stark et al. |
| 2005/0165194 A1 | 7/2005 | Benayoun et al. |
| 2005/0170098 A1 | 8/2005 | Baumann et al. |
| 2005/0197447 A1 | 9/2005 | Gu et al. |
| 2005/0221098 A1 | 10/2005 | Azzopardi et al. |
| 2005/0239211 A1 | 10/2005 | Uchihara et al. |
| 2005/0245395 A1 | 11/2005 | Tanaka et al. |
| 2006/0013983 A1 | 1/2006 | Sebastian et al. |
| 2006/0029808 A1 * | 2/2006 | Zhai et al. .................. 428/412 |
| 2006/0040164 A1 | 2/2006 | Vyas et al. |

(56) References Cited

U.S. PATENT DOCUMENTS

| | | |
|---|---|---|
| 2006/0051561 A1 | 3/2006 | Badyal |
| 2006/0052556 A1 | 3/2006 | Franchina et al. |
| 2006/0057390 A1 | 3/2006 | Kittle et al. |
| 2006/0058458 A1 | 3/2006 | Hasskerl et al. |
| 2006/0062695 A1 | 3/2006 | Haab et al. |
| 2006/0062929 A1 | 3/2006 | Kittle et al. |
| 2006/0081394 A1 | 4/2006 | Li et al. |
| 2006/0089466 A1 | 4/2006 | Shimomura et al. |
| 2006/0110541 A1 | 5/2006 | Russell et al. |
| 2006/0110542 A1 | 5/2006 | Dietz et al. |
| 2006/0113443 A1 | 6/2006 | Remmers |
| 2006/0147634 A1 | 7/2006 | Strauss |
| 2006/0147705 A1* | 7/2006 | Huang et al. ............. 428/345 |
| 2006/0151739 A1 | 7/2006 | Sandner et al. |
| 2006/0154048 A1 | 7/2006 | Teranishi et al. |
| 2006/0162373 A1 | 7/2006 | McMillin et al. |
| 2006/0172641 A1 | 8/2006 | Hennige et al. |
| 2006/0185555 A1 | 8/2006 | Giessler et al. |
| 2006/0205874 A1 | 9/2006 | Uzee et al. |
| 2006/0207032 A1 | 9/2006 | Reiners et al. |
| 2006/0213791 A1 | 9/2006 | Holden |
| 2006/0213792 A1 | 9/2006 | Nguyen et al. |
| 2006/0213849 A1 | 9/2006 | Bienick |
| 2006/0222865 A1 | 10/2006 | Hoshino et al. |
| 2006/0240218 A1 | 10/2006 | Parce |
| 2006/0263516 A1 | 11/2006 | Jones et al. |
| 2006/0266258 A1 | 11/2006 | Asakura et al. |
| 2006/0269758 A1 | 11/2006 | Helmeke |
| 2006/0281889 A1 | 12/2006 | Kobayashi et al. |
| 2006/0286305 A1 | 12/2006 | Thies et al. |
| 2006/0292345 A1 | 12/2006 | Dave et al. |
| 2007/0003705 A1 | 1/2007 | Strauss |
| 2007/0005024 A1 | 1/2007 | Weber et al. |
| 2007/0009657 A1 | 1/2007 | Zhang et al. |
| 2007/0014970 A1 | 1/2007 | Nun et al. |
| 2007/0026193 A1 | 2/2007 | Luzinov et al. |
| 2007/0036906 A1 | 2/2007 | Reeve |
| 2007/0046160 A1 | 3/2007 | Egan |
| 2007/0065668 A1 | 3/2007 | Idei |
| 2007/0075199 A1 | 4/2007 | Stewart et al. |
| 2007/0141114 A1 | 6/2007 | Muisener et al. |
| 2007/0141306 A1 | 6/2007 | Kasai et al. |
| 2007/0148407 A1 | 6/2007 | Chen et al. |
| 2007/0166513 A1 | 7/2007 | Sheng et al. |
| 2007/0172650 A1 | 7/2007 | O'Rear, III et al. |
| 2007/0172658 A1 | 7/2007 | Deruelle et al. |
| 2007/0172661 A1 | 7/2007 | Fechner et al. |
| 2007/0176379 A1 | 8/2007 | Sonnendorfer et al. |
| 2007/0196656 A1 | 8/2007 | Rowell |
| 2007/0202342 A1 | 8/2007 | Whiteford et al. |
| 2007/0213230 A1 | 9/2007 | Pfeiffer et al. |
| 2007/0215004 A1 | 9/2007 | Kuroda et al. |
| 2007/0218265 A1 | 9/2007 | Harris et al. |
| 2007/0224898 A1 | 9/2007 | Deangelis et al. |
| 2007/0231517 A1 | 10/2007 | Golownia |
| 2007/0238807 A1 | 10/2007 | Safir et al. |
| 2007/0259156 A1 | 11/2007 | Kempers et al. |
| 2007/0274871 A1 | 11/2007 | Jiang |
| 2007/0275245 A1 | 11/2007 | Persson et al. |
| 2007/0298216 A1 | 12/2007 | Jing et al. |
| 2008/0008838 A1 | 1/2008 | Arpac et al. |
| 2008/0012459 A1 | 1/2008 | Picken et al. |
| 2008/0015306 A1 | 1/2008 | Wright et al. |
| 2008/0017071 A1* | 1/2008 | Moebus ............. C09D 5/028 106/287.24 |
| 2008/0018709 A1 | 1/2008 | Takenaka et al. |
| 2008/0020127 A1 | 1/2008 | Whiteford et al. |
| 2008/0021212 A1 | 1/2008 | Whiteford et al. |
| 2008/0032403 A1 | 2/2008 | Saito et al. |
| 2008/0039558 A1 | 2/2008 | Lazzari et al. |
| 2008/0039576 A1 | 2/2008 | Griswold et al. |
| 2008/0044635 A1 | 2/2008 | O'Neill et al. |
| 2008/0050567 A1 | 2/2008 | Kawashima et al. |
| 2008/0063870 A1 | 3/2008 | O'Rear et al. |
| 2008/0066648 A1 | 3/2008 | Asakura et al. |
| 2008/0070146 A1 | 3/2008 | Fomitchev et al. |
| 2008/0081858 A1 | 4/2008 | Okazaki |
| 2008/0088192 A1 | 4/2008 | Hsu |
| 2008/0090004 A1 | 4/2008 | Zhang et al. |
| 2008/0101041 A1 | 5/2008 | Chang et al. |
| 2008/0102347 A1 | 5/2008 | Blunk |
| 2008/0107864 A1 | 5/2008 | Zhang et al. |
| 2008/0131653 A1 | 6/2008 | Lyons et al. |
| 2008/0160257 A1* | 7/2008 | Takada et al. .............. 428/145 |
| 2008/0166549 A1 | 7/2008 | Shieh et al. |
| 2008/0171805 A1 | 7/2008 | Mingarelli |
| 2008/0172937 A1 | 7/2008 | Palmer et al. |
| 2008/0176991 A1 | 7/2008 | Osawa et al. |
| 2008/0193740 A1* | 8/2008 | Nesbitt .............. 428/318.4 |
| 2008/0197760 A1 | 8/2008 | Leconte et al. |
| 2008/0199657 A1 | 8/2008 | Capron et al. |
| 2008/0199659 A1 | 8/2008 | Zhao |
| 2008/0205950 A1 | 8/2008 | Moorlag et al. |
| 2008/0206550 A1 | 8/2008 | Borlner |
| 2008/0207581 A1 | 8/2008 | Whiteford et al. |
| 2008/0213601 A1 | 9/2008 | Yamamoto et al. |
| 2008/0220170 A1 | 9/2008 | Van Der Flaas |
| 2008/0220676 A1 | 9/2008 | Marin et al. |
| 2008/0221009 A1 | 9/2008 | Kanagasabapathy et al. |
| 2008/0221263 A1 | 9/2008 | Kanagasabapathy et al. |
| 2008/0226694 A1 | 9/2008 | Gelbert et al. |
| 2008/0237126 A1 | 10/2008 | Hoek et al. |
| 2008/0241512 A1 | 10/2008 | Boris et al. |
| 2008/0241523 A1 | 10/2008 | Huignard et al. |
| 2008/0245273 A1 | 10/2008 | Vyorkka et al. |
| 2008/0246804 A1 | 10/2008 | Kawase et al. |
| 2008/0248263 A1 | 10/2008 | Kobrin |
| 2008/0250978 A1* | 10/2008 | Baumgart et al. ....... 106/287.19 |
| 2008/0261024 A1 | 10/2008 | Xenopoulos et al. |
| 2008/0268233 A1 | 10/2008 | Lawin et al. |
| 2008/0269358 A1 | 10/2008 | Inoue et al. |
| 2008/0280699 A1 | 11/2008 | Jarvholm |
| 2008/0286556 A1 | 11/2008 | D'Urso et al. |
| 2008/0295347 A1 | 12/2008 | Braham |
| 2008/0296252 A1 | 12/2008 | D'Urso et al. |
| 2008/0306202 A1 | 12/2008 | Lin et al. |
| 2008/0310660 A1 | 12/2008 | Lin |
| 2009/0010870 A1 | 1/2009 | Greiner et al. |
| 2009/0011222 A1 | 1/2009 | Xiu et al. |
| 2009/0011227 A1 | 1/2009 | Furukawa |
| 2009/0011960 A1 | 1/2009 | Wu |
| 2009/0018249 A1 | 1/2009 | Kanagasabapathy et al. |
| 2009/0025508 A1 | 1/2009 | Liao et al. |
| 2009/0025609 A1 | 1/2009 | Egami et al. |
| 2009/0032088 A1 | 2/2009 | Rabinowitz |
| 2009/0035519 A1 | 2/2009 | Gaeta et al. |
| 2009/0036978 A1 | 2/2009 | Kleiner et al. |
| 2009/0042469 A1 | 2/2009 | Simpson |
| 2009/0058247 A1 | 3/2009 | Collins et al. |
| 2009/0064894 A1 | 3/2009 | Baumgart et al. |
| 2009/0076430 A1 | 3/2009 | Simpson et al. |
| 2009/0084574 A1 | 4/2009 | Balfour et al. |
| 2009/0084914 A1 | 4/2009 | Picken et al. |
| 2009/0085453 A1 | 4/2009 | Daley et al. |
| 2009/0087670 A1 | 4/2009 | Peng et al. |
| 2009/0095941 A1 | 4/2009 | Nakata et al. |
| 2009/0099301 A1 | 4/2009 | Naraghi et al. |
| 2009/0105409 A1 | 4/2009 | Munzmay et al. |
| 2009/0105679 A1 | 4/2009 | Joubert et al. |
| 2009/0111344 A1 | 4/2009 | Murphy et al. |
| 2009/0115302 A1 | 5/2009 | Benz et al. |
| 2009/0123728 A1 | 5/2009 | Cheung et al. |
| 2009/0134758 A1 | 5/2009 | Vardon |
| 2009/0136737 A1 | 5/2009 | Ring et al. |
| 2009/0142604 A1 | 6/2009 | Imai et al. |
| 2009/0155566 A1 | 6/2009 | Gentleman et al. |
| 2009/0162592 A1 | 6/2009 | Baikerikar et al. |
| 2009/0163637 A1 | 6/2009 | Li et al. |
| 2009/0182085 A1 | 7/2009 | Escobar Barrios et al. |
| 2009/0186070 A1 | 7/2009 | Guire et al. |
| 2009/0188877 A1 | 7/2009 | Stewart |
| 2009/0193743 A1 | 8/2009 | Wiercinski |
| 2009/0195136 A1 | 8/2009 | Wing et al. |
| 2009/0208739 A1 | 8/2009 | Husemann et al. |

(56) References Cited

U.S. PATENT DOCUMENTS

| | | |
|---|---|---|
| 2009/0212505 A1 | 8/2009 | McMillin et al. |
| 2009/0240004 A1 | 9/2009 | Maier et al. |
| 2009/0263604 A1 | 10/2009 | Arai et al. |
| 2009/0286023 A1 | 11/2009 | Dobreski et al. |
| 2009/0298369 A1* | 12/2009 | Koene et al. ............... 442/79 |
| 2009/0324910 A1 | 12/2009 | Gemici et al. |
| 2010/0001625 A1 | 1/2010 | Eckartsberg et al. |
| 2010/0003493 A1 | 1/2010 | Cheng et al. |
| 2010/0004373 A1* | 1/2010 | Zhu et al. ............... 524/448 |
| 2010/0006223 A1 | 1/2010 | Krawinkel et al. |
| 2010/0026156 A1 | 2/2010 | Leconte et al. |
| 2010/0052491 A1 | 3/2010 | Vardon |
| 2010/0102693 A1 | 4/2010 | Driver et al. |
| 2010/0109498 A1 | 5/2010 | Ramm et al. |
| 2010/0117502 A1 | 5/2010 | Kang et al. |
| 2010/0133970 A1 | 6/2010 | Shin et al. |
| 2010/0176703 A1 | 7/2010 | Kim |
| 2010/0181884 A1 | 7/2010 | De La Garza et al. |
| 2010/0196702 A9 | 8/2010 | Furukawa |
| 2010/0213334 A1 | 8/2010 | Davenport |
| 2010/0272913 A1 | 10/2010 | Russell et al. |
| 2010/0314575 A1* | 12/2010 | Gao et al. ............... 252/70 |
| 2010/0330347 A1 | 12/2010 | Badyal et al. |
| 2011/0020637 A1 | 1/2011 | Ikishima et al. |
| 2011/0027531 A1 | 2/2011 | Uchida et al. |
| 2011/0033662 A1 | 2/2011 | Ikishima et al. |
| 2011/0111656 A1 | 5/2011 | Gao et al. |
| 2011/0184082 A1 | 7/2011 | Wright et al. |
| 2011/0206925 A1 | 8/2011 | Kissel et al. |
| 2011/0217544 A1 | 9/2011 | Young et al. |
| 2011/0243985 A1 | 10/2011 | Pagani et al. |
| 2011/0251318 A1* | 10/2011 | Ishizaki et al. ............... 524/208 |
| 2011/0303156 A1 | 12/2011 | Sikka et al. |
| 2011/0313082 A1* | 12/2011 | Popp ............... 523/443 |
| 2012/0009396 A1 | 1/2012 | Sikka et al. |
| 2012/0040577 A1 | 2/2012 | Kissel et al. |
| 2012/0045954 A1* | 2/2012 | Bleecher et al. ............... 442/80 |
| 2013/0216820 A1 | 8/2013 | Riddle et al. |
| 2014/0087134 A1 | 3/2014 | Gesford et al. |
| 2014/0205804 A1 | 7/2014 | Jones et al. |
| 2014/0296409 A1 | 10/2014 | Sikka et al. |
| 2014/0349061 A1 | 11/2014 | Sikka et al. |
| 2015/0005424 A1 | 1/2015 | Jones et al. |
| 2015/0030779 A1 | 1/2015 | Bleecher et al. |
| 2015/0097475 A1 | 4/2015 | Sikka et al. |
| 2015/0320646 A1* | 11/2015 | Kameya ............... A61K 6/083 433/90 |
| 2015/0368500 A1 | 12/2015 | Sikka et al. |
| 2016/0208111 A1 | 7/2016 | Hurley |

FOREIGN PATENT DOCUMENTS

| | | |
|---|---|---|
| DE | 10306891 A1 | 8/2004 |
| DE | 10 2010 022 265 A | 5/2010 |
| EP | 0 166 363 A2 | 1/1986 |
| EP | 0 207 282 A2 | 7/1987 |
| EP | 0 307 915 A2 | 3/1989 |
| EP | 0 317 057 A2 | 5/1989 |
| EP | 0 332 141 A2 | 9/1989 |
| EP | 0 386 991 A1 | 9/1990 |
| EP | 0 399 568 A2 | 11/1990 |
| EP | 0 446 391 A1 | 9/1991 |
| EP | 0 452 723 A1 | 10/1991 |
| EP | 0 472 215 A2 | 2/1992 |
| EP | 0 476 510 A1 | 3/1992 |
| EP | 0 493 270 A2 | 7/1992 |
| EP | 0 545 201 A2 | 6/1993 |
| EP | 0 623 656 A2 | 11/1994 |
| EP | 0 649 887 A1 | 4/1995 |
| EP | 0 657 393 A1 | 6/1995 |
| EP | 0 714 870 A1 | 6/1996 |
| EP | 0 714 921 A1 | 6/1996 |
| EP | 0 719 743 A1 | 7/1996 |
| EP | 0 719 821 A1 | 7/1996 |
| EP | 0 739 714 A2 | 10/1996 |
| EP | 0 745 567 A1 | 12/1996 |
| EP | 0 745 568 A1 | 12/1996 |
| EP | 0 752 459 A2 | 1/1997 |
| EP | 0 770 706 A1 | 5/1997 |
| EP | 0 904 343 A1 | 5/1997 |
| EP | 0 799 791 A1 | 10/1997 |
| EP | 0 811 430 A1 | 12/1997 |
| EP | 0 863 191 A2 | 9/1998 |
| EP | 0 969 718 B1 | 9/1998 |
| EP | 0 903 389 A1 | 3/1999 |
| EP | 0 914 873 A1 | 5/1999 |
| EP | 0 915 103 A1 | 5/1999 |
| EP | 0 930 351 A1 | 7/1999 |
| EP | 1 047 735 A2 | 11/2000 |
| EP | 1 048 696 A2 | 11/2000 |
| EP | 1 097 979 A1 | 5/2001 |
| EP | 1 108 735 A1 | 6/2001 |
| EP | 1 113 064 A1 | 7/2001 |
| EP | 1 136 539 A1 | 9/2001 |
| EP | 1 180 533 A1 | 2/2002 |
| EP | 1 187 872 A1 | 3/2002 |
| EP | 1 193 289 A1 | 4/2002 |
| EP | 1 215 252 A2 | 6/2002 |
| EP | 1 401 903 A2 | 9/2002 |
| EP | 1 261 559 A1 | 12/2002 |
| EP | 1 392 619 A1 | 12/2002 |
| EP | 1 392 772 A1 | 12/2002 |
| EP | 1 407 919 A1 | 2/2003 |
| EP | 1 492 837 A1 | 10/2003 |
| EP | 1 360 253 A2 | 11/2003 |
| EP | 1 362 904 A1 | 11/2003 |
| EP | 1 503 813 A1 | 11/2003 |
| EP | 1 387 011 A1 | 2/2004 |
| EP | 1 387 169 A1 | 2/2004 |
| EP | 1 407 792 A1 | 4/2004 |
| EP | 1 433 821 A1 | 6/2004 |
| EP | 1 583 615 A1 | 7/2004 |
| EP | 1 473 355 A1 | 11/2004 |
| EP | 1 475 234 A1 | 11/2004 |
| EP | 1 479 738 A1 | 11/2004 |
| EP | 1 524 290 A1 | 4/2005 |
| EP | 1 875 279 A1 | 11/2006 |
| EP | 1 883 669 A1 | 11/2006 |
| EP | 1 902 091 A2 | 1/2007 |
| EP | 1 752 284 A1 | 2/2007 |
| EP | 1 857 497 A2 | 11/2007 |
| EP | 1 873 218 A1 | 1/2008 |
| EP | 1 908 804 A1 | 4/2008 |
| EP | 1 988 129 A2 | 11/2008 |
| EP | 1 997 619 A1 | 12/2008 |
| EP | 2 346 678 | 7/2011 |
| EP | 2 678 400 | 8/2012 |
| EP | 2 547 832 | 1/2013 |
| EP | 06787306.7 | 5/2013 |
| EP | 2 791 255 | 6/2013 |
| EP | 2 864 430 | 4/2015 |
| EP | 3 049 453 | 8/2016 |
| GB | 1 341 605 A | 12/1973 |
| GB | 1 465 495 | 2/1977 |
| GB | 2 484 751 A | 4/2012 |
| JP | 62-246960 A | 10/1987 |
| JP | H05-186738 A | 7/1993 |
| JP | H07-090691 A | 4/1995 |
| JP | H10-309768 A | 11/1998 |
| JP | 2002-020575 A | 1/2002 |
| JP | 2004-143352 A | 5/2004 |
| JP | 2004162133 A | 6/2004 |
| JP | 2004308984 A | 11/2004 |
| JP | 2005082616 A | 3/2005 |
| JP | 2005-533946 A | 11/2005 |
| JP | 2006131938 A | 5/2006 |
| JP | 2006-176559 A | 7/2006 |
| JP | 2007144917 A | 6/2007 |
| JP | 2007182491 A | 7/2007 |
| JP | 2007-526366 A | 9/2007 |
| JP | 2008228958 A | 10/2008 |
| JP | 2009071672 A | 4/2009 |
| JP | 2009-100879 A | 5/2009 |

(56) References Cited

FOREIGN PATENT DOCUMENTS

| | | |
|---|---|---|
| JP | 2009-120792 A | 6/2009 |
| KR | 10-2003-052853 | 6/2003 |
| KR | 10-2009-90240 | 10/2010 |
| MX | 175646 | 8/1994 |
| MX | 183533 | 12/1996 |
| MX | 192053 | 5/1999 |
| MX | 195031 | 1/2000 |
| MX | 199899 | 11/2000 |
| MX | 201072 | 3/2001 |
| MX | 203880 | 8/2001 |
| MX | 205074 | 11/2001 |
| MX | PA01011653 A | 12/2002 |
| MX | 215752 | 8/2003 |
| MX | PA02006399 A | 9/2003 |
| MX | PA04010165 A | 2/2005 |
| MX | PA05006898 A | 8/2005 |
| MX | PA02012841 A | 1/2006 |
| MX | 234477 | 2/2006 |
| MX | PA06003323 A | 3/2006 |
| WO | WO 1986-005389 A1 | 9/1986 |
| WO | WO 1991-004305 A1 | 4/1991 |
| WO | WO 1993-016131 A1 | 8/1993 |
| WO | WO 1994-013734 A1 | 6/1994 |
| WO | WO 1996-004123 A1 | 2/1996 |
| WO | WO 1996-007621 A1 | 3/1996 |
| WO | WO 1997-007993 A1 | 3/1997 |
| WO | WO 1998-020960 A1 | 5/1998 |
| WO | WO 1999-023137 A1 | 5/1999 |
| WO | WO 1999-023437 A1 | 5/1999 |
| WO | WO 1999-040431 A1 | 8/1999 |
| WO | WO 1999-047578 A1 | 9/1999 |
| WO | WO 1999-048339 A1 | 9/1999 |
| WO | WO 1999-057185 A1 | 11/1999 |
| WO | WO 1999-064363 A1 | 12/1999 |
| WO | WO 2000-005321 A1 | 2/2000 |
| WO | WO 2000-014297 A1 | 3/2000 |
| WO | WO 2000-025938 A1 | 5/2000 |
| WO | WO 2000-034361 A1 | 6/2000 |
| WO | WO 2000-039240 A1 | 7/2000 |
| WO | WO 2000-046464 A1 | 8/2000 |
| WO | WO 2000-066241 A1 | 11/2000 |
| WO | WO 2001-019745 A1 | 3/2001 |
| WO | WO 2001-062682 A1 | 8/2001 |
| WO | WO 2001-074739 A1 | 10/2001 |
| WO | WO 2001-079142 A1 | 10/2001 |
| WO | WO 2001-079371 A2 | 10/2001 |
| WO | WO 2001-098399 A1 | 12/2001 |
| WO | WO 2002-014417 A1 | 2/2002 |
| WO | WO 2002-028951 A1 | 4/2002 |
| WO | WO 2002-062910 A2 | 8/2002 |
| WO | WO 2002-074869 A1 | 9/2002 |
| WO | WO 2002-098983 A1 | 12/2002 |
| WO | WO 2003-010255 A2 | 2/2003 |
| WO | WO 2003-012004 A1 | 2/2003 |
| WO | WO 2003-030879 A1 | 4/2003 |
| WO | WO 2003-037702 A1 | 5/2003 |
| WO | WO 2003-045693 A1 | 6/2003 |
| WO | WO 2003-063646 A2 | 8/2003 |
| WO | WO 2003-080258 A2 | 10/2003 |
| WO | WO 2003-082998 A1 | 10/2003 |
| WO | WO 2003-093568 A1 | 11/2003 |
| WO | WO 2004-009920 A1 | 1/2004 |
| WO | WO 2004-012625 A2 | 2/2004 |
| WO | WO 2004-043319 A2 | 5/2004 |
| WO | WO 2004-058418 A1 | 7/2004 |
| WO | WO 2004-104116 A1 | 12/2004 |
| WO | WO 2004-110132 A2 | 12/2004 |
| WO | WO 2005-021843 A1 | 3/2005 |
| WO | WO 2005-023935 A1 | 3/2005 |
| WO | WO 2005-028562 A1 | 3/2005 |
| WO | WO 2005-068399 A1 | 7/2005 |
| WO | WO 2005-077429 A1 | 8/2005 |
| WO | WO 2006-044641 A2 | 4/2006 |
| WO | WO 2006-044642 A2 | 4/2006 |
| WO | WO 2006-081891 A1 | 8/2006 |
| WO | WO 2006-083600 A1 | 8/2006 |
| WO | WO 2006-101934 A1 | 9/2006 |
| WO | WO 2006-135755 A2 | 12/2006 |
| WO | WO 2007-011731 A2 | 1/2007 |
| WO | WO 2007-027276 A1 | 3/2007 |
| WO | WO 2007-052260 A2 | 5/2007 |
| WO | WO 2007-053266 A1 | 5/2007 |
| WO | WO 2007-056427 A2 | 5/2007 |
| WO | WO 2007-070801 A2 | 6/2007 |
| WO | WO 2007-075407 A1 | 7/2007 |
| WO | WO 2007-092746 A2 | 8/2007 |
| WO | WO 2007-102960 A2 | 9/2007 |
| WO | WO 2007-104494 A1 | 9/2007 |
| WO | WO 2007-126432 A1 | 11/2007 |
| WO | WO 2007-126743 A1 | 11/2007 |
| WO | WO 2007-130294 A2 | 11/2007 |
| WO | WO 2007-149617 A1 | 12/2007 |
| WO | WO 2008-004827 A1 | 1/2008 |
| WO | WO 2008-004828 A1 | 1/2008 |
| WO | WO 2008-006078 A2 | 1/2008 |
| WO | WO 2008-021791 A2 | 2/2008 |
| WO | WO 2008-035347 A2 | 3/2008 |
| WO | WO 2008-035917 A1 | 3/2008 |
| WO | WO 2008-050895 A1 | 5/2008 |
| WO | WO 2008-051221 A2 | 5/2008 |
| WO | WO 2008-066828 A2 | 6/2008 |
| WO | WO 2008-078346 A1 | 7/2008 |
| WO | WO 2008-106494 A1 | 9/2008 |
| WO | WO 2008-112158 A1 | 9/2008 |
| WO | WO 2008-123650 A1 | 10/2008 |
| WO | WO 2008-123955 A1 | 10/2008 |
| WO | WO 2008-123961 A1 | 10/2008 |
| WO | WO 2008-134243 A1 | 11/2008 |
| WO | WO 2008-137973 A1 | 11/2008 |
| WO | WO 2008-151991 A1 | 12/2008 |
| WO | WO 2008-153687 A2 | 12/2008 |
| WO | WO 2009-003847 A1 | 1/2009 |
| WO | WO 2009-005465 A1 | 1/2009 |
| WO | WO 2009-012116 A2 | 1/2009 |
| WO | WO 2009-018327 A2 | 2/2009 |
| WO | WO 2009-032988 A1 | 3/2009 |
| WO | WO 2009-037717 A2 | 3/2009 |
| WO | WO 2009-041752 A1 | 4/2009 |
| WO | WO 2009-061199 A1 | 5/2009 |
| WO | WO 2009-076108 A1 | 6/2009 |
| WO | WO 2009-148611 A1 | 12/2009 |
| WO | WO 2009-158567 A1 | 12/2009 |
| WO | WO 2010-033288 A2 | 3/2010 |
| WO | WO 2010-042191 A1 | 4/2010 |
| WO | WO 2010-042668 A1 | 4/2010 |
| WO | WO 2011-116005 A1 | 9/2011 |
| WO | WO 2011-151151 A1 | 12/2011 |
| WO | WO 2012-115986 A1 | 8/2012 |
| WO | WO 2013-090939 A1 | 6/2013 |
| WO | WO 2014-003852 A9 | 1/2014 |
| WO | WO 2015-048539 A1 | 4/2015 |

OTHER PUBLICATIONS

U.S. Appl. No. 60/807,143, filed Jul. 12, 2006, Guire et al. (Innovative Surface Technologies, Inc.).
U.S. Appl. No. 60/891,876, filed Feb. 27, 2007, Lawin et al. (Innovative Surface Technologies, Inc.).
U.S. Appl. No. 60/058,902, filed Jun. 4, 2008, Driver et al.
U.S. Appl. No. 61/090,002, filed Aug. 19, 2008, Driver et al.
U.S. Appl. No. 61/133,273, filed Jun. 27, 2008, Driver et al.
U.S. Appl. No. 61/198,414, filed Jun. 16, 2009, Gao.
U.S. Appl. No. 61/216,540, filed May 18, 2009, Driver et al.
U.S. Appl. No. 61/252,229, filed Oct. 16, 2009, Gao.
U.S. Appl. No. 12/037,520, now U.S. Pat. No. 7,943,234.
"Composition," in Collins English Dictionary, found at http://www.credoreference.com/entry/hcengdict/composition, 2000 (viewed Aug. 26, 2013).
"NeverWet—product characteristics," found at http://www.neverwet.com/product-characteristics.php, NeverWet LLC (viewed Mar. 7, 2013).
"Surfactant," found at https://en.wikipedia.org/wiki/Surrfactant, Wikipedia (viewed Dec. 28, 2015).

(56) References Cited

OTHER PUBLICATIONS

"TABER® Test Method Reference," found at http://www.taberindustries.com/documents/Taber Test Reference by Method.pdf (Jun. 2014, viewed Oct. 6, 2015) (2 pages).
"Yield strength, elastic limit, and ultimate strength," found at http://inventor.grantadesign.com/en/notes/science/material/S04 %20strength.htm, Granta Design Ltd. (viewed Feb. 10, 2015).
2009 R&D 100 Award Entry Form (p. 5 excerpt from another document) showing Fig. 1 Schematic of NICE ("no ice nanocoating") (2009).
Bae et al., "Superhydrophobicity of cotton fabrics treated with silica nanoparticles and water-repellent agent," *J Colloid Interface Sci*, abstract only (May 3, 2009; epublication ahead of print).
Bayer Materials Science product information on Bayhydrol® 110 polyurethane dispersion (two first pages of this brochure) (Aug. 2002).
Bayer Materials Science product information on Bayhydrol® 122 polyurethane dispersion (Jan. 2004).
Bayer Materials Science product information on Bayhydrol® 124 polyurethane dispersion (Jan. 2004).
Bayer Materials Science product information on Bayhydrol® 140AQ, polyurethane dispersion (Aug. 2002).
Bayer Materials Science product information on Bayhydrol® A145, aqueous hydroxyl-functional polyurethane dispersion (Jan. 2010).
Beyler et al, "Thermal Decomposition of Polymers," Chapter 7 of *The SFPE Handbook of Fire Protection Engineering* ($3^{rd}$ ed.), pp. 1-110-1-131 (2002).
Bliznakov et al., "Double-scale roughness and superhydrophobicity on metalized Toray carbon fiber paper," *Langmuir*, 25(8):4760-4766, abstract only (Apr. 21, 2009).
Boinovich et al., "Principles of design of superhydrophobic coatings by deposition from dispersions," *Langmuir*, 25(5):2907-2912, abstract only (Mar. 3, 2009).
Boinovich et al., "Principles of Design of Superhydrophobic Coatings by Deposition from Dispersions," *Langmuir*, abstract only (Feb. 10, 2009; epublication ahead of print).
Bravo et al., "Transparent superhydrophobic films based on silica nanoparticles," *Langmuir*, 23(13):7293-7298, abstract only (Jun. 19, 2007; epublished May 25, 2007).
Choi et al., "Large slip of aqueous liquid flow over a nanoengineered superhydrophobic surface," *Phys Rev Lett*, 96(6):066001, abstract only (Feb. 17, 2006; epublished Feb. 16, 2006).
Clark, M.D.T. et al. "Paints and Pigments" available at nzic.org.nz/ChemProcesses/polymers/10D.pdf (copyright 2005-2008 at http://nzic.org.nz/ChemProcesses/polymers/).
Courbin et al., "Your wetting day," *Physics Today*, 60(2):84 (Feb. 2007).
De Givenchy et al., "Fabrication of Superhydrophobic PDMS Surfaces by Combining Acidic Treatment and Perfluorinated Monolayers," *Langmuir*, 25(11):6448-6453, abstract only (Jun. 2, 2009).
Du, "Surfactants, Dispersants, and Defoamers for the Coatings, Inks, and Adhesives Industries," in *Coatings Technology Handbook, Third Edition*, Tracton (ed.), CRC Press (2005).
EPO Communication dated Dec. 5, 2011, regarding third-party observations filed in European Application No. 09771098.2.
Expancel DE product list, "Product Specification for Expancel® Microspheres," Issue Oct. 2010, AkzoNobel (Oct. 2010).
Extended European search report for European Application No. 920119918, dated Jul. 22, 1997.
Extended European search report for European Application No. 09771098.2, dated Dec. 27, 2011.
Extended European search report for European Application No. 09819851.8, dated Jul. 22, 2014.
Extended European search report for European Application No. 12749985.3, dated Apr. 7, 2015.
Extended European search report for European Application No. 12857248.4, dated Apr. 7, 2015.
Fürstner et al., "Wetting and self-cleaning properties of artificial superhydrophobic surfaces," *Langmuir*, 21(3):956-961, abstract only (Feb. 1, 2005).
García et al., "Use of p-toluenesulfonic acid for the controlled grafting of alkoxysilanes onto silanol containing surfaces; preparation of tunable hydrophilic, hydrophobic, and super-hydrophobic silica," *J Am Chem Soc*, 129(16):5052-5060, abstract only (Apr. 25, 2007; epublished Mar. 31, 2007).
Gonçalves et al., "Superhydrophobic cellulose nanocomposites," *J. Colloid Interface Sci*, 324(1-2):42-46, abstract only (Aug. 2008; epublished May 7, 2008).
Guo et al., "A novel approach to stable superhydrophobic surfaces," *Chemphyschem*, 7(8):1674-1677, abstract only (Aug. 11, 2006; epublished Jul. 17, 2006).
International Preliminary Report on Patentability for International Application No. PCT/US2009/059909 (published as WO Publication No. 2010/042668), dated Apr. 21, 2011.
International Search Report and Written Opinion for International Application No. PCT/US2009/005512 (published as WO Publication No. 2010/042191), dated Dec. 8, 2009.
International Search Report and Written Opinion for International Application No. PCT/US2009/048775 (published as WO Publication No. 2009/158567), dated Nov. 19, 2009.
International Search Report and Written Opinion for International Application No. PCT/US2009/059909 (published as WO Publication No. 2010/042668), dated Dec. 4, 2009.
International Search Report and Written Opinion for International Application No. PCT/US2010/048711 (published as WO Publication No. 2011/034835), dated Mar. 17, 2011.
International Search Report and Written Opinion for International Application No. PCT/US2010/054936 (published as WO Publication No. 2011/056742), dated Feb. 16, 2011.
International Search Report and Written Opinion for International Application No. PCT/US2011/028541 (published as WO Publication No. 2011/116005), dated May 17, 2011.
International Search Report and Written Opinion for International Application No. PCT/US2012/025982 (published as WO Publication No. 2012/115986), dated Jun. 13, 2012.
International Search Report and Written Opinion for International Application No. PCT/US2012/070200 (published as WO Publication No. 2013/090939), dated Feb. 27, 2013.
International Search Report and Written Opinion for International Application No. PCT/US2013/031751 (published as WO Publication No. 2014/003852), dated Dec. 23, 2013.
International Search Report and Written Opinion for International Application No. PCT/US2014/057848 (published as WO Publication No. 2015/048539), dated Dec. 29, 2014.
Jauregui-Beloqui et al., "Thermoplastic polyurethane-fumed silica composites: influence of the specific surface area of fumed silica on the viscoelastic and adhesion properties," *Journal of Adhesive Science and Technology*, 13(6):695-711, abstract only (1999).
Kietzig et al., "Patterned superhydrophobic metallic surfaces," *Langmuir*, 25(8):4821-4827, abstract only (Apr. 21, 2009).
Kim et al., "A simple fabrication route to a highly transparent super-hydrophobic surface with a poly(dimethylsiloxane) coated flexible mold," *Chem Commun (Camb)*, 22:2237-2239, abstract only (Jun. 14, 2007; epublished Mar. 6, 2007).
Kobayashi et al., Surface Tension of Poly[(3,3,4,4,5,5,6,6,6-nonafluorohexyl)-methylsiloxane], *Macromolecules*, 23:4929-4933 (1990).
Kovalchuk et al., "Fluoro- vs hydrocarbon surfactants: Why do they differ in wetting performance?," *Advances in Colloid and Interface Science*, 210:65-71 (available online Apr. 13, 2014).
Kraton® FG1901 G Polymer, Data Document, Identifier K127DDh14U, the KRATON Polymers Group of Companies (Jun. 17, 2014).
Kraton® FG1924 G Polymer, Data Document, Identifier K123DDe09U, the KRATON Polymers Group of Companies (Aug. 10, 2009).
Kraton™ Polymers for Modification of Thermoplastics, found at http://docs.kraton.com/kraton/attachments/downloads/81311AM.pdf (last accessed on Aug. 3, 2015).

(56) References Cited

OTHER PUBLICATIONS

Le Marechal et al., "Textile Finishing Industry as an Important Source of Organic Pollutants," in *Organic Pollutants Ten Years After the Stockholm Convention—Environmental and Analytical Update*, Puzyn (ed.), Chapter 2, pp. 29-54, InTech (2012).
Lee et al., "Impact of a superhydrophobic sphere onto water," *Langmuir*, 24(1):142-145, abstract only (Jan. 1, 2008; epublished Nov. 14, 2007).
Li et al., "Conversion of a metastable superhydrophobic surface to an ultraphobic surface," *Langmuir*, 24(15):8008-8012, abstract only (Aug. 5, 2008; published Jul. 8, 2008).
Ling et al., "Stable and transparent superhydrophobic nanoparticle films," *Langmuir*, 25(5):3260-3263, abstract only (Mar. 3, 2009).
Litvinov et al., "Structure of a PDMS Layer Grafted onto a Silica Surface Studied by Means of DSC and Solid-State NMR," *Macromolecules*, 35(11):4356-4364 (2002).
Manca et al., "Durable superhydrophobic and antireflective surfaces by trimethylsilanized silica nanoparticles-based sol-gel processing," *Langmuir*, 25(11):6357-6362, abstract only (Jun. 2, 2009).
Marmur, "Super-hydrophobicity fundamentals: implications to biofouling prevention," *Biofouling*, 22(1-2):107-115, abstract only (2006).
Ming et al., "Toward Superlyophobic Surfaces," *Contact Angle, Wettability and Adhesion* (ed. Mittal), vol. 6, pp. 191-205, Koninklijke Brill NV, Leiden (2009).
Mohammadi et al., "Effect of Surfactants on Wetting of Super-Hydrophobic Surfaces," *Langmuir*, 20:9657-9662 (available online Oct. 2, 2004).
Nosonovsky et al., "Patterned nonadhesive surfaces: superhydrophobicity and wetting regime transitions," *Langmuir*, 24(4):1525-1533, abstract only (Feb. 19, 2008; epublished Dec. 12, 2007).
Park et al., "Wetting transition and optimal design for microstructured surfaces with hydrophobic and hydrophilic materials," *J. Colloid Interface Sci*, 336(1):298-303, abstract only (Aug. 1, 2009; epublished Apr. 15, 2009).
Perez, Jr., et al., "Performance and Processing Enhancements of Aromatic Polyurea Elastomer Systems Prepared from High 2,4'-MDI Isocyanates," in *Polyurethanes Conference 2000: Defining the Future Through Technology*, Boston, Massachusetts, pp. 219-232 (Oct. 8-11, 2000).
Piret et al., "Biomolecule and nanoparticle transfer on patterned and heterogeneously wetted superhydrophobic silicon nanowire surfaces," *Langmuir*, 24(5):1670-1672, abstract only (Mar. 4, 2008; epublished Feb. 6, 2008).
Puukilainen et al., "Superhydrophobic polyolefin surfaces: controlled micro- and nanostructures," *Langmuir*, 23(13):7263-7268, abstract only (Jun. 19, 2007; epublished May 23, 2007).
Sakai et al., "Direct observation of internal fluidity in a water droplet during sliding on hydrophobic surfaces," *Langmuir*, 22(11):4906-4909, abstract only (May 23, 2006).
Sherwin Williams Chemical Coatings product information for CC-D14, POLANE® 2.8T, plus polyurethane enamel (Oct. 19, 2006).
Sherwin Williams Chemical Coatings product information for CC-D5, POLANE® T, polyurethane enamel (Sep. 2001).
Sherwin Williams Chemical Coatings product information for CC-E14, POLANE® 700T, water reducible enamel (May 2010).

Shirtcliffe et al., "Wetting and wetting transitions on copper-based super-hydrophobic surfaces," *Langmuir*, 21(3):937-943, abstract only (Feb. 1, 2005).
Smith et al., "Modeling of PDMS—Silica Nanocomposites," *NSTI-Nanotech*, 3:115-118 (2004).
*SSW Holding Company, Inc. v. Schott Gemtron Corporation*, Civil Docket, Civil Action No. 3:12-cv-00661-CRS (as of Dec. 6, 2013).
*SSW Holding Company, Inc. v. Schott Gemtron Corporation*, Complaint for Patent Infringement, Demand for Jury Trial, Civil Action No. 3:12-cv-00661-CRS (Oct. 16, 2012).
Su et al., "From Suerhydrophophilic to Superhydrophobic: Controlling Wettability of Hydroxide Zinc Carbonate Film on Zinc Plates," *Langmuir*, abstract only (Feb. 10, 2009; epublication ahead of print).
Synytska et al., "Wetting on Fractal Superhydrophobic Surfaces from 'Core-Shell' Particles: A Comparison of Theory and Experiment," *Langmuir*, abstract only (Feb. 10, 2009; epublication ahead of print).
Torró-Palau et al., "Characterization of polyurethanes containing different silicas," *International Journal of Adhesion and Adhesives*, 21(1):1-9, abstract only (2001).
Two webpages re pigment particle size: http://www.specialchem4coatings.com/tc/color-handbook/index.aspx?id=size and http://www.specialchem4coatings.com/tc/tio2/index.aspx?id=whiteness, SpecialChem, S.A. (printed on Jul. 19, 2013).
Venkateswara et al., "Preparation of MTMS based transparent superhydrophobic silica films by sol-gel method," *J Colloid Interface Sci*, 332(2):484-490, abstract only (Apr. 15, 2009; epublished Jan. 14, 2009).
Wang et al., "One-step coating of fluoro-containing silica nanoparticles for universal generation of surface superhydrophobicity," *Chem Commun (Camb)*,7:877-879, abstract only (Feb. 21, 2008; epublished Dec. 18, 2007).
Yang et al., "Influence of surface roughness on superhydrophobicity," *Phys Rev Lett*, 97(11):116103, abstract only (Sep. 15, 2006; epublished Sep. 14, 2006).
Zhang et al., "Application of superhydrophobic edge effects in solving the liquid outflow phenomena," *Langmuir*, 23(6):3230-3235, abstract only (Mar. 13, 2007; epublished Jan. 25, 2007).
Zhou et al., "Study on the morphology and tribological properties of acrylic based polyurethane/fumed silica composite coatings," *Journal of Materials Science*, 39:1593-1594, abstract only (2004).
EPO Communication dated Aug. 2, 2012, regarding third-party observations filed in European Application No. 09819851.8.
Extended European search report for European Application No. 13809987.4, dated Feb. 22, 2016.
Machine translation, German Application No. DE10306891, 8 pages, (prepared Aug. 6, 2015).
Machine translation, Japanese Application No. JP 2002-020575 A, 15 pages, (prepared Aug. 6, 2015).
Machine translation, Japanese Application No. JP 2004-143352 A, 13 pages, (prepared Aug. 6, 2015).
Machine translation, Japanese Application No. JP 2006-176559 A, 15 pages, (prepared Aug. 6, 2015).
Machine translation, Japanese Application No. JP 2009-120792 A, 24 pages, (prepared Aug. 6, 2015).
Shang et al., "Facile fabrication of superhydrophpobic surface via SiO2/fluoro-containing polymer composite particles," CAPlus Abstract, Accession No. 2013:1045604, 2 pages (Jul. 5, 2013).

\* cited by examiner

Figure 3: Coated cup and handle -- household plunger.

Figure 4: Coated cup -- industrial plunger.

Figure 5: Coated cup and handle -- industrial plunger.

PLUNGER AND METHODS OF PRODUCING HYDROPHOBIC SURFACES

This application is a continuation of International Application No. PCT/US2011/028541, filed Mar. 15, 2011, which claims the benefit of U.S. Provisional Patent Application No. 61/314,137, filed Mar. 15, 2010, entitled "Plunger and Methods of Producing Hydrophobic Surfaces," each of which applications is incorporated by reference in its entirety.

PRIORITY DATA & INCORPORATION BY REFERENCE

This international application claims the benefit of priority to U.S. Provisional Patent Application No. 61/314,137, filed Mar. 15, 2010, entitled "Plunger and Methods of Producing Hydrophobic Surfaces" which is incorporated by reference in its entirety.

BACKGROUND

A plunger is the most common household article used to clear clogged plumbing fixtures such as drains, toilets, and sinks. As seen in FIG. 1, the plunger generally consists of two parts: (1) a cup and (2) a handle. With a slightly modified cup, which has a skirt (3) protruding from the cup (FIG. 2), the plunger is used for industrial applications such as in hotels. The plunger cup typically consists of rubber or a flexible polyvinyl chloride (PVC) material. PVC is sometimes prepared as a composite with fillers such as thermoplastic rubber (TPR), and up to 35% of the fillers is added to the PVC for optimizing flexibility and hardness of the plunger cup. The handle is typically wood or solid plastic, but other materials such as clear acrylic are used.

Regardless of the materials used to construct a plunger or the exact form of the cup, plungers operate by making a seal with the plumbing fixture's surfaces after which the application of pressure on the flexible cup through the handle creates a pressure that clears clogs. The number of times pressure must be applied to the handle to create a plunging action depends on the severity of the clog.

After use, the plunger (cup and handle) typically are covered in materials originally destined for the sewer, such as toilet water and/or other materials such as fecal matter. That water and other materials tend to drip onto the floor when the plunger is removed from the toilet and contaminate any surface it comes into contact with. Not only is the water dripping on the floor highly undesirable with regard to the cleanliness of the bathroom and damage to the floor's surface but it also creates sites for bacterial growth.

DESCRIPTION OF EMBODIMENTS OF THE DISCLOSURE

Figure 1:
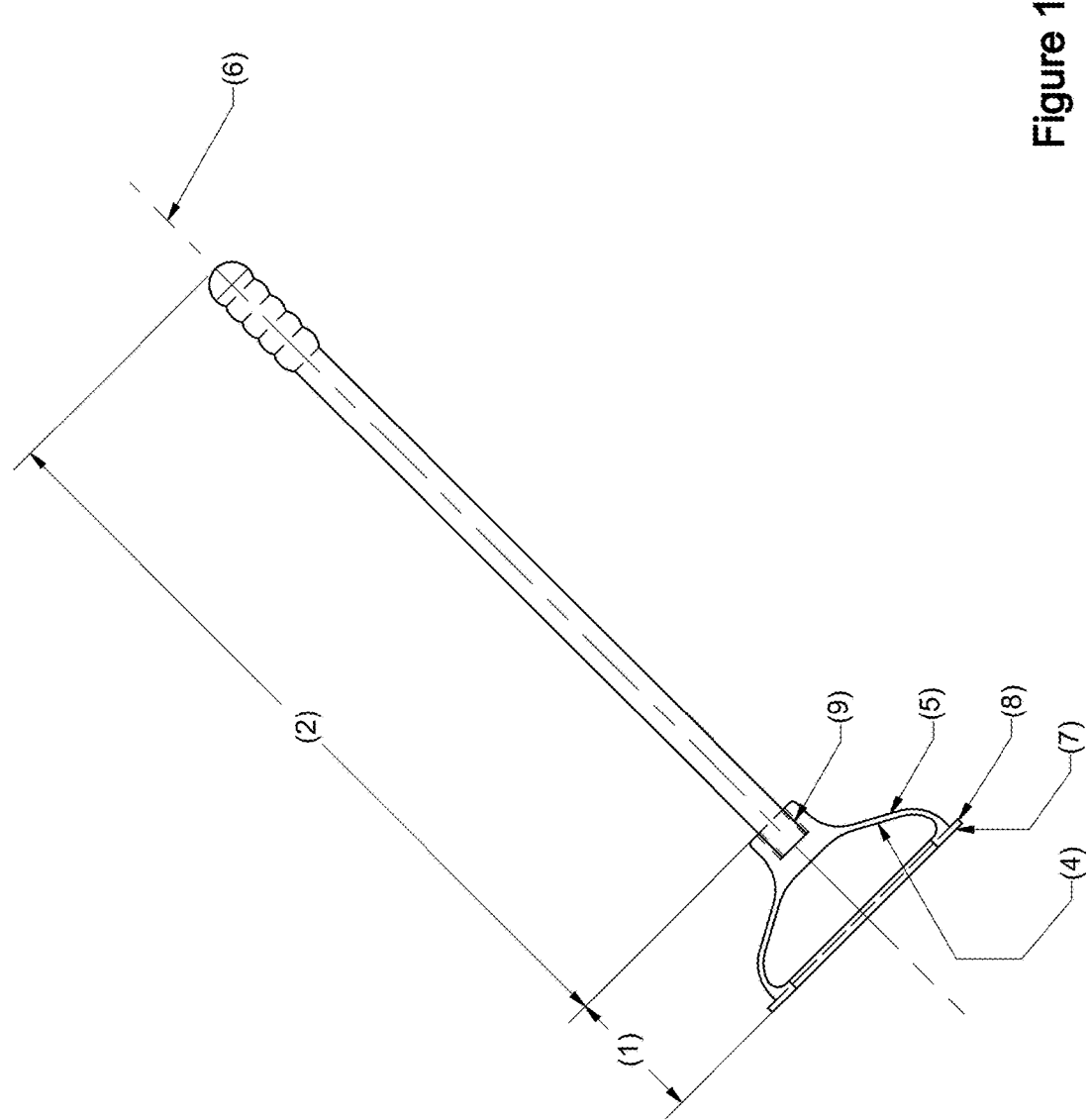
FIG. 1 shows a typical household drain plunger showing the cup (1) with an optional lip (8) and handle (2).i

Embodiments of this disclosure, which are described herein, provide for a plunger coated in whole or in part with a hydrophobic or superhydrophobic coating that can be used to clear plumbing while advantageously resisting becoming wet and fouled with materials intended for disposal via the drain. The plunger resists wetting and fouling even after dozens or even hundreds of uses, which can be measured by individual compressions of the plunger cup via pressure applied to the handle. In some embodiments, less than about 0.2, about 0.5, about 1, about 2, about 3, or about 4 grams of water remain bound by adhesion to the surface of the plunger after immersion in water at about 20° C., even after the plunger cup has been compressed more than about 300 times by applying force to the handle.

Embodiments of the plungers described herein that resist wetting and fouling by materials intended for the sewer can provide one or more of a variety of advantages. For example, they can be removed from plumbing fixtures after use with little or no dripping of materials onto the floor and other nearby objects, thus keeping floors and nearby surfaces dry and clean. Embodiments of the plungers described herein also reduce or eliminate the odor associated with used plungers. In addition, bacterial (microbial) growth is less likely to occur on the hydrophobic coatings described herein, whether applied to plungers or other objects, as there will be a limited amount of accumulated water and/or other materials to support growth. Bacterial (microbial) growth can be further suppressed by incorporating a number of different antibacterial and/or antifungal agents into the coatings described herein including, but not limited to, zinc pyrithione, zinc di(lower alkyl)dithiocarbamate (e.g., zinc dimethyldithiocarbamate) and silver (e.g., colloidal silver or silver nanoparticles typically in the range of 1-50 ppm or 10-30 ppm).

In some embodiments, the coatings applied to all or a part of the plungers described herein will not only be hydrophobic, but also oleophobic. Plungers that are oleophobic in addition to being hydrophobic will further resist wetting and contamination by materials, including fecal matter, that are intended for the sewer. Such plungers will further limit the growth of bacteria by limiting the amount of material present to support its growth.

Embodiments of the plungers described herein are thus suitable for use in clearing plumbing including clogged toilets, sinks and drain pipes connected to toilets and sinks, including embodiments that are adapted for industrial use. The shape of the cup (oval, circular etc.) may be made in a variety of widths adapted to clearing specific types of plumbing fixtures. In addition, the use of one or more rubbers to prepare cups having suitable stiffness and resilience can permit embodiments of the plungers described herein to adapt their contours to the surface of plumbing fixtures.

1.0 DEFINITIONS

For the purposes of this disclosure a hydrophobic coating is one that results in a water droplet forming a surface contact angle exceeding about 90° and less than about 150° at room temperature (about 18 to about 23° C.). Similarly, for the purposes of this disclosure a superhydrophobic coating is one that results in a water droplet forming a surface contact angle exceeding about 150° but less than the theoretical maximum contact angle of about 180° at room temperature. The term hydrophobic includes superhydrophobic, and may be limited to superhydrophobic, unless stated otherwise.

For the purposes of this disclosure an oleophobic material or surface is one that results in a droplet of light mineral oil forming a surface contact angle exceeding about 25° and less than the theoretical maximum contact angle of about 180° at room temperature.

Durability, unless stated otherwise, refers to the resistance to loss of hydrophobic properties due to mechanical abrasion or flexing.

Moiety or moieties, for the purpose of this disclosure, refers to a chemical group (e.g., alkyl group, fluoroalkyl group, haloalkyl group) bound directly or indirectly (e.g., covalently) to another part of a molecule or another substance or material (e.g., a first or second particle). A moiety also includes chemical components of materials that are associated with a material (e.g., components of first or second particles) that are not covalently bound to the particles (e.g., siloxanes or silazanes associated with first or second particles).

Alkyl as used herein denotes a linear or branched alkyl radical. Alkyl groups may be independently selected from $C_1$ to $C_{20}$ alkyl, $C_2$ to $C_{20}$ alkyl, $C_4$ to $C_{20}$ alkyl, $C_6$ to $C_{18}$ alkyl, $C_6$ to $C_{16}$ alkyl, or $C_6$ to $C_{20}$ alkyl. Unless otherwise indicated, alkyl does not include cycloalkyl. Cycloalkyl groups may be independently selected from: $C_4$ to $C_{20}$ alkyl comprising one or two $C_4$ to $C_8$ cycloalkyl functionalities; $C_4$ to $C_{20}$ alkyl comprising one or two $C_4$ to $C_8$ cycloalkyl functionalities; $C_6$ to $C_{20}$ alkyl comprising one or two $C_4$ to $C_8$ cycloalkyl functionalities; $C_6$ to $C_{18}$ alkyl comprising one or two $C_4$ to $C_8$ cycloalkyl functionalities; and $C_6$ to $C_{16}$ alkyl comprising one or two $C_4$ to $C_8$ cycloalkyl functionalities. One or more hydrogen atoms of the alkyl groups may be replaced by fluorine atoms to form fluoroalkyl groups.

Lower alkyl as used herein denotes a $C_1$ to $C_6$ alkyl group.

Haloalkyl as used herein denotes an alkyl group in which some or all of the hydrogen atoms present in an alkyl group have been replaced by halogen atoms. Halogen atoms may be limited to chlorine or fluorine atoms in haloalkyl groups.

Fluoroalkyl as used herein denotes an alkyl group in which some or all of the hydrogen atoms present in an alkyl group have been replaced by fluorine atoms.

Perfluoroalkyl as used herein denotes an alkyl group in which fluorine atoms have been substituted for each hydrogen atom present in the alkyl group.

For the purpose of this disclosure, when content is indicated as being present on a "weight basis" the content is measured as the percentage of the weight of components indicated, relative to the total weight of the binder system. When a liquid component such as a commercial binder product is used, the weight of the liquid component is used to calculate the weight basis, without regard to the relative amounts of solute and solvent that might be present in the commercial product. Thus, for example, when Polane® is used as a binder, the weight basis is calculated using the weight of the Polane® prepared as instructed by the manufacturer, without regard to the proportions of polyurethane solute and organic solvents. Optional solvents that are separately added to a composition merely to, for example, dilute the composition to a thickness suitable for spraying, are not included in the calculation of content on a weight basis.

Water-based as used herein to refer to binders refers to liquid compositions that comprise water or which can be diluted with water (e.g., to reduce viscosity). Water-based binder compositions include solutions, dispersions, suspensions, emulsion gels and the like.

The term metalloid includes the elements B, Si, Sb, Te and Ge. Oxides of metalloids or metalloid oxides include, but are not limited to, oxides of B, Si, Sb, Te, and Ge, such as $SiO_2$.

2.0 PLUNGER CUPS

Referring now to FIG. 1, embodiments of plunger cups disclosed herein may take many forms. Generally, the cups are shaped to have a concave inner surface (4) and a convex outer surface (5) to which a handle is attached at a point that can be reinforced or are built to conform to an end of the handle (9). The inner surface and outer surface meet at a rim (7) that may have an optional lip (8) attached. The point where the handle is attached may be reinforced to provide an adequate strength to the joint and to spread the force applied to the cup from the handle. The shape at the point where the handle attaches to the outer surface of the cup may thus depart from a convex shape. A cross section (6) through the cup parallel to the rim and generally perpendicular to the long axis of the handle is generally circular, oval, elliptical, or oblate. In addition to the cups shown in the accompanying drawings, some examples of suitable cup shapes can be observed in U.S. Pat. Nos. 4,622,702 and 4,768,237, the disclosures of which are incorporated herein by reference in terms of their disclosures of plunger-cup shapes.

Figure 2:
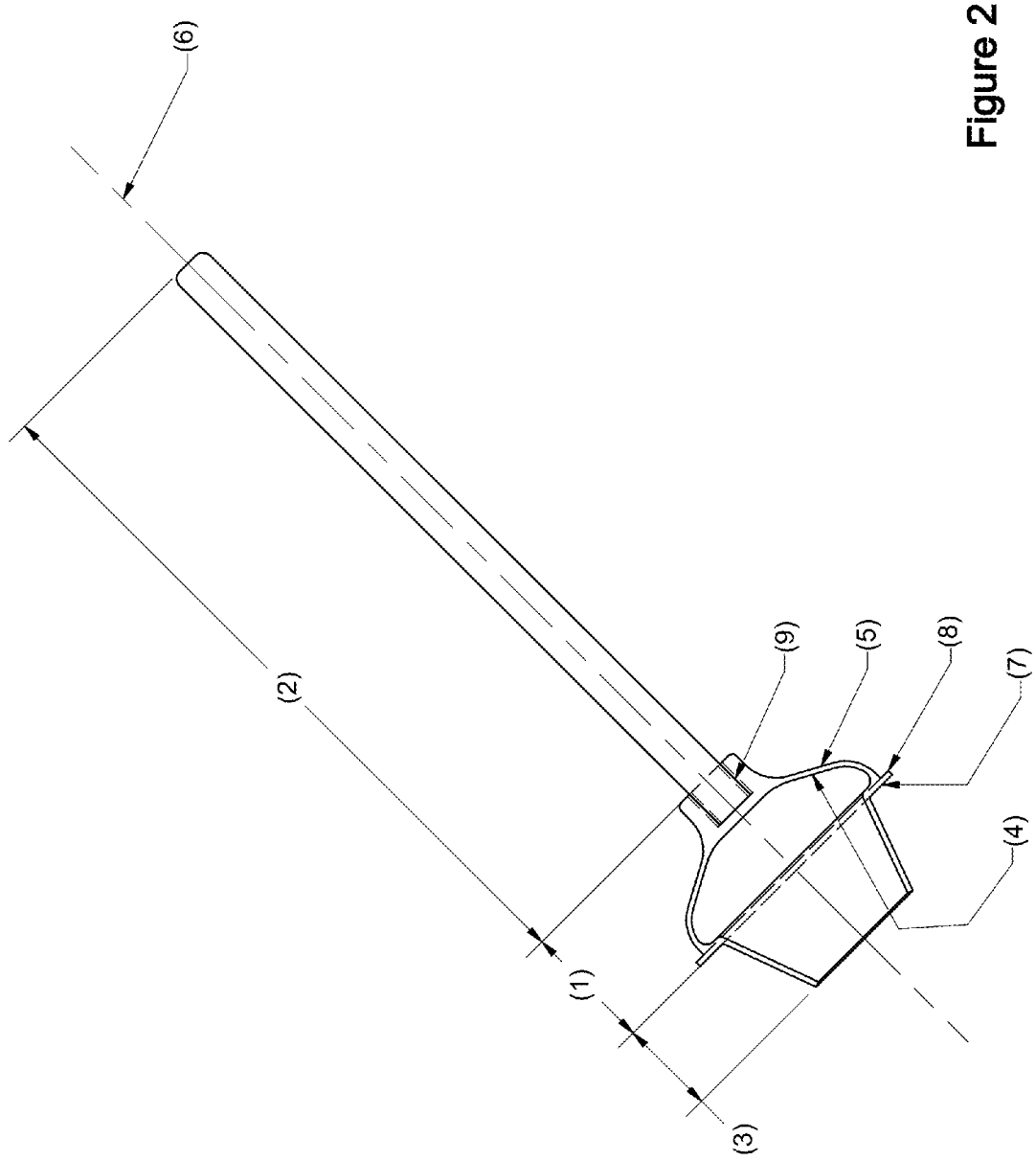
FIG. 2 shows a typical industrial (heavy duty) plunger showing a handle and a cup with an optional lip (8) and skirt (3) protruding from the lower edge of the cup.

Referring to FIG. 2, in some embodiments, particularly industrial embodiments, the cup may be fitted with a "skirt" (3), which assists in conforming the plunger to the shape of the plumbing fixtures. The skirts are generally cylindrical sections of material that attach to, or just inside of, the rim of the cup. The skirt may narrow slightly as it extends away from the cup. Skirts, when present, are generally made from the same material as the cup, and in one piece with the cup, although they also can be made of a different material.

In embodiments described herein, plunger cups may be made from a resilient material that is resistant to water. In some embodiments the plunger consists of rubber (natural or synthetic) or a flexible polyvinyl chloride (PVC) material. Where PVC is employed, it may be prepared as a composite with fillers such as thermoplastic rubber (TPR), which may be added in an amount, e.g., up to 35% (by weight) or more, to impart desirable properties such as increasing the flexibility of the PVC while providing appropriate hardness and resilience. In other embodiments, the cup may be made from a rubber selected from the group consisting of: nitrile rubber, acrylonitrile-butadiene (NBR), natural rubber, butadiene-type rubber, styrene-butadiene rubber, chloroprene, ethylene propylene diene modified rubber (EPDM), polyurethane rubber, butyl rubber, neoprene, isoprene, polyisoprene, halobutyl rubber, fluoroelastomers, epichlorohydrin rubber, polyacrylate rubber, chlorinated polyethylene rubber, hydrogenated SBR, hydrogenated NBR, carboxylated NBR, silicone rubber, or mixtures, copolymers or terpolymers thereof.

3.0 HANDLES

Handles of plungers are generally attached to the outer surface of the cup at a point where the cup can be effectively compressed to provide pressure to water and material clogging a plumbing fixture. Where the plungers are circular in cross section the handle is typically attached to the outer surface at a point that is approximately equidistant from the rim in all direction.

Handles for use with plungers can be made of any suitable rigid material including, but not limited to, wood, plastic, and metal. In some embodiments, the handles can be made of clear plastic such as acrylic. In some embodiments, the handles may be hollow with a fluid connection with the inside of the cup on one end, and at the other end may be connected to a source of water to supply pressure, as in U.S. Pat. No. 4,768,237, the disclosure of which is incorporated herein by reference in terms of the use of a hollow handle and a fluid connection. The handle also may be provided with a hydrophobic coating as described herein.

4.0 COATINGS

Coatings applied to the surfaces of the plungers described herein may be any coating that provides a hydrophobic coating that is sufficiently flexible to endure the repeated bending and flexing that the plunger cup will be exposed to during use without substantial loss of hydrophobicity In some embodiments, the hydrophobic coatings applied to the plungers, and optionally to the handles, comprise: i) a binder; ii) first particles having a size of about 30 µm to about 225 µm; and iii) second particles having a size of about 1 nanometer (nm) to about 25 µm comprising one or more independently selected hydrophobic or oleophobic moieties.

In other embodiments, the hydrophobic coatings applied to the plungers comprise a base coat comprised of said binder and said first particles applied to said cup, and optionally applied to said handle, and a top coat comprised of second particles applied to the base coat after it has been applied to a surface (e.g., a surface of the plunger such as the cup or handle).

4.1 Binders

Binders used to prepare hydrophobic coatings may have a variety of compositions. One consideration in choosing a suitable binder is the compatibility between the surface to be coated and any solvent(s) used to apply the binder. Virtually any binder may be employed that is capable of adhering to the surface of the plunger while retaining sufficient flexibility so that it does not appreciably chip, crack, or peel away from the plunger cup when subjected to repeated flexing due to pressure applied to the plunger handle to the point that the hydrophobic nature of the coating is substantially reduced (i.e. the coating hydrophobicity or ability to shed water is not substantially reduced by more than 5%, 10%, 15%, 20% or 25% (e.g., where 100 mg of water might adhere to a plunger before being subject to 100 depressions by applying pressure to the handle, the plunger will not retain more than 105, 110, 125, 120, or 125 mg of water adhering to its surface). In some embodiments, the binders employed are hydrophobic in the absence of any added first or second particles, which can be advantageous in the preparation of hydrophobic and/or oleophobic coatings.

In some embodiments, the binders may be selected from lacquers, polyurethanes (including water based polyurethanes), fluoropolymers, or epoxies. In other embodiments the binders may be selected from lacquers, polyurethanes, or fluoropolymers. Binders may be hydrophilic, hydrophobic, or hydrophobic and oleophobic in the absence of the first and second particles described herein that alter the durability, hydrophobic and oleophobic properties of the binder.

Where the binders employed are hydrophilic, the coating, including first and second particles, can be given an application of a silanizing agent after it has been applied to the plunger.

Hydrophobic coatings applied to the surfaces, such as the surfaces of the plungers described herein, may be formed with binders having a broad range of thicknesses. In some embodiments the coatings will have a thickness in a range selected from about 10 µm to about 225 µm. Within this broad range are embodiments employing coatings of thicknesses that range from about 10 µm to about 25 µm, from about 25 µm to about 50 µm, from about 50 µm to about 75 µm, from about 75 µm to about 100 µm, from about 100 µm to about 125 µm, from about 125 µm to about 150 µm, from about 150 µm to about 175 µm, from about 175 µm to about 200 µm, from about 200 µm to about 225 µm, from about 15 µm to about 200 µm; from about 20 µm to about 150 µm; from about 30 µm to about 175 µm, and from about 50 µm to about 200 µm.

4.1.1 Lacquer Binders

Embodiments of the plunger described herein may employ lacquer binders. Lacquers may be used on a variety of surfaces that may be employed to make plungers and/or plunger handles, and are particularly useful in forming coatings on plastics, rubbers, woods and metals, including, but not limited to, steel, stainless steel, and aluminum. Lacquer binders typically are polymeric materials that are suspended or dissolved in carrier solvents and which dry to a hard finish, at least in part, by evaporation of the carrier solvents used to apply them. The polymeric binders present in lacquers include, but are not limited to, nitrocellulose and acrylic lacquers; each of which are suitable for use in preparing hydrophobic coatings.

In embodiments of plungers herein, hydrophilic lacquers may be employed as binders; particularly where the coating will be given an application of a silanizing agent after it has been applied to the substrate. In other embodiments, lacquers that are hydrophobic in the absence of first or second particles described below may be employed to prepare the coatings described herein.

In addition to the polymeric materials and solvents present in lacquers, a variety of other materials that enhance the properties of lacquers also may be present to impart one or more desirable properties. For example, such materials can provide not only color but also increased adhesion between the lacquer and the surface of the plunger upon which it is applied (i.e. the cup or handle).

A variety of commercial lacquer preparations may be used to prepare the durable coatings described herein. Among the commercial acrylic lacquers that may be employed are "Self-Etching Primer" (Eastwood Co., Pottstown, Pa.); DuPont™ VariPrime® 615S™ (DuPont™ Performance Coatings, Wilmington, Del.) and Nason® 491-17™ Etch Primer™ (DuPont™ Performance Coatings, Wilmington, Del.).

Lacquers may be used on a variety of surfaces, and are particularly useful in forming coatings on plastics, woods, rubbers, and metals, including, but not limited to, metals (e.g., steel, stainless steel, and aluminum).

4.1.2 Polyurethane Binders

A wide variety of polyurethanes, including those prepared in organic solvent or in water may be used to prepare hydrophobic and/or oleophobic coatings described herein. Polyurethanes are polymers consisting of a chain of organic units joined by urethane (carbamate) linkages. Polyurethane polymers are typically formed through polymerization of at least one type of monomer containing at least two isocyanate functional groups with at least one other monomer containing at least two hydroxyl (alcohol) groups. A catalyst may be employed to speed the polymerization reaction. Other components may be present in the polyurethane coating compositions to impart desirable properties including, but not limited to, surfactants and other additives that bring about the carbamate forming reaction(s) yielding a coating of the desired properties in a desired cure time.

In some embodiments, the polyurethane employed in the durable coatings may be formed from a polyisocyanate and a mixture of —OH (hydroxyl) and NH (amine) terminated monomers. In such systems the polyisocyanate can be a trimer or homopolymer of hexamethylene diisocyanate.

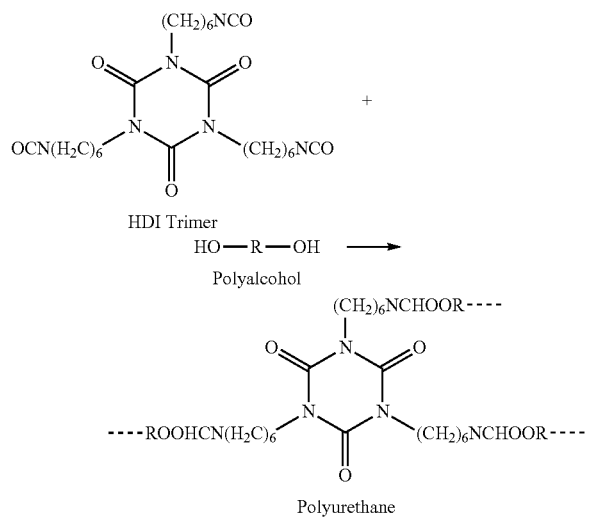

Some solvents compatible with such systems include n-butyl acetate, toluene, xylene, ethyl benzene, cyclohexanone, isopropyl acetate, and methyl isobutyl ketone and mixtures thereof.

In some embodiments, polyurethanes that are hydrophobic, as applied in the absence of first or second particles as described below, may be employed to prepare the coatings described herein. Among the commercial polyurethanes that may be employed are the POLANE® family of polyurethanes from Sherwin-Williams (Cleveland, Ohio).

Polyurethanes may come as a single component ready to apply composition, or as a two or three part (component) system, as is the case with POLANE® products. For example POLANE® B can be prepared by mixing POLANE® B (typically six parts), a catalyst (e.g., typically one part of V66V27 or V66V29 from Sherwin-Williams), and a reducer (typically 25 to 33% of R7K84 from Sherwin-Williams). The "pot life" of mixed POLANE® B prepared in that manner is typically 6-8 hours.

A variety of water-based polyurethane compositions (aqueous polyurethane suspensions, emulsions, dispersions, gels etc.) may be used to prepare hydrophobic and/or oleophobic coatings described herein. Some commercially available water-based polyurethane compositions include POLANE® 700T and KEM AQUA® (Sherwin-Williams), and Bayhydrol 124 (Bayer Material Science) and may be used alone or in combination.

Polyurethane binders are compatible with, and show good adhesion to, a wide variety of surfaces. Using polyurethane binders, hydrophobic coatings may be formed on many, if not most, surfaces including, but not limited to, those of metals, glass, rubber and plastics.

4.1.3 Fluoropolymer Binders

In other embodiments, a wide variety of fluoropolymer compositions may be used as binders in the preparation of hydrophobic and/or oleophobic (HP/OP) coatings described herein. Fluoropolymers are polymers comprising one or more fluoroalkyl groups. In some embodiments, the fluoropolymers employed in the durable coatings may be formed from fluoroethylene/vinyl ether copolymer (FEVE). Fluoropolymers that are hydrophobic as applied, in the absence of first or second particles which are described further below, may be employed to prepare the coatings described herein. Among the commercial fluoropolymers that may be employed to prepare HP/OP coatings are LUMIFLON® family polymers (Asahi Glass Co., Toyko, Japan).

Fluoropolymers that may be employed as binders typically come as a two or three component system, as is the case with LUMIFLON® products. For example LUMIFLON® LF can be prepared by mixing 58 parts of LUMIFLON® LF-200, 6.5 parts of DESMODUR® N3300A (Bayer Material Sciences, Leverkusen, Germany), 2.5 parts of catalyst (DABCO® T12 ($\frac{1}{10,000}$ part), DABCO® (1,4-diazabicyclo[2.2.2]octane, $\frac{1}{10,000}$ part), 1 part xylene), with 33 parts xylene. Unless otherwise noted, references to LUMIFLON®, particularly in the Examples, refer to LUMIFLON® LF. Fluoropolymer coatings such as LUMIFLON® can be applied to a variety of surfaces including wood, metal, rubber, and plastic.

4.2 First Particles

Embodiments of the coatings disclosed herein may comprise particles that are added to the binder compositions to improve the mechanical properties of the coatings, e.g., the durability of the hydrophobic and/or oleophobic coatings. A wide variety of such particles, which are denoted herein as "first particles" because the coatings described herein optionally may have one or more additional types of particles, and also are known as extenders or fillers, may be added to the binders. Such first particles that may be employed in the HP/OP coatings include, but are not limited to, particles comprising: wood (e.g., wood dust), glass, metals (e.g., iron, titanium, nickel, zinc, tin), alloys of metals, metal oxides, metalloid oxides (e.g., silica), plastics (e.g., thermoplastics), carbides, nitrides, borides, spinels, diamonds, and fibers (e.g., glass fibers).

Numerous variables may be considered in the selection of first particles. These variables include, but are not limited to, the effect the first particles have on the resulting coatings, their size, their hardness, their compatibility with the binder, the resistance of the first particles to the environment in which the coatings will be employed, and the environment the first particles must endure in the coating process, including resistance to temperature and solvent conditions.

In embodiments described herein, first particles have an average size in a range selected from about 1 micron (µm) to about 250 µm. Within this broad range, embodiments include ranges of first particles having an average size of from about 1 µm to about 5 µm, from about 5 µm to about 10 µm, from about 10 µm to about 15 µm, from about 15 µm to about 20 µm, from about 20 µm to about 25 µm, from about 1 µm to about 25 µm, from about 5 µm to about 25 µm, from about 25 µm to about 50 µmm, from about 50 µm to about 75 µm, from about 75 µm to about 100 µm, from about 100 µm to about 125 µm, from about 125 µm to about 150 µm, from about 150 µm to about 175 µm, from about 175 µm to about 200 µm, from about 200 µm to about 225 µm, and from about 225 µm to about 250 µm. Also included within the broader range are embodiments employing particles in ranges of from about 10 µm to about 100 µm, from about 10 µm to about 200 µm, from about 20 µm to about 200 µm, from about 30 µm to about 50 µm, from about 30 µm to about 100 µm, from about 30 µm to about 200 µm, from about 30 µm to about 225 µm, from about 50 µm to about 100 µm, from about 50 µm to about 200 µm, from about 75 µm to about 150 µm, from about 75 µm to about 200 µm, from about 100 µm to about 225 µm, from about 100 µm to about 250 µm, from about 125 µm to about 225 µm, from about 125 µm to about 250 µm, from about 150 µm to about 200 µm, from about 150 µm to about 250 µm, from about 175 µm to about 250 µm, and from about 200 µm to about 250 µm.

First particles may be incorporated into binders at various ratios depending on the binder composition and the first particles' properties. In some embodiments, the first particles may have a content range selected from about 1% to about 60% or more by weight. Included within this broad range are embodiments in which the first particles are present, by weight, in ranges of from about 2% to about 5%, from about 5% to about 10%, from about 10% to about 15%, from about 15% to about 20%, from about 20% to about 25%, from about 25% to about 30%, from about 30% to about 35%, from about 35% to about 40%, from about 40% to about 45%, from about 45% to about 50%, from about 50% to about 55%, from about 55% to about 60%, and greater than 60%. Also included within this broad range are embodiments in which the first particles are present, by weight, in ranges of from about 4% to about 30%, from about 5% to about 25%, from about 5% to about 35%, from about 10% to about 25%, from about 10% to about 30%, from about 10% to about 40%, from about 10% to about 45%, from about 15% to about 25%, from about 15% to about 35%, from about 15% to about 45%, from about 20% to about 30%, from about 20% to about 35%, from about 20% to about 40%, from about 20% to about 45%, from about 20% to about 55%, from about 25% to about 40%, from about 25% to about 45%, from about 25% to about 55%, from about 30% to about 40%, from about 30% to about 45%, from about 30% to about 55%, from about 30% to about 60%, from about 35% to about 45%, from about 35% to about 50%, from about 35% to about 60%, or from about 40% to about 60% on a weight basis.

In some embodiments, where the first particles comprise or consist of glass spheres, the first particles may be present in any of the foregoing ranges or in a range of from about 1% to about 40%, from about 3% to about 45%, from about 10% to about 45%, or from about 2% to about 15% on a weight basis.

In other embodiments, where the first particles are a polyethylene or modified polyethylene, the particles may be present in a content range selected from any of the foregoing ranges, or in a range of from about 3% to about 20%, from about 3% to about 15%, or from about 3% to about 10% on a weight basis.

The incorporation of first particles can lead to a surface that is textured due to the presence of the first particles. In such embodiments, the presence of the first particles results in a surface texture that has elevations on the level of the coating formed. The height of the elevations due to the presence of the first particles can be from 0 (where the first particles are just below the line of the binder surface) to a point where the first particles are almost completely above the level of the binder coating (although they may still be coated with binder). Thus, the presence of first particles can result in a textured surface wherein the first particles cause such elevations in the binder that have maximum heights in a range of up to about 250 µm. Accordingly, such elevations can be present in ranges of from about 1 µm to about 5 µm, from about 1 µm to about 10 µm, from about 1 µm to about 15 µm, from about 1 µm to about 20 µm, from about 1 µm to about 25 µm, from about 1 µm to about 50 µm, from about 1 µm to about 75 µm, from about 1 µm to about 100 µm, from about 1 µm to about 125 µm, from about 1 µm to about 150 µm, from about 1 µm to about 175 µm, from about 1 µm to about 200 µm, from about 1 µm to about 225 µm, from about 1 µm to about 250 µm, from about 10 µm to about 80 µm, from about 15 µm to about 80 µm, from about 20 µm to about 100 µm, and from about 30 µm to about 70 µm.

The surface texture of coatings may also be assessed using the arithmetical mean roughness (Ra) or the ten point mean roughness (Rz) as a measure of the surface texture. In some embodiments, a coating as described herein has an arithmetical mean roughness (Ra) in a range selected from: about 0.2 µm to about 20 µm; about 0.3 µm to about 18 µm; about 0.2 µm to about 8 µm; about 8 µm to about 20 µm; or about 0.5 µm to about 15 µm. In other embodiments, a coating as described herein has a ten point mean roughness (Rz) in a range selected from: about 1 µm to about 90 µm; about 2 µm to about 80 µm; about 3 µm to about 70 µm; about 1 µm to about 40 µm; about 40 µm to about 80 µm; about 10 µm to about 65 µm; or about 20 µm to about 60 µm.

First particles may optionally comprise moieties that make them hydrophobic and/or oleophobic. Where it is desirable to introduce such moieties the particles may be reacted with reagents that covalently bind moieties that make them hydrophobic and/or oleophobic. In some embodiments, the reagents may be silanizing agents, such as those that introduce alkyl, haloalkyl, fluoroalkyl or perfluoroalkyl moieties (functionalities). In some embodiments the silanizing agents are compounds of formula (I) (i.e., $R_{4-n}Si$—$X_n$), and the various embodiments of compounds of formula (I) described below for the treatment of second particles. The surface of many types of first particles can be activated to react with silanizing agents by various treatments including exposure to acids, bases, plasma, and the like, where necessary to achieve functionalization of the particles.

In embodiments described herein, the first particles are not modified by adding functional groups that impart one or more of hydrophobic and/or oleophobic properties to the particles (e.g., properties beyond the properties inherent to the composition forming the particles). In one such embodiment, first particles do not contain covalently bound alkyl, haloalkyl, fluoroalkyl or perfluoroalkyl functionalities (moieties). In another such embodiment, the first particles are not treated with a silanizing agent (e.g., a compound of formula (I)).

4.3 Exemplary Sources of First Particles

First particles may be prepared from the diverse materials described above. Alternatively, first particles may be purchased from a variety of suppliers. Some commercially available first particles that may be employed in the formation of the hydrophobic and/or oleophobic (HP/OP) coatings described herein include those in the accompanying Table I.

TABLE I

| | | | | | | | | |
|---|---|---|---|---|---|---|---|---|
| | | | | First Particles | | | | |
| Filler No. | Filler ID | Filler Type | Filler Details | Density (g/cc) | Particle Size Range (μm) | Color | Crush Strength (psi) | Source | Location |
| 1 | K1 | Glass Bubbles | GPS$^a$ | 0.125 | 30-120 | White | 250 | 3M ™ | St. Paul, MN |
| 2 | K15 | Glass Bubbles | GPS$^a$ | 0.15 | 30-115 | White | 300 | 3M ™ | St. Paul, MN |
| 3 | S15 | Glass Bubbles | GPS$^a$ | 0.15 | 25-95 | White | 300 | 3M ™ | St. Paul, MN |
| 4 | S22 | Glass Bubbles | GPS$^a$ | 0.22 | 20-75 | White | 400 | 3M ™ | St. Paul, MN |
| 5 | K20 | Glass Bubbles | GPS$^a$ | 0.2 | 20-125 | White | 500 | 3M ™ | St. Paul, MN |
| 6 | K25 | Glass Bubbles | GPS$^a$ | 0.25 | 25-105 | White | 750 | 3M ™ | St. Paul, MN |
| 7 | S32 | Glass Bubbles | GPS$^a$ | 0.32 | 20-80 | White | 2000 | 3M ™ | St. Paul, MN |
| 8 | S35 | Glass Bubbles | GPS$^a$ | 0.35 | 10-85 | White | 3000 | 3M ™ | St. Paul, MN |
| 9 | K37 | Glass Bubbles | GPS$^a$ | 0.37 | 20-85 | White | 3000 | 3M ™ | St. Paul, MN |
| 10 | S38 | Glass Bubbles | GPS$^a$ | 0.38 | 15-85 | White | 4000 | 3M ™ | St. Paul, MN |
| 11 | S38HS | Glass Bubbles | GPS$^a$ | 0.38 | 15-85 | White | 5500 | 3M ™ | St. Paul, MN |
| 12 | K46 | Glass Bubbles | GPS$^a$ | 0.46 | 15-80 | White | 6000 | 3M ™ | St. Paul, MN |
| 13 | S60 | Glass Bubbles | GPS$^a$ | 0.6 | 15-65 | White | 10000 | 3M ™ | St. Paul, MN |
| 14 | S60/HS | Glass Bubbles | GPS$^a$ | 0.6 | 11-60 | White | 18000 | 3M ™ | St. Paul, MN |
| 15 | A16/500 | Glass Bubbles | Floated Series | 0.16 | 35-135 | White | 500 | 3M ™ | St. Paul, MN |
| 16 | A20/1000 | Glass Bubbles | Floated Series | 0.2 | 30-120 | White | 1000 | 3M ™ | St. Paul, MN |
| 17 | H20/1000 | Glass Bubbles | Floated Series | 0.2 | 25-110 | White | 1000 | 3M ™ | St. Paul, MN |
| 18 | D32/4500 | Glass Bubbles | Floated Series | 0.32 | 20-85 | White | 4500 | 3M ™ | St. Paul, MN |
| 19 | H50/10000 EPX | Glass Bubbles | Floated Series | 0.5 | 20-60 | White | 10000 | 3M ™ | St. Paul, MN |
| 20 | iMK | Glass Bubbles | Floated Series | 0.6 | 8.6-26.7 | White | 28000 | 3M ™ | St. Paul, MN |
| 21 | G-3125 | Z-Light Spheres ™ | CM$^b$ | 0.7 | 50-125 | Gray | 2000 | 3M ™ | St. Paul, MN |
| 22 | G-3150 | Z-Light Spheres ™ | CM$^b$ | 0.7 | 55-145 | Gray | 2000 | 3M ™ | St. Paul, MN |
| 23 | G-3500 | Z-Light Spheres ™ | CM$^b$ | 0.7 | 55-220 | Gray | 2000 | 3M ™ | St. Paul, MN |
| 24 | G-600 | Zeeo-spheres ™ | CM$^b$ | 2.3 | 1-40 | Gray | >60000 | 3M ™ | St. Paul, MN |
| 25 | G-800 | Zeeo-spheres ™ | CM$^b$ | 2.2 | 2-200 | Gray | >60000 | 3M ™ | St. Paul, MN |
| 26 | G-850 | Zeeo-spheres ™ | CM$^b$ | 2.1 | 12-200 | Gray | >60000 | 3M ™ | St. Paul, MN |
| 27 | W-610 | Zeeo-spheres ™ | CM$^b$ | 2.4 | 1-40 | White | >60000 | 3M ™ | St. Paul, MN |
| 28 | SG | Extendo-sphere ™ | HS$^c$ | 0.72 | 30-140 | Gray | 2500 | Sphere One | Chattanooga, TN |
| 29 | DSG | Extendo-sphere ™ | HS$^c$ | 0.72 | 30-140 | Gray | 2500 | Sphere One | Chattanooga, TN |
| 30 | SGT | Extendo-sphere ™ | HS$^c$ | 0.72 | 30-160 | Gray | 2500 | Sphere One | Chattanooga. TN |
| 31 | TG | Extendo-sphere ™ | HS$^c$ | 0.72 | 8-75 | Gray | 2500 | Sphere One | Chattanooga, TN |
| 32 | SLG | Extendo-sphere ™ | HS$^c$ | 0.7 | 10-149 | Off White | 3000 | Sphere One | Chattanooga, TN |
| 33 | SLT | Extendo-sphere ™ | HS$^c$ | 0.4 | 10-90 | Off White | 3000 | Sphere One | Chattanooga, TN |
| 34 | SL-150 | Extendo-sphere ™ | HS$^c$ | 0.62 | 70 | Cream | 3000 | Sphere One | Chattanooga, TN |
| 35 | SLW-150 | Extendo-sphere ™ | HS$^c$ | 0.68 | 8-80 | White | 3000 | Sphere One | Chattanooga, TN |
| 36 | HAT | Extendo-sphere ™ | HS$^c$ | 0.68 | 10-165 | Gray | 2500 | Sphere One | Chattanooga, TN |

TABLE I-continued

First Particles

| Filler No. | Filler ID | Filler Type | Filler Details | Density (g/cc) | Particle Size Range (μm) | Color | Crush Strength (psi) | Source | Location |
|---|---|---|---|---|---|---|---|---|---|
| 37 | HT-150 | Extendo-sphere ™ | HS$^c$ | 0.68 | 8-85 | Gray | 3000 | Sphere One | Chattanooga, TN |
| 38 | KLS-90 | Extendo-sphere ™ | HS$^c$ | 0.56 | 4-05 | Light Gray | 1200 | Sphere One | Chattanooga, TN |
| 39 | KLS-125 | Extendo-sphere ™ | HS$^c$ | 0.56 | 4-55 | Light Gray | 1200 | Sphere One | Chattanooga, TN |
| 40 | KLS-150 | Extendo-sphere ™ | HS$^c$ | 0.56 | 4-55 | Light Gray | 1200 | Sphere One | Chattanooga, TN |
| 41 | KLS-300 | Extendo-sphere ™ | HS$^c$ | 0.56 | 4-55 | Light Gray | 1200 | Sphere One | Chattanooga, TN |
| 42 | HA-300 | Extendo-sphere ™ | HS$^c$ | 0.68 | 10-146 | Gray | 2500 | Sphere One | Chattanooga, TN |
| 43 | XIOM 512 | Thermo-plastic | MPR$^d$ | 0.96 | 10-100 | White | 508 | XIOM Corp. | West Babylon, NY |
| 44 | XIOM 512 | Thermo-plastic | MPR$^d$ | 0.96 | 10-100 | Black | 508 | XIOM Corp. | West Babylon, NY |
| 45 | CORVEL ™ Black 78-7001 | Thermo-plastic | Nylon Powder Coating | 1.09 | 44-74 | Black | | ROHM & HASS | Philadelphia, PA |
| 46 | Microglass 3082 | Fibers | MMEGF$^e$ | 1.05 | 16X120 | White | | Fibertec | Bridgewater, MA |
| 47 | Microglass 9007D | Fibers Silane-Treated | MMEGF$^e$ | 0.53 | 10X150 | White | | Fibertec | Bridgewater, MA |

4.4 Second Particles

Embodiments of the coatings disclosed herein also may employ second particles (e.g., nanoparticles), including those which bear hydrophobic moieties. A variety of second particles can be used to prepare the hydrophobic coatings applied to the plungers described herein. Suitable second particles have a size from about 1 nanometer (nm) to about 25 μm and are capable of binding covalently to one or more chemical moieties that provide the second particles, and the coatings into which they are incorporated, hydrophobicity and, when selected to include fluoroalkyl groups, oleophobicity.

In some embodiments the second particles may have an average size in a range selected from about 1 nm to about 25 μm or more. Included within this broad range are embodiments in which the second particles have an average size in a range of from about 1 nm to about 10 nm, from about 10 nm to about 25 nm, from about 25 nm to about 50 nm, from about 50 nm to about 100 nm, from about 100 nm to about 250 nm, from about 250 nm to about 500 nm, from about 500 nm to about 750 nm, from about 750 nm to about 1 μm, from about 1 μm to about 5 μm, from about 5 μm to about 10 μm, from about 10 μm to about 15 μm, from about 15 μm to about 20 μm, from about 20 μm to about 25 μm, from about 1 nm to about 100 nm, from about 2 nm to about 200 nm, from about 10 nm to about 200 nm, from about nm to about 400 nm, from about 10 nm to about 500 nm; from about 40 nm to about 800 nm, from about 100 nm to about 1 μm, from about 200 nm to about 1.5 μm, from about 500 nm to about 2 μm, from about 500 nm to about 2.5 μm, from about 1 μm to about 10 μm, from about 2 μm to about 20 μm, from about 2.5 μm to about 25 μm, from about 500 nm to about 25 μm, from about 400 nm to about 20 μm, from about 100 nm to about 15 μm, from about 1 nm to about 50 nm, from about 1 nm to about 400 nm, from about 1 nm to about 500 nm, from about 2 nm to about 120 nm, from about 5 nm to about 100 nm, from about 5 nm to about 200 nm, from about 5 nm to about 400 nm, from about 10 nm to about 300 nm, or from about 20 nm to about 400 nm.

In the above-mentioned embodiments, the lower size of second particles may be limited to particles greater than about 20 nm, about 25 nm, about 30 nm, about 35 nm, about 40 nm, about 45 nm, about 50 nm, or about 60 nm; and the upper size of second particles may be limited to particles less than about 20 μm, about 10 μm, about 5 μm, about 1 μm, about 0.8 μm, about 0.6 μm, about 0.5 μm, about 0.4 μm, about 0.3 μm or about 0.2 μm. Limitations on the upper and lower size of second particles may be used alone or in combination with any of the above-recited size limits on particle composition, percent composition in the coatings, etc.

In some embodiments, the coatings may contain first particles in any of the above-mentioned ranges subject to either the proviso that the coatings do not contain only particles (e.g., first or second particles) with a size of 25 μm or less, or the proviso that the coatings do not contain more than an insubstantial amount of particles with a size of 25 μm or less (recognizing that separation processes for particles of size that is greater than 25 μm may ultimately provide an unintended, insubstantial amount of particles that are 25 μm or less).

In other embodiments, first particles have an average size greater than 30 μm and less than 250 μm, and do not contain substantial amounts of particles (e.g., first and second particles) with a size of 30 μm or less. In yet other embodiments, the coatings do not contain only particles (e.g., first and second particles) with a size of 40 μm or less, or particles with a size of 40 μm or less in substantial amounts. And in still other embodiments, the coatings do not contain only particles (e.g., first and second particles) with a size of 50 μm or less, or particles with a size of 50 μm or less in substantial amounts.

In other embodiments, such as where the second particles are prepared by fuming (e.g., fumed silica or fumed zinc oxide), the second particles may have an average size in a range selected from about 1 nm to about 50 nm; about 1 nm to about 100 nm; about 1 nm to about 400 nm; about 1 nm to about 500 nm; about 2 nm to about 120 nm; about 5 nm to about 100 nm; about 5 nm to about 200 nm; about 5 nm to about 400 nm; about 10 nm to about 300 nm; or about 20 nm to about 400 nm.

Second particles having a wide variety of compositions may be employed in the durable coatings described and employed herein. In some embodiments the second particles will be particles comprising metal oxides (e.g., aluminum oxides such as alumina, zinc oxides, nickel oxides, zirconium oxides, iron oxides, or titanium dioxides), or oxides of metalloids (e.g., oxides of B, Si, Sb, Te and Ge) such as glass, silicates (e.g., fumed silica), or particles comprising agent, a siloxane or a silazane. In some embodiments, the second particles may be prepared by fuming (e.g., fumed silica or fumed zinc oxide).

4.5 Some Sources of Second Particles

Second particles such as fumed silica may be purchased from a variety of suppliers, including but not limited to Cabot Corp., Billerica, Mass. (e.g., Nanogel® TLD201, CAB-O-SIL® TS-720, and M5 (untreated silica)) and Evonik Industries, Essen, Germany (e.g., ACEMATT® silica such as untreated HK400, AEROXIDE® TiO$_2$ titanium dioxide, and AEROXIDE® Alu alumina).

Some commercially available second particles are set forth in Scheme I.

Scheme I

| COB-O-SIL Grade | Surface Treatment | Level of Treatment | Nominal BET Surface Area of Base Silica (m$^2$/g) |
|---|---|---|---|
| M-5 | None | None | 200 |
| TS-610 | Dimethyldichlorosilane | Intermediate | 130 |
| TS-530 | Hexamethyldisilazane | High | 320 |
| TS-382 | Octyltrimethoxysilane | High | 200 |
| TS-720 | Polydimethylsilixone | High | 200 |

Data from Cabot Corp. website.

Dimethyldichlorosilane

Hexamethyldisilazane

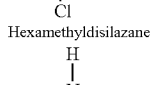

Polydimethylsiloxane

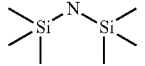

Octyltrimethoxysilane

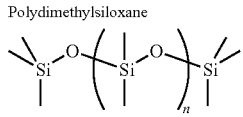

combinations thereof. The particles are treated to introduce one or more moieties (e.g., groups or components) that impart hydrophobicity and/or oleophobicity to the particles, either prior to incorporation into the compositions that will be used to apply coatings or after incorporation into the coatings. In some embodiments, the second particles are treated with a silanizing agent, a siloxane or a silazane to incorporate groups that will provide hydrophobic and/or oleophobic properties to the particles (in addition to any such properties already possessed by the particles). When treated after incorporation into the coatings, only those particles at or near the surface that can be contacted with suitable agents such as silanizing agents will have moieties that impart hydrophobicity and/or oleophobicity associated with them.

In some embodiments, second particles are silica (silicates), alumina (e.g., Al$_2$O$_3$), titanium oxide, or zinc oxide, that are optionally treated with a silanizing agent.

In other embodiments, the second particles are silica (silicates), glass, alumina (e.g., Al$_2$O$_3$), titanium oxide, or zinc oxide, which optionally may be treated with a silanizing As purchased, the second particles may be untreated (e.g., M5 silica) and may not posses any HP/OP properties. Such untreated particles can be treated to covalently attach one or more groups or moieties to the particles that give them HP/OP properties, for example, by treatment with the silanizing agents discussed above.

5.0 HYDROPHOBIC AND OLEOPHOBIC MOIETIES OF FIRST AND/OR SECOND PARTICLES

As discussed above, both the first and second particles may comprise one or more independently selected moieties that impart hydrophobic and/or oleophobic properties to the particles, and the coatings into which they are incorporated. As also noted above, such chemical entities may be inherently associated with the particles themselves and/or added by way of treating the particles. Although first particles may be treated to make them hydrophobic and/or oleophobic either before or after incorporation into the coating compositions described herein, the second particles typically will be treated with agents that introduce such moieties before being incorporated into the coatings described herein. It is also possible to treat the coating after it is applied to a surface with agents that modify the second particles and introduce hydrophobic and/or oleophobic properties. In such circumstances, other components of the coating (e.g., the binder or first particles) may also become modified by the agent.

In some embodiments, the second particles will bear one or more alkyl, haloalkyl, fluoroalkyl, and perfluoroalkyl moieties. Such moieties can be covalently bound directly or indirectly to the second particles, such as through one or more intervening silicon or oxygen atoms.

In other embodiments, the second particles will bear one or more alkyl, haloalkyl, fluoroalkyl, and perfluoroalkyl moieties of the formula $R_{3-n}Si-$, where n is from 1-3, that are directly or indirectly (e.g., covalently) bound to the second particles, such as through one or more intervening atoms.

5.1 Silanizing Agents and their Use

A variety of silanizing agents (e.g., compounds of the formula $R_{4-n}Si-X_n$) can be employed to introduce moieties, e.g., $R_{3-n}Si-$ groups (where n is an integer from 0 to 2), to the first or second particles prior to or subsequent to their introduction into the coatings described herein. Suitable silanizing agents typically have both leaving groups and terminal functionalities. Terminal functionalities are groups that are not displaced by reaction of a silanizing agent with silica second particles (e.g., R groups of compounds of the formula (I)). Leaving groups are those groups that are displaced from silanizing agents upon reaction to form bonds with the second particles.

Prior to reacting first or second particles with silanizing agents, the particles may be treated with an agent that will increase the number of sites available for reaction with the silanizing agent (e.g., $SiCl_4$, $Si(OMe)_4$, $Si(OEt)_4$, $SiCl_3CH_3$, $SiCl_3CH_2SiCl_3$, $SiCl_3CH_2CH_2SiCl_3$, $Si(OMe)_3CH_2Si(OMe)_3$, $Si(OMe)_3CH_2CH_2Si(OMe)_3$, $Si(OEt)_3CH_2Si(OEt)_3$, or $Si(OEt)_3CH_2CH_2Si(OEt)_3$ and the like). Treatment with such agents is conducted, e.g., with a 1% to 5% solution of the agent in a suitable solvent (e.g., hexane), although higher concentrations may be employed (e.g., about 5% to about 10%). Where agents such as $SiCl_4$ or $Si(OMe)_4$ are employed to increase the number of sites available for reaction with silanizing agents, the surface may first be treated with $SiCl_4$ followed by reaction with water to replace the chlorines with OH groups that react effectively with silanizing agents such as those of formula (I). Reaction with silanizing agents is typically conducted using a silanizing agent in the range of about 1% to about 2% w/v, although concentrations in the range of about 2% to about 5% w/v may also be used. Depending on the reagents employed, the reaction, which often can be conducted at room temperature, is typically conducted for 1 hour to 6 hours, although reaction for as long as 24 hours may be desirable in some instances. Skilled artisans will appreciate that concentrations and reaction times and conditions other than those described above also might be able to be used.

In some embodiments, silanizing agents are compounds of the formula (I):

$$R_{4-n}Si-X_n \qquad (I)$$

where n is an integer from 1-3;
each R is independently selected from
  (i) alkyl or cycloalkyl group optionally substituted with one or more fluorine atoms,
  (ii) $C_{1\ to\ 20}$ alkyl optionally substituted with one or more independently selected substituents selected from fluorine atoms and $C_{6-14}$ aryl groups, which aryl groups are optionally substituted with one or more independently selected halo, $C_{1\ to\ 10}$ alkyl, $C_{1\ to\ 10}$ haloalkyl, $C_{1\ to\ 10}$ alkoxy, or $C_{1\ to\ 10}$ haloalkoxy substituents,
  (iii) $C_{6\ to\ 20}$ alkyl ether optionally substituted with one or more substituents independently selected from fluorine and $C_{6\ to\ 14}$ aryl groups, which aryl groups are optionally substituted with one or more independently selected halo, $C_{1\ to\ 10}$ alkyl, $C_{1\ to\ 10}$ haloalkyl, $C_{1\ to\ 10}$ alkoxy, or $C_{1\ to\ 10}$ haloalkoxy substituents,
  (iv) $C_{6\ to\ 14}$ aryl, optionally substituted with one or more substituents independently selected from halo or alkoxy, and haloalkoxy substituents;
  (v) $C_{4\ to\ 20}$ alkenyl or $C_{4\ to\ 20}$ alkynyl, optionally substituted with one or more substituents independently selected from halo, alkoxy, or haloalkoxy; and
  (vi) $-Z-((CF_2)_q(CF_3))_r$, wherein Z is a $C_{1\ to\ 12}$ divalent alkane radical or a $C_{2-12}$ divalent alkene or alkyne radical, q is an integer from 1 to 12, and r is an integer from 1-4;
each X is an independently selected $-H$, $-Cl$, $-I$, $-Br$, $-OH$, $-OR^2$, $-NHR^3$, or $-N(R^3)_2$ group;
each $R^2$ is an independently selected $C_{1\ to\ 4}$ alkyl or haloalkyl group; and
each $R^3$ is an independently selected H, $C_{1\ to\ 4}$ alkyl, or haloalkyl group.

In some embodiments, R is an alkyl or fluoroalkyl group having from 6 to 20 carbon atoms.

In other embodiments, R is an alkyl or fluoroalkyl group having from 8 to 20 carbon atoms.

In other embodiments, R is an alkyl or fluoroalkyl group having from 10 to 20 carbon atoms.

In other embodiments, R is an alkyl or fluoroalkyl group having from 6 to 20 carbon atoms and n is 3.

In other embodiments, R is an alkyl or fluoroalkyl group having from 8 to 20 carbon atoms and n is 3.

In other embodiments, R is an alkyl or fluoroalkyl group having from 10 to 20 carbon atoms and n is 3.

In other embodiments, R has the form $-Z-((CF_2)_q(CF_3))_r$, wherein Z is a $C_{1\ to\ 12}$ divalent alkane radical or a $C_{2\ to\ 12}$ divalent alkene or alkyne radical, q is an integer from 1 to 12, and r is an integer from 1 to 4.

In any of the previously mentioned embodiments of compounds of formula (I), the value of n may be varied such that 1, 2 or 3 independently selected terminal functionalities are present in compounds of formula (I). Thus, in some embodiments, n is 3. In other embodiments, n is 2, and in still other embodiments, n is 1.

In any of the previously mentioned embodiments of compounds of formula (I), all halogen atoms present in any one or more R groups may be fluorine.

In any of the previously mentioned embodiments of compounds of formula (I), X may be independently selected from H, Cl, $-OR^2$, $-NHR^3$, $-N(R^3)_2$, or combinations thereof. In other embodiments, X may be selected from Cl, $-OR^2$, $-NHR^3$, $-N(R^3)_2$, or combinations thereof. In still other embodiments, X may be selected from $-Cl$, $-NHR^3$, $-N(R^3)_2$ or combinations thereof.

Any coating described herein may be prepared with one, two, three, four or more compounds of formula (I) employed alone or in combination to modify the first or second particles, and/or other components of the coating. For example, the same or different compounds of formula (I) may be employed to modify both the first particles and the binder.

The use of silanizing agents of formula (I) to modify first or second particles, or any of the other components of the coatings, will introduce one or more $R_{3-n}X_nSi$— groups (e.g., $R_3Si$—, $R_2X_1Si$—, or $RX_2Si$— groups) where R and X are as defined for a compound of formula (I). The value of n is 0, 1, or 2, due to the displacement of at least one "X" substituent and formation of at least one bond between a particle and the Si atom (the bond between the particle and the silicon atom is indicated by a dash "-" (e.g., $R_3Si$—, $R_2X_1Si$—, or $RX_2Si$— groups).

Exemplary reagents that can be employed to prepare first or second particles with hydrophobic and/or oleophobic properties include silanizing agents such as those that are commercially available from Gelest, Inc., Morrisville, Pa. Such silanizing agents include, but are not limited to, the following compounds, which are identified by their chemical name followed by the commercial supplier reference number (e.g., their Gelest reference in parentheses): (tridecafluoro-1,1,2,2-tetrahydrooctyl)silane (SIT8173.0); (tridecafluoro-1,1,2,2-tetrahydrooctyl)trichlorosilane (SIT8174.0); (tridecafluoro-1,1,2,2-tetrahydrooctyl)triethoxysilane (SIT8175.0); (tridecafluoro-1,1,2,2-tetrahydrooctyl)trimethoxysilane (SIT8176.0); (heptadecafluoro-1,1,2,2-tetrahydrodecyl)dimethyl(dimethylamino)silane (SIH5840.5); (heptadecafluoro-1,1,2,2-tetrahydrodecyl)tris (dimethylamino)silane (SIH5841.7); n-octadecyltrimethoxysilane (SIO06645.0); n-octyltriethoxysilane (SIO06715.0); and nonafluorohexyldimethyl(dimethylamino)silane (SIN6597.4).

Two attributes of silanizing agents that may be considered for the purposes of their reaction with first or second particles and the introduction of hydrophobic or oleophobic moieties are the leaving group (e.g., X groups of compounds of the formula (I)) and the terminal functionality (e.g., R groups of compounds of the formula (I)). A silanizing agent's leaving group(s) can determine the reactivity of the agent with the first or second particle(s) or other components of the coating. Where the first or second particles are a silicate (e.g., fumed silica) the leaving group can be displaced to form Si—O—Si bonds. Leaving group effectiveness is ranked in the decreasing order as chloro>methoxy>hydro (H)>ethoxy (measured as trichloro>trimethoxy>trihydro>triethoxy). This ranking of the leaving groups is consistent with their bond dissociation energy. The terminal functionality determines the level of hydrophobicity that results from application of the silane to the surface.

In addition to the silanizing agents recited above, a variety of other silanizing agents can be used to alter the properties of first or second particles and to provide hydrophobic and/or oleophobic properties. In some embodiments, second particles may be treated with an agent selected from dimethyldichlorosilane, hexamethyldisilazane, octyltrimethoxysilane, polydimethylsiloxane, or tridecafluoro-1,1,2,2-tetrahydrooctyl trichlorosilane. In such embodiments, the second particles may be silica. Silica second particles treated with such agents may have an average size in a range selected from about 1 nm to about 50 nm, from about 1 nm to about 100 nm, from about 1 nm to about 400 nm, from about 1 nm to about 500 nm, from about 2 nm to about 120 nm, from about 5 nm to about 150 nm, from about 5 nm to about 400 nm, from about 10 nm to about 300 nm, from about 20 nm to about 400 nm, or from about 50 nm to about 250 nm.

In addition to the silanizing agents recited above, which can be used to modify any one or more components of coatings (e.g., first and/or second particles), other agents can be employed including, but not limited to, one or more of: gamma-aminopropyltriethoxysilane, Dynasylan® A (tetraethylorthosilicate), hexamethyldisilazane, and Dynasylan® F 8263 (fluoroalkylsilane), any one or more of which may be used alone or in combination with the silanizing agent recited herein.

5.2 Use of Compounds Other than Silanizing Agents

Other agents also can be used to introduce hydrophobic and/or oleophobic moieties into second particles. The choice of such agents will depend on the functionalities available for forming chemical (covalent) linkages between hydrophobic/oleophobic moieties and the functional groups present on the surface of the second particles. For example, where second particle surfaces have, or can be modified to have, hydroxyl or amino groups, then acid anhydrides and acid chlorides of alkyl, fluoroalkyl, and perfluoroalkyl compounds may be employed (e.g., the acid chlorides: Cl—C$(O)(CH_2)_{4\ to\ 18}CH_3$; Cl—C$(O)(CH_2)_{4-10}(CF_2)_{2\ to\ 14}CF_3$; Cl—C$(O)(CF_2)_{4\ to\ 18}CF_3$ or the anhydrides of those acids).

5.3 Preparation of Plungers with Hydrophobic and Oleophobic Coatings.

As noted above, in addition to the hydrophobicity displayed against aqueous-based solutions, suspensions, and emulsions, the coatings described herein also have the ability to display oleophobic behavior, thereby further reducing the ability of materials destined for the sewer to attach to the surface of coated plungers. Oleophobicity will be exhibited by embodiments described herein, particularly when the coatings comprise fluorinated or perfluorinated alkyl groups bound to first or second particles (e.g., where the terminal functionality, that is the R group(s), of a silane of the formula $R_{4-n}Si$—$X_n$, are fluorinated alkyl or perfluoroalkyl).

Figure 3:
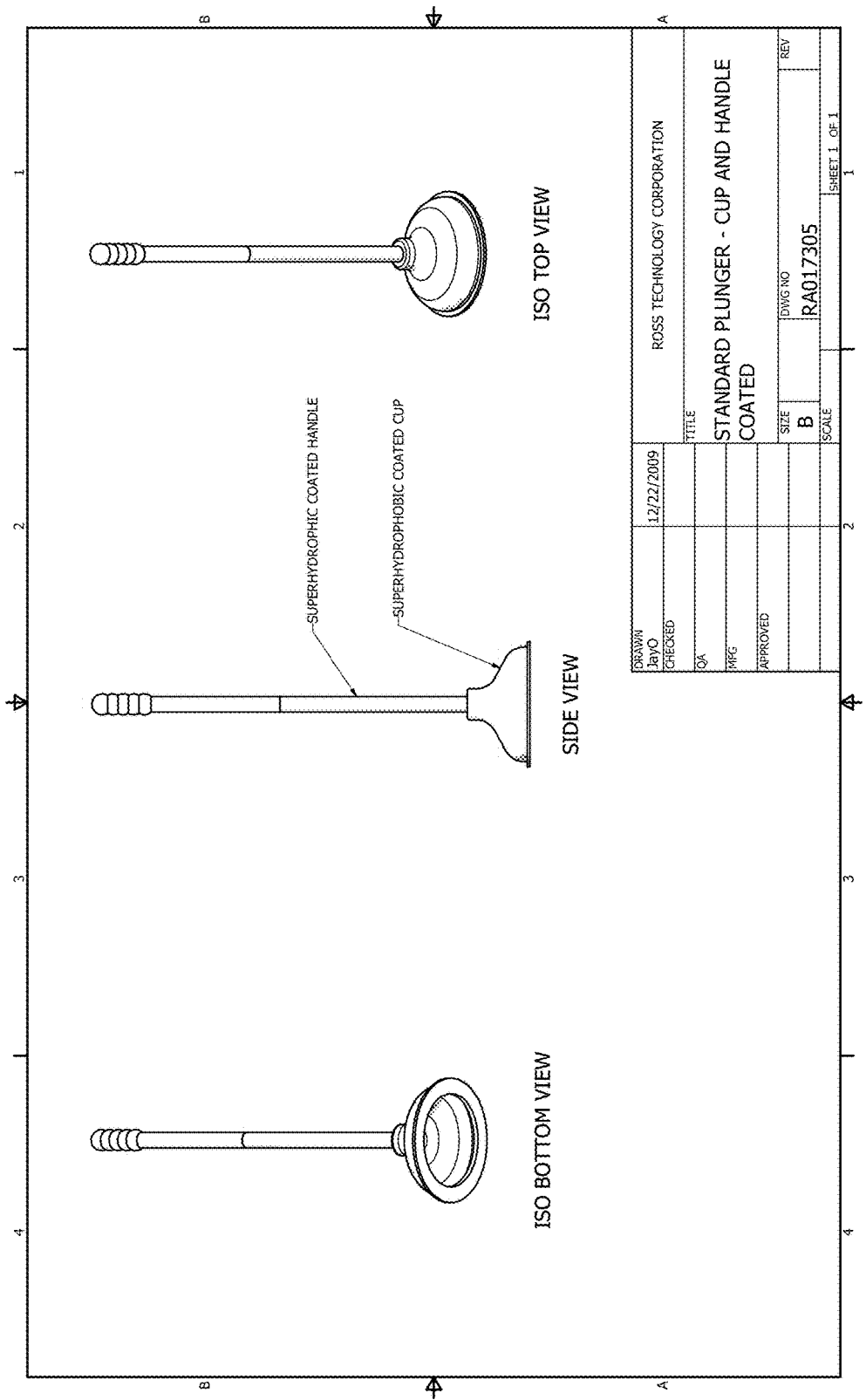
FIG. 3 shows an embodiment of a plunger with a hydrophobic (superhydrophobic) coating applied to the cup and a portion (about one-half of the length) of the handle.
Figure 4:
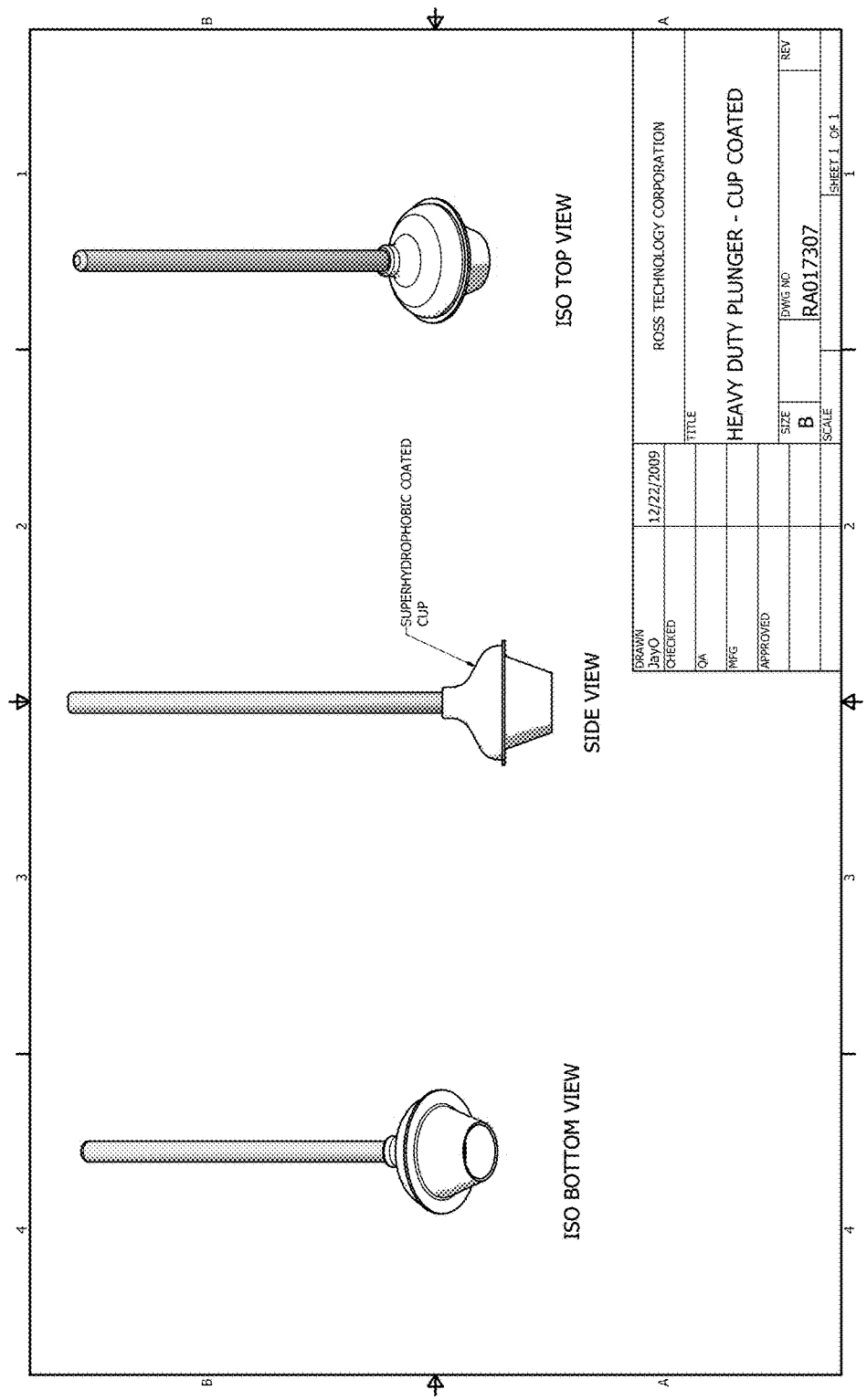
FIG. 4 shows another embodiment of a plunger with a hydrophobic (superhydrophobic) coating applied to the cup.
Figure 5:
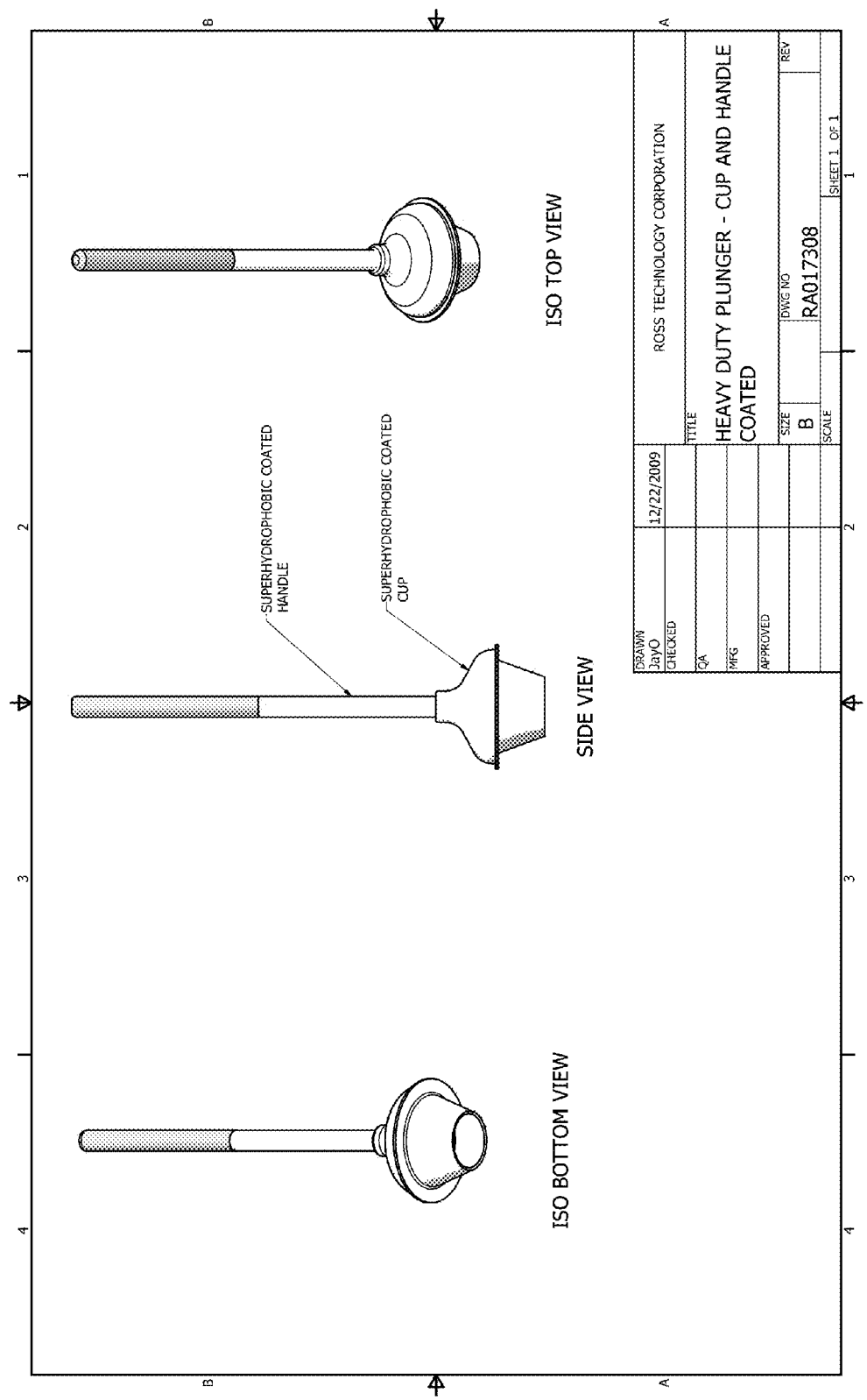
FIG. 5 shows another embodiment of an industrial plunger with a hydrophobic (superhydrophobic) coating applied to the cup and a portion of the handle.

6.0 METHODS OF APPLYING HYDROPHOBIC AND OLEOPHOBIC COATINGS 6.1 Portion of the Plunger Coated All or only a portion of the cup and/or handle may be coated with a hydrophobic coating according to this disclosure. As the cup is the portion of the plunger with the most surface area that contacts standing water and other materials that are to enter sewage lines, in some embodiments the cup is the only portion of the plunger that is coated with a hydrophobic coating. Likewise, as only a part of the handle is typically immersed in water during the unclogging operation, in other embodiments only the cup and the part of the handle closest to the cup are treated to provide them with a hydrophobic surface (e.g., by coating them). In some embodiments, less than one-half of the handle's length will be treated, and in other embodiments greater than one-half of the handle will be treated. In yet other embodiments, the entire plunger (the cup and handle) is treated/coated so that the surface of the plunger is hydrophobic. The application of hydrophobic coatings to household and industrial plungers are illustrated in FIGS. 3-5.

6.2 Application of Coatings by One-Step and Two-Step Processes

The hydrophobic coatings described herein may be applied to substrates (e.g., the surface of one or more parts of a plunger) using a variety of techniques, some of which can be grouped into one-step processes and two-step processes. Within each of those categories numerous variations may be employed.

In one-step embodiments, the coating composition is substantially applied in a single step to the surfaces of an object (e.g., a plunger) on which a hydrophobic surface is desired, although coatings applied by a one-step method may subsequently be treated in one or more steps with one or more agents to increase the hydrophobicity of the coating or to effect some other modification of the properties of the hydrophobic coating or plunger. Exemplary coating compositions that can be applied in one step comprise a binder and at least one type of first particle and at least one type of second particle bearing a hydrophobic moiety. In some such embodiments, the coating may be treated with an agent that comprises a silanizing agent (e.g., compositions comprising a compound of formula (I)). In other embodiments, hydrophobic coating compositions that comprise a binder and a first particle may be applied in a single step and subsequently treated by an agent comprising second particles according to this disclosure that, for example, bear hydrophobic and/or oleophobic chemical moieties such as fluoroalkyl groups.

In one embodiment, a one-step method of applying a coating to a substrate comprises applying a coating composition comprising: i) a binder; ii) first particles having a size of about 30 μm to about 225 μm; and iii) second particles having a size of about 1 nm to about 25 μm and bearing hydrophobic moieties. Optionally, one or more independently selected alkyl, haloalkyl, or perfluoroalkyl groups may be covalently bound, either directly or indirectly, to the second particles prior to their incorporation into the coating composition. One-step coating compositions may be diluted with any compatible solvents/liquids to assist in the application process.

In two-step methods, the coating composition is applied to a surface in two steps that comprise, respectively, the application of a first composition followed by the application of a second composition. In embodiments of a two-step method, the first composition comprises a binder and at least one type of first particles, and does not contain second particles that bear hydrophobic moieties. Once applied to the substrate, the first coating composition is termed a "substrate coating" or a "base coat(ing)." Following the application of the first coating composition, a second composition that is sometimes referred to as a "second coat(ing)" or "top coat(ing)" is applied to the base coating. The second composition comprises second particles bearing hydrophobic moieties (e.g., alkyl or fluoroalkyl groups such as those introduced by reacting second particles with silanizing agents such as those of formula (I)).

In another embodiment a two-step method of forming a coating on at least a portion of a surface comprises: i) applying a composition comprising a binder to said surface, and ii) applying to said binder on said surface second particles having a size of about 1 nm to about 25 μm, wherein said second particles comprise one or more independently selected hydrophobic or oleophobic moieties; and wherein said applying to said binder comprises spray coating said second particles using a stream of gas (the second particles typically comprise less than about 2% by weight of a VOC (e.g., a volatile solvent with a boiling point below 150° or 200° C. at 1 atmosphere such as hexane, ethanol, and the like). In one variation of that method the composition comprising a binder further comprises first particles. In such an embodiment the first particles may have a size of about 1 μm to about 100 μm or of about 30 μm to about 225 μm (either average diameter or minimum diameter in any dimension). First particles, and their dimensions, are described elsewhere in this disclosure.

Second particles applied as part of the second coating composition in a two-step method may be applied either as a suspension in a suitable solvent that is compatible with the binder system (e.g., hexane, xylene, and ethanol) or without a solvent using a spray gun (air spray gun) supplied with a suitable supply of compressed air, nitrogen, or other compressed gas (e.g., a Binks Model 2001 or 2001V air spray gun; Binks, Inc., Glendale Heights, Ill., supplied with air at about 50 psi may be employed).

In some embodiments a two-step method of applying a coating to a substrate comprises:
 a) applying to the substrate a coating composition comprising i) a binder and ii) first particles having a size of about 30 μm to about 225 μm, to provide a base coating; and
 b) applying to this base coating a composition containing second particles having a size of about 1 nm to about 25 μm.

The composition may also contain any necessary solvents/liquids to assist in the application process.

In one embodiment, the present specification includes and provides for a method of forming a hydrophobic coating on at least a portion of a surface comprising: i) applying a composition comprising a binder on said surface and ii) applying to said binder on said surface second particles having a size of about 1 nm to about 25 μm wherein said second particles comprise one or more independently selected hydrophobic or oleophobic moieties; wherein said applying to said binder comprises spray coating of said second particles using a stream of gas; and wherein said second particles comprise less than 2% by weight of a solvent.

In another embodiment, the present specification includes and provides for a method of forming a hydrophobic coating on at least a portion of a surface comprising: i) applying a composition comprising a binder and first particles on said surface and ii) applying to said binder and first particles on said surface second particles having a size of about 1 nm to about 25 μm, wherein said second particles comprise one or more independently selected hydrophobic or oleophobic moieties; wherein said applying to said binder and first particles comprises spray coating of said second particles using a stream of gas; and wherein said second particles comprise less than 2% by weight of a solvent.

In one-step or two-step processes, the coatings may be applied using high or low VOC compositions (e.g., water-based or aqueous binder compositions etc.). Where two-step processes are used, either the first step of applying the base coat, the second step of applying a composition comprising second particles, or both steps may employ low VOC compositions. Where high VOC compositions are employed for hydrophobic/oleophobic surfaces, it can be advantageous to employ equipment that can capture the volatile solvents and reuse or recycle them.

Coatings applied by a one-step or two-step method may subsequently be treated with compositions comprising one or more agents to increase the hydrophobicity of the coating. In one embodiment, the agent is a silanizing agent (e.g., the compositions comprising a compound of formula (I)). In another embodiment, the coating resulting from a one-step process can be treated with a composition comprising second particles that have been treated so that they bear hydrophobic moieties (e.g., hydrophobic moieties or groups such as fluoroalkyl groups or dimethylsiloxanes). Where the coatings applied in one-step or two-step processes have not dried to the point that second particles can be incorporated, subsequent applications of second particles may be applied either in a binder compatible solvent, or with an air gun in the absence of a solvent as with the second step of a two-step process described above. In contrast, where coatings resulting from one-step or two-step processes have already dried to the point where second particles cannot be incorporated into the coating in any significant amount (e.g., an amount capable of altering the hydrophobicity of the coatings), second particles are generally applied in binder compatible solvents.

Coatings may be applied to substrates, or base coatings previously applied to substrates, by any method known in the art, including but not limited to: brushing, painting, dipping, spin coating, spraying, or electrostatic spraying.

6.3 Surface Preparation

To provide good adhesion of coatings (e.g., the base coat of a two-step coating) to a surface (e.g., the cup and handle parts of the plunger), the surfaces may be abraded to create some degree of surface roughness. For plungers, the surface roughness of the cup and handle can be created by methods including: (1) scuffing with an abrasive pad (e.g., Scotch-Brite™ pads), (2) fine sandblasting, (3) tumble blasting with small steel balls, and (4) coarse sandblasting. The surface roughness produced by different methods can be compared with the starting surface roughness. The surface roughness measured using a Mahr Pocket Surf® PS1 (Mahr Federal Inc., Providence, R.I.) can be expressed using a variety of mathematical expressions including, but not limited to, the arithmetical mean roughness (Ra) and ten-point mean roughness (Rz), which are described in FIG. 6.

Scuffing with abrasive materials such as Scotch-Brite™ pads increases the roughness values of plastics, such as those used in plunger handles, from an Ra of about 0.2-0.3 µm to about 0.7-0.9 µm and an Rz from about 1.4 to about 7 µm. Sandblasting plastics with coarse sand produces a very rough surface where the Ra increases substantially into the range of about 5 to about 6 µm and the Rz increases to the range of about 30 to about 37 µm.

The surface of flexible materials, such as the cup of the plunger, can also be abraded to improve the adherence of the hydrophobic coatings. Scuffing with abrasive materials (e.g. Scotch-Brite™ pads) can increase the Ra of flexible materials such as rubber from the range of about 0.2 to about 0.35 µm to the range of about 0.4 to about 0.5 µm and the Rz from about 2 µm to the range of about 3 to about 4 µm. Fine sandblasting of flexible materials, such as rubber, increases the Ra into the range from about 0.60 to about 0.75 µm and the Rz from about 2 µm to the range from about 6 to about 7 µm. Tumbling with small steel balls can increase the Ra from about 0.28 µm to the range of about 0.3 to about 0.4 µm and the Rz from about 2.043 to about 3.28 µm. Coarse sandblasting increases the Ra from 0.3 µm to the range of about 5 to about 6 µm and the Rz to the range of about 30 to about 35 µm.

The adhesion of the base coat to the plunger cup and handle is increased by any level of roughening. However, the surface roughness produced by coarse sandblasting with Ra values of about 5.662 µm for the handle and about 5.508 µm for the cup or corresponding Rz values of about 33.05 and about 33.150 µm for the handle and cup, respectively, are considered too excessive, and they result in a less pleasing surface finish. Thus, surface roughening may be accomplished by a variety of techniques including, but not limited to: abrading with abrasive cloths or papers (e.g., scuffing with sandpaper or a Scotch-Brite™ pad), sandblasting with fine sand, sandblasting with coarse sand (10-20 mesh), or tumbling with small metal (e.g., steel) balls, fine sand (20-50 mesh), fine alumina or other metal oxide or metalloid oxide powders.

7.0 CERTAIN EMBODIMENTS

Embodiment 1

A plunger for clearing clogged plumbing, having a handle and a resilient collapsible cup comprising an outer surface and an inner surface, said outer and inner surfaces meeting at a rim, and said handle attaching to said outer surface, wherein said cup is coated with a hydrophobic coating, and wherein at least a portion of said handle is optionally coated with a hydrophobic coating.

Embodiment 2

The plunger of embodiment 1, wherein said hydrophobic coating comprises:
i) a binder; ii) first particles having a size of about 30 µm to about 225 µm; and iii) second particles having a size of about 1 nm to about 25 µm comprising one or more independently selected hydrophobic or oleophobic moieties; wherein said composition optionally contains 5% to 10% of a block copolymer on a weight basis.

Embodiment 3

The plunger of any of embodiments 1 or 2, wherein said hydrophobic coating comprises a base coat comprised of said binder and said first particles applied to said cup and optionally applied to said handle, and a top coat applied to said base coat comprised of said second particles.

Embodiment 4

The plunger of any of embodiments 1 to 3, wherein the outer surface of the cup is generally convex and said inner surface is generally concave.

Embodiment 5

The plunger of any of embodiments 1 to 4, wherein a cross section through the cup in a plane parallel to said rim is generally oval, elliptical, or oblate.

Embodiment 6

The plunger of any of embodiments 1 to 5, wherein a cross section through the cup in a plane parallel to the rim is generally circular.

Embodiment 7

The plunger of embodiment 5, wherein said handle is attached to said outer surface at a point that is approximately equidistant from the rim in each direction.

Embodiment 8

The plunger of any of embodiments 1 to 7, wherein plumbing is selected from a toilet, bathtub, shower, pipe, or sink.

Embodiment 9

The plunger according to embodiment 8, wherein said cup is adapted to conform to said plumbing.

Embodiment 10

The plunger of any of embodiments 1 to 9, wherein said hydrophobic coating is resistant to greater than 200, 250, 300, 350 or 400 abrasions cycles on a Taber Model: 503 instrument using CS-10 wheels with 250 g load.

Embodiment 11

The plunger of any of embodiments 2 to 10, wherein said binder comprises a polyurethane.

Embodiment 12

The plunger of embodiment 11, wherein said polyurethane is a POLANE®.

Embodiment 13

The plunger of any of embodiments 1 to 12, wherein said hydrophobic coating comprises about 5 to about 15% of first particles which are comprised of a material selected from: polymers, metals, glasses, glass bubbles, metalloid oxides, metal oxides, and cellulose.

Embodiment 14

The plunger of any of embodiments 2 to 13, wherein said second particles comprise:
(i) a metal oxide (e.g., aluminum oxide, zinc oxide, nickel oxide, zirconium oxide, iron oxide, or titanium dioxide such as alumina), an oxide of a metalloid (e.g., oxides of B, Si, Sb, Te and Ge such as silica or fumed silica), or one or more metal oxides, oxides of metalloids or a combination thereof (e.g., glass particles); and
(ii) a silane, siloxane or a silazane, which may be covalently bound to said metal oxide, oxide of a metalloid, or a combination thereof.

Embodiment 15

The plunger of embodiment 14, wherein said silane, siloxane or silazane are selected from polydimethylsiloxane (PDMS) and hexamethyldisilazane.

Embodiment 16

The plunger of any of embodiments 1 to 15, wherein said hydrophobic coating is resistant to 40, 50, 60, 70, 80, 90, or 100 abrasion cycles on a Taber Model: 503 instrument using CS-10 wheels with 250 g load.

Embodiment 17

The plunger of any of embodiments 3 to 16, wherein said binder comprises a water-based polyurethane.

Embodiment 18

The plunger of embodiment 17, wherein said water-based polyurethane is a Polane®.

Embodiment 19

The plunger of any of embodiments 3 to 18, wherein said base coat comprises about 5 to about 15% of first particles which are comprised of a material selected from: polymers, metals, glasses, glass bubbles, metalloid oxides, metal oxides, or cellulose.

Embodiment 20

The plunger of any of embodiments 1 to 19, wherein said second particles are silica particles treated with a silanizing agent (e.g., a compound of formula (I)).

Embodiment 21

The plunger of embodiment 20, wherein said silanizing agent is selected from (tridecafluoro-1,1,2,2-tetrahydrooctyl)silane (SIT8173.0); (tridecafluoro-1,1,2,2-tetrahydrooctyl)trichlorosilane (SIT8174.0); (tridecafluoro-1,1,2,2-tetrahydrooctyl)triethoxysilane (SIT8175.0); (tridecafluoro-1,1,2,2-tetrahydrooctyl)trimethoxysilane (SIT8176.0); (heptadecafluoro-1,1,2,2-tetrahydrodecyl)dimethyl(dimethylamino)silane (SIH5840.5); (heptadecafluoro-1,1,2,2-tetrahydrodecyl)tris(dimethylamino)silane (SIH5841.7); n-octadecyltrimethoxysilane (SIO06645.0); n-octyltriethoxysilane (SIO06715.0); and nonafluorohexyldimethyl(dimethylamino)silane (SIN6597.4).

Embodiment 22

The plunger of any of embodiments 1 to 21, wherein the coating on said cup and/or at least a portion of said handle has an arithmetical roughness value from about 0.44 to about 5.51 μm or a ten point mean roughness value from about 0.9 to about 5.7 μm.

Embodiment 23

The plunger of any of embodiments 1 to 22, wherein less than about 0.2, 0.5, 1, 2, 3, or 4 grams of water remain bound to the surface after immersion in water at about 20° C.

Embodiment 24

The plunger according to embodiment 23, wherein less than about 0.2, 0.5, 1, 2, 3, or 4 grams of water remain bound to the surface after immersion in water at about 20° C. after the handle has been used to compress the cup more than about 100, 200, or 300 times.

Embodiment 25

The plunger of any of embodiments 1 to 24, wherein the coating further comprises silver particles.

Embodiment 26

The plunger of any of embodiments 3 to 25, wherein the base coat, top coat or both the base and top coat further comprise silver particles (e.g., silver nanoparticles for antibacterial action).

Embodiment 27

A method of forming a hydrophobic coating on at least a portion of a surface comprising:
i) applying a composition comprising a binder on said surface, wherein said binder optionally comprises one or more first particles; and ii) applying to said binder on said surface second particles having a size of about 1 nm to about 25 µm wherein said second particles comprise one or more independently selected hydrophobic or oleophobic moieties; wherein said applying comprises spray coating of said second particles using a stream of gas; and wherein said second particles comprise less than 2% by weight of a solvent.

Embodiment 28

The method of embodiment 27, wherein said composition comprising a binder further comprises first particles having a size of about 30 µm to about 225 µm.

Embodiment 29

The method of any of embodiments 27 to 28, wherein said gas is air, nitrogen, or $CO_2$.

Embodiment 30

The method of any of embodiments 27 to 29, wherein said second particles contain less than about 5%, 4%, 3%, 2%, or 1% by weight of a volatile solvent as applied to the base coat.

Embodiment 31

The method of any of embodiments 27 to 30, wherein said second particles comprise a metalloid oxide.

Embodiment 32

The method of any of embodiments 27 to 31 wherein said particles are silica particles.

Embodiment 33

The method of any of embodiments 27 to 32, wherein said coating composition comprises second particles in a range selected from: about 0.1% to about 5%; about 0.2% to about 6%; about 4% to about 10%; about 6% to about 12%; about 8% to about 16%; about 1% to about 16%; about 1% to about 20%; about 10% to about 20% or about 15% to about 20% on a weight basis.

Embodiment 34

The method of any of embodiments 27 to 33, wherein said coating has a surface in contact with said substrate and an exposed surface not in contact with said substrate, and said coating has a greater amount of second particles on, at, or adjacent to the exposed surface than on at or adjacent to the surface in contact with the substrate.

Embodiment 35

The method of embodiment 34, wherein said surface in contact with said substrate has no second particles.

Embodiment 36

The method of embodiment 34, wherein the number of second particles on said surface in contact with said substrate is less than about 1%, about 2%, about 5%, about 10%, about 20%, about 30%, about 40%, about 50%, about 60%, about 70%, about 80%, or about 90% of the number of second particles on at or adjacent to said exposed surface.

Embodiment 37

The method of any of embodiments 27 to 36, wherein the binder comprises a polyurethane, lacquer, fluoropolymer, or epoxy.

Embodiment 38

The method of any of embodiments 28 to 37, wherein the binder is hydrophilic or hydrophobic in the absence of said first particles and said second particles.

Embodiment 39

The method of any of embodiments 28 to 38, wherein said first particles comprise a material selected from the group consisting of: wood, cellulose, glass, metal oxides, metalloid oxides (e.g., silica), plastics, carbides, nitrides, borides, spinels, diamond, fly ash, hollow glass spheres, and fibers.

Embodiment 40

The method of any of embodiments 28 to 39, wherein the first particles have an average size in a range selected from: greater than about 5 µm to about 50 µm; about 10 µm to about 100 µm; about 10 µm to about 200 µm; about 20 µm to about 200 µm; about 30 µm to about 100 µm; about 30 µm to about 200 µm; about 50 µm to about 100 µm; about 50 µm to about 200 µm; about 75 µm to about 150 µm; about 75 µm to about 200 µm; about 100 µm to about 225 µm; about 125 µm to about 225 µm; and about 100 µm to about 250 µm.

Embodiment 41

The method of any of embodiments 28 to 40, wherein the first particles have an average size greater than 30 µm and less than 250 µm.

Embodiment 42

The method of any of embodiments 38 to 41, wherein the first particles have a size of 30 µm or greater in at least one dimension.

Embodiment 43

The method of any of embodiments 28 to 42, wherein said first particles do not comprise one or more independently selected hydrophobic and/or oleophobic moieties covalently bound to said first particle, or any hydrophobic or oleophobic moieties associated with said first particles as applied to (e.g., mixed with) said binder.

Embodiment 44

The method of any of embodiments 28 to 42, wherein said first particles comprise one or more independently selected hydrophobic and/or oleophobic moieties covalently bound to said first particles.

Embodiment 45

The method of any of embodiments 28 to 44, wherein said one or more hydrophobic and/or oleophobic moieties comprise one or more independently selected alkyl, fluoroalkyl or perfluoroalkyl moieties.

Embodiment 46

The method of any of embodiments 27 to 45, wherein said first particles and/or second particles comprise one or more covalently bound hydrophobic or oleophobic moieties of the form:

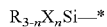

where n is an integer from 0 to 2;
each R is independently selected from
  (i) alkyl or cycloalkyl group optionally substituted with one or more fluorine atoms,
  (ii) $C_{1\ to\ 20}$ alkyl optionally substituted with one or more independently selected substituents selected from fluorine atoms and $C_{6\ to\ 14}$ aryl groups, which aryl groups are optionally substituted with one or more independently selected halo, $C_{1\ to\ 10}$ alkyl, $C_{1\ to\ 10}$ haloalkyl, $C_{1\ to\ 10}$ to alkoxy, or $C_{1\ to\ 10}$ haloalkoxy substituents,
  (iii) $C_{6\ to\ 20}$ alkyl ether optionally substituted with one or more substituents independently selected from fluorine and $C_{6\ to\ 14}$ aryl groups, which aryl groups are optionally substituted with one or more independently selected halo, $C_{1\ to\ 10}$ alkyl, $C_{1\ to\ 10}$ haloalkyl, $C_{1\ to\ 10}$ alkoxy, or $C_{1\ to\ 10}$ haloalkoxy substituents,
  (iv) $C_{6\ to\ 14}$ aryl, optionally substituted with one or more substituents independently selected from halo or alkoxy, and haloalkoxy substituents;
  (v) $C_{4\ to\ 20}$ alkenyl or $C_{4\ to\ 20}$ alkynyl, optionally substituted with one or more substituents independently selected from halo, alkoxy, or haloalkoxy;
  (vi) —Z—$((CF_2)_q(CF_3))_r$, wherein Z is a $C_{1\ to\ 12}$ divalent alkane radical or a $C_{2\ to\ 12}$ divalent alkene or alkyne radical, q is an integer from 1 to 12, and r is an integer from 1 to 4);
each X is independently selected from —H, —Cl, —I, —Br, —OH, —$OR^2$, —$NHR^3$, and —$N(R^3)_2$;
each $R^2$ is independently selected from $C_{1\ to\ 4}$ alkyl and haloalkyl; and
each $R^3$ is independently selected from H, $C_{1\ to\ 4}$ alkyl and haloalkyl; where the open bond indicated by the * indicates a point of attachment to a particle.

Embodiment 47

The method of embodiment 46, wherein R is selected from: (a) an alkyl or fluoroalkyl group having from 6 to 20 carbon atoms; (b) an alkyl or fluoroalkyl group having from 8 to 20 carbon atoms; (c) an alkyl or fluoroalkyl group having from 10 to 20 carbon atoms; (d) an alkyl or fluoroalkyl group having from 6 to 20 carbon atoms when n is 3; (e) an alkyl or fluoroalkyl group having from 8 to 20 carbon atoms when n is 3; and (f) an alkyl or fluoroalkyl group having from 10 to 20 carbon atoms when n is 3.

Embodiment 48

The method of any of embodiments 46 to 47, wherein R is —Z—$((CF_2)_q(CF_3))_r$.

Embodiment 49

The method of any of embodiments 46 to 48, wherein all halogen atoms present in any one or more R groups are fluorine atoms.

Embodiment 50

The method of any of embodiments 27 to 45, wherein said second particles are prepared by treating a particle having a size of about 1 nm to about 25 μm with a silanizing agent selected from: tridecafluoro-1,1,2,2-tetrahydrooctyl)silane (SIT8173.0); (tridecafluoro-1,1,2,2-tetrahydrooctyl)trichlorosilane (SIT8174.0); (tridecafluoro-1,1,2,2-tetrahydrooctyl)triethoxysilane (SIT8175.0); (tridecafluoro-1,1,2,2-tetrahydrooctyl)trimethoxysilane (SIT8176.0); (heptadecafluoro-1,1,2,2-tetrahydrodecyl)dimethyl(dimethylamino)silane (SIH5840.5); (heptadecafluoro-1,1,2,2-tetrahydrodecyl)tris(dimethylamino)silane (SIH5841.7); n-octadecyltrimethoxysilane (SIO06645.0); n-octyltriethoxysilane (SIO06715.0); and nonafluorohexyldimethyl(dimethylamino)silane (SIN6597.4).

Embodiment 51

The method of any of embodiments 27 to 45, wherein said second particles are particles having a size of about 1 nm to about 25 μm (e.g., silica particles) treated with a silanizing agent selected from: dimethyldichlorosilane, hexamethyldisilazane, octyltrimethoxysilane, polydimethylsiloxane, or tridecafluoro-1,1,2,2-tetrahydrooctyl trichlorosilane.

Embodiment 52

The method of any of embodiments 27 to 45, wherein said second particles are silica particles prepared by treating said silica particles with an agent that will increase the number of sites on the silica particles that can react with a silanizing agent prior to being treated with said silanizing agent.

Embodiment 53

The method of embodiment 52, wherein said agent that will increase the number of sites on the silica particles that can react with silanizing agents is selected from the group consisting of: $SiCl_4$, $SiCl_4$, $Si(OMe)_4$, $Si(OEt)_4$, $SiCl_3CH_3$, $SiCl_3CH_2SiCl_3$, $SiCl_3CH_2CH_2SiCl_3$, $Si(OMe)_3CH_2Si(OMe)_3$, $Si(OMe)_3CH_2CH_2Si(OMe)_3$, $Si(OEt)_3CH_2Si(OEt)_3$, or $Si(OEt)_3CH_2CH_2Si(OEt)_3$.

Embodiment 54

The method of any of embodiments 27 to 53, wherein second particles have an average size in a range selected from about 1 nm to about 100 nm; about 10 nm to about 200 nm; about 20 nm to about 400 nm; about 10 nm to 500 nm; about 40 nm to about 800 nm; about 100 nm to about 1 micron; about 200 nm to about 1.5 micron; about 500 nm to about 2 micron; about 500 nm to about 2.5 μm; about 1 micron to about 10 μm; about 2 micron to about 20 μm;

about 2.5 micron to about 25 µm; about 500 nm to about 25 µm; about 400 nm to about 20 µm; and about 100 nm to about 15 µm.

Embodiment 55

The method of any of embodiments 27 to 54, wherein said second particles comprise: a metal oxide, an oxide of a metalloid, a silicate, or a glass.

Embodiment 56

The method of any of embodiments 27 to 55, wherein said second particles are comprised of silica and have an average size in a range selected from about 1 nm to about 50 nm; about 1 nm to about 100 nm; about 1 nm to about 400 nm; about 1 nm to about 500 nm; about 2 nm to about 120 nm; about 5 nm to about 150 nm; about 5 nm to about 400 nm; about 10 nm to about 300 nm; and about 20 nm to about 400 nm.

Embodiment 57

The method of embodiment 56, wherein said second particles have an average size in the range of about 1 nm to about 100 nm or about 2 nm to about 200 nm.

Embodiment 58

The method of any of embodiments 27 to 57, further comprising treating said coating with a silanizing agent such as a compound of formula I.

Embodiment 59

The method of embodiment 58, wherein said silanizing agent is selected from the group consisting of (tridecafluoro-1,1,2,2-tetrahydrooctyl)silane (SIT8173.0); (tridecafluoro-1,1,2,2-tetrahydrooctyl)trichlorosilane (SIT8174.0); (tridecafluoro-1,1,2,2-tetrahydrooctyl)triethoxysilane (SIT8175.0); (tridecafluoro-1,1,2,2-tetrahydrooctyl)trimethoxysilane (SIT8176.0); (heptadecafluoro-1,1,2,2-tetrahydrodecyl)dimethyl(dimethylamino)silane (SIH5840.5); (heptadecafluoro-1,1,2,2-tetrahydrodecyl)tris(dimethylamino)silane (SIH5841.7); n-octadecyltrimethoxysilane (SIO06645.0); n-octyltriethoxysilane (SIO06715.0); and nonafluorohexyldimethyl(dimethylamino)silane (SIN6597.4).

Embodiment 60

An article having a surface coated with a hydrophobic coating prepared by the method of embodiments 27-59.

Embodiment 61

The article of embodiment 60, wherein said article is a plunger.

Embodiment 62

A plunger for clearing clogged plumbing having a hydrophobic coating on at least a portion of its surface, that when removed from sewage waste water is substantially free of any adhering water or drips and free of any solid or semi-solid particle(s) attached to the portion of the plunger coated with a hydrophobic coating (e.g., the plunger has less than about 0.1, 0.2, 0.4, 0.5, 0.7, 1, 2, 3, or 5 grams of material adhering to the surface of the plunger).

Embodiment 63

The article of embodiment 60, or the plunger of embodiments 61 or 62, wherein the coating is resistant to bacterial growth.

Embodiment 64

The method of any of embodiments 27 to 59 or the article of any of embodiments 60 to 63, wherein the coating has an arithmetical roughness value from about 0.4 to about 5.6 µm or a ten point mean roughness value from about 0.8 to about 5.8 µm.

Embodiment 65

The method of any of embodiments 27 to 59 or the article of any of embodiments 60 to 64, wherein the coating is resistant to greater than 20, 30, 40, 50, 60, 70, 80, 90, 100, 200, or 250 abrasion cycles on a Taber Model: 503 instrument using CS-10 wheels with 250 g load (e.g., tested as applied to a metal, such as aluminum, plate).

Embodiment 66

The plunger of embodiment 1, wherein said hydrophobic coating comprises:
i) a binder; and
ii) second particles having a size of about 1 nm to about 25 µm comprising one or more independently selected hydrophobic or oleophobic moieties; wherein said composition optionally contains 5% to 10% of a block copolymer on a weight basis.

Embodiment 67

The plunger of any of embodiments 1 or 66, wherein said hydrophobic coating comprises a base coat comprised of said binder (without added first particles) applied to said cup and optionally applied to said handle, and a top coat applied to said base coat comprised of said second particles.

Embodiments also include one-step and two-step compositions for use in forming hydrophobic and/or oleophobic compositions. Those compositions may be in the form of kits that include the coating component(s) and instructions for their use.

8.0 EXAMPLES

Example 1. High and Low Volatile Organic Compound (VOC) Two-Step Coating Processes Process A: Two-Step High VOC Process This process consists of two steps each applying coatings via wet spray technique. In the first step a first or base coat comprising POLANE® B system from Sherwin-Williams is formulated to a 6:3:1 volume ratio of POLANE® B, POLANE® Reducer and POLANE® A Catalyst as follows:

The first coat is prepared using a polyurethane binder, prepared as follows:

| | |
|---|---|
| POLANE ® B (F63W13) | 6 parts (strobe white, F63W13, Sherwin-Williams, PA) |
| Catalyst (V66V29) | 1 part |
| Reducer (R7K84) | 3 parts |
| POLANE ® accelerator (V66VB11) | 0.1% |

All ingredients are mixed by weight. The accelerator is used to speed the POLANE® curing process.

To the composition comprising the binder used in the first coat (base coat) a variety of different first particles can be added to enhance the durability and/or the bonding of the top coat to the base coat. First particles, sometimes referred to as fillers herein, include, but are not limited to, glass bubbles (e.g., 3M™ glass bubbles, which are hollow glass microspheres of soda-lime-borosilicate glass). Some glass bubbles suitable for use in the present coatings include: S60, K20, and K25 glass bubbles, whose particle sizes are given in Table 1.1.

The first coat is applied to the article, and after about 60 to 120 seconds the second or top coat is applied. The second step comprises spraying a hexane slurry (4% w/v) of hydrophobic second particles (e.g., treated fumed silica).

The base coat composition, without the first particles, contains about 30% solids, and releases about 7 grams of VOCs per 10 grams of wet coating, which is about the amount applied to some plungers described in later examples. Additionally the second step in the process, which utilizes a hexane mixture with fumed silica, releases about 13 grams of VOCs per 25 ml applied to an article the size (surface area to be coated) of a plunger. This process therefore releases a total of about 20 grams of VOCs per article the size of a plunger.

Process B: Two-Step Low VOC Process

This process consists of two steps, the first comprising a wet application of a first or base coat) followed by an application of a second coating composition using materials that are not considered VOCs such as a stream of compressed air. In the first step a first coat (base coat) is prepared comprising a waterborne polyurethane dispersion based on Bayer Material Science product Bayhydrol 124 and Sherwin-Williams POLANE® 700T. That coating composition comprises about 35% solids and contains about 53% water and 12% n-methyl-2-pyrrolidone by weight. A 5% w/w loading of first particles (e.g., glass microspheres) is employed. The weight of glass microspheres used is determined based upon the weight of the coating composition as prepared.

To the composition comprising the binder used in the first coat a variety of different first particles can be added to enhance the durability and/or the bonding of the top coat to the base coat. First particles, sometimes referred to as fillers herein, include, but are not limited to, glass bubbles (e.g., 3M™ glass bubbles, which are hollow glass microspheres of soda-lime-borosilicate glass). Some glass bubbles suitable for use in the present coatings include: S60, K20, and K25 glass bubbles, whose particle sizes are given in Table 1.1.

The first coat is applied to the article, and after about 60 to 120 seconds the second or top coat is applied. The second step comprises applying an alcohol or acetone slurry (4% w/v) of hydrophobic second particles (e.g., treated fumed silica) onto the first coat by spraying or dipping. Alternatively, a hydrophobic fumed silica can be applied to the surface using a stream of compressed gas typically at about 10 to 100 psi in the absence of VOCs.

The coating process would release about 1.2 grams of VOC per article about the size of a plunger in the first step and 7 grams in the second step, bringing the total down to 8.2 g per article the size of a plunger if solvent is used in the second step and 1.2 g if no solvent is used in the second step.

Example 2. A Two-Step Hydrophobic Coating Process as Applied to Plunger for Drains Although the methods described herein can be applied to any suitable surface, this example uses the two step coating process to apply a hydrophobic coating to a plunger for clearing drains.

Surface Preparation

Figure 6:
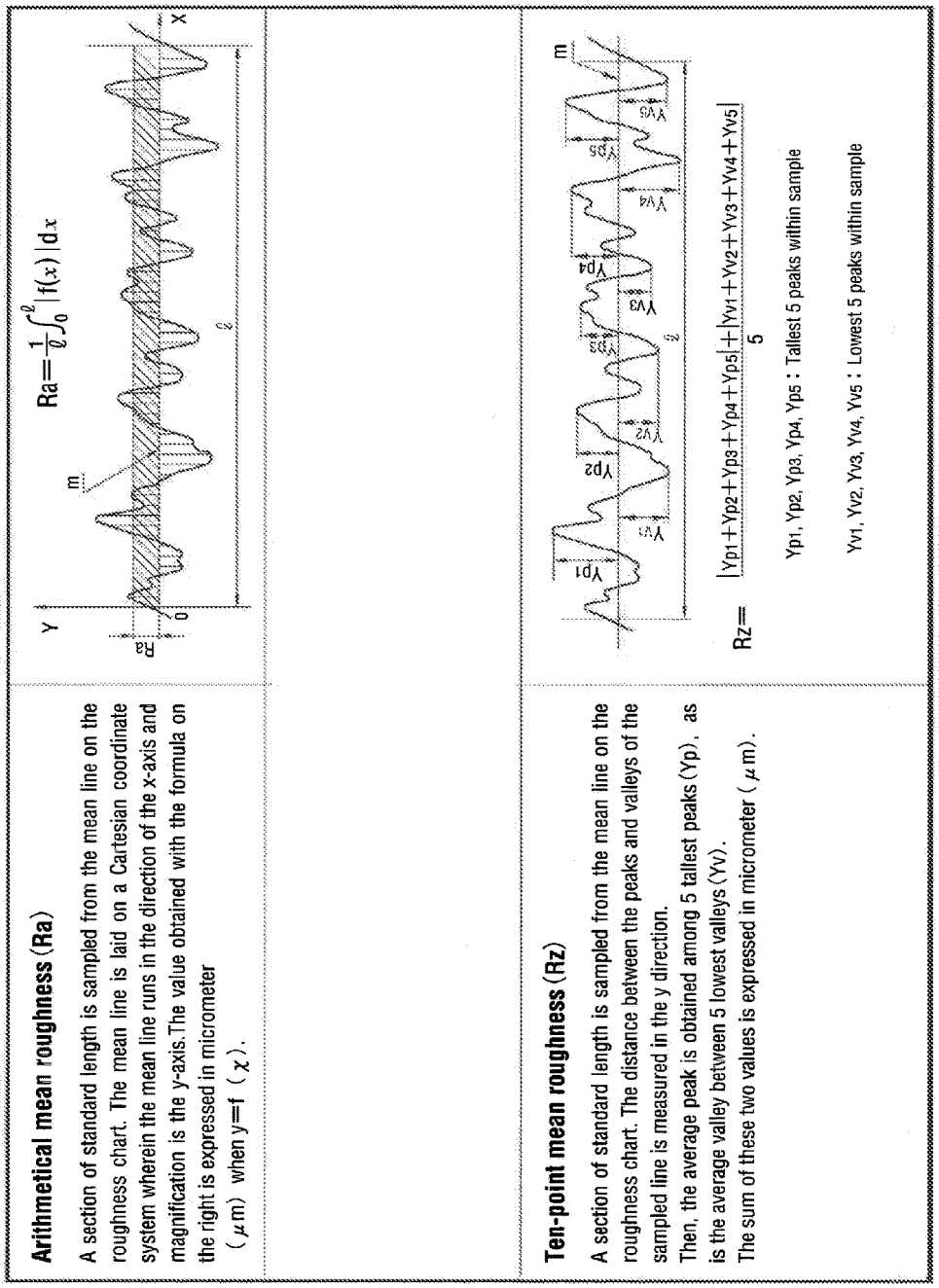
FIG. 6, shows arithmetical mean roughness (Ra) and ten-point mean roughness (Rz).

In order to obtain tight adhesion of the base coat to the surface, such as the cup and handle parts of a plunger, the surface roughness is increased by methods including: (1) scuffing with a Scotch-Brite™ pad, (2) fine sandblasting, (3) tumble blasting with small steel balls, and (4) coarse sandblasting. The roughness can be expressed using a variety of mathematical expressions including, but not limited to, the Arithmetical Mean Roughness (Ra) and Ten-Point Mean Roughness (Rz), which are shown in FIG. 6. Values for Ra and Rz surface roughness produced by different methods compared with the starting surface roughness (measured using a Mahr Pocket Surf® PS1 by Mahr Federal Inc., Providence, R.I.) are given in Table 2.1.

TABLE 2.1

Plunger Roughness Produced by Different Methods

| | Ra (μm) | Rz (μm) | | Ra (μm) | Rz (μm) |
|---|---|---|---|---|---|
| Starting Handle | 0.222 | 1.160 | Starting Cup | 0.315 | 2.490 |
| | 0.205 | 2.140 | | 0.353 | 2.510 |
| | 0.246 | 1.400 | | 0.242 | 1.730 |
| Average | 0.224 | 1.567 | | 0.204 | 1.440 |
| Scotch Brite | 0.804 | 5.77 | Average | 0.279 | 2.043 |
| Scuffed | 0.846 | 6.19 | Scotch Brite | 0.378 | 3.85 |
| Handle | 0.99 | 6.88 | Scuffed Cup | 0.51 | 3.99 |
| Average | 0.88 | 6.28 | | 0.506 | 2.91 |
| Coarse | 5.921 | 34.300 | | 0.37 | 3.41 |
| Sandblast | 5.175 | 32.100 | Average | 0.441 | 3.54 |
| Handle | 5.844 | 31.600 | Fine | 0.757 | 7.32 |
| | 5.708 | 34.200 | Sandblast Cup | 0.578 | 4.61 |
| Average | 5.662 | 33.050 | | 0.686 | 5.51 |
| | | | | 0.716 | 7.34 |
| | | | | 0.638 | 6.3 |
| | | | Average | 0.675 | 6.216 |
| | | | Tumble Blaster | 0.429 | 4.81 |
| | | | Cup (Small | 0.407 | 2.88 |
| | | | Steel Balls) | 0.459 | 4.32 |
| | | | | 0.434 | 4.92 |
| | | | Average | 0.387 | 3.28 |
| | | | Coarse | 4.118 | 25.000 |
| | | | Sandblast Cup | 5.243 | 35.300 |
| | | | | 6.619 | 39.900 |
| | | | | 6.052 | 32.400 |
| | | | Average | 5.508 | 33.150 |

Coating Process

The conversion of plunger parts (cup and handle) into hydrophobic surfaces is accomplished by application of a surface coating using a two-step process. In the two-step process the first coat (base coat) generally serves as a base or binder coat to the substrate (cup and handle of the plunger in this case) and the second coat (top coat) comprises hydrophobic second particles (hydrophobic fumed silica).

The first coat (base coat) is prepared using a polyurethane binder, prepared as follows from the following ingredients by weight:

| | |
|---|---|
| POLANE ® B (F63W13) | 6 parts (strobe white, F63W13, Sherwin-Williams, PA) |
| Catalyst (V66V29) | 1 part |
| Reducer (R7K84) | 3 parts |
| POLANE ® accelerator (V66VB11) | 0.1% |

All ingredients are mixed. The accelerator is used to speed the POLANE® curing process.

A variety of different first particles can be added to enhance the durability of bonding of the top coat to the base coat. First particles, sometimes referred to as fillers herein, include, but are not limited to, glass bubbles (e.g., 3M™ glass bubbles, which are hollow glass microspheres of soda-lime-borosilicate glass). Some glass bubbles suitable for use in the present coatings include: S60, K20, and K25 glass bubbles, whose particle sizes are given in Table 2.2.

TABLE 2.2

Particle Size Distribution of 3M ™ Glass Bubbles

Particle Size (Microns, by Volume) 3M QCM 193.0

| | Distribution | | | |
|---|---|---|---|---|
| Product | $10^{th}$% | $50^{th}$% | $90^{th}$% | Effective Top |
| S60 | 15 | 30 | 55 | 65 |
| K25 | 25 | 55 | 90 | 105 |
| K20 | 20 | 60 | 90 | 105 |

The top coat comprises nano-sized (5-50 nm) fumed silica particles, which are pretreated with chemical moieties that impart hydrophobicity (e.g., a silazane or a siloxane). In one top coat of this example TS-720 (Cabot Corporation, Billerica, Mass.) is employed. In another top coat of this example R812S (Evonik Degussa Corp., Parsippany, N.J.) is employed.

TABLE 2.3

Properties of TS-720 and R812S Silicas

| Silica Grade | Source | Surface Treatment | Nominal BET Surface Area ($m^2/g$) |
|---|---|---|---|
| TS-720 | Cabot | Polydimethylsiloxane | 200 |
| R812S | Evonik | Hexamethyldisilazane | 220 |

Both TS-720 and R812S are fumed silica of approximately the same surface area. However, they are treated with two different compounds whose molecular formulas are shown below.

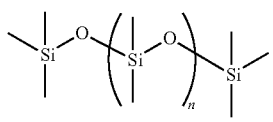

Polydimethylsiloxane

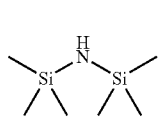

Hexamethyldisilazane

In this example the top coat is applied by one of two methods:

Method 1:

In this method, fumed silica particles are dispersed in a solvent (e.g., hexane) and sprayed. Typical dispersions obtained with TS-720 are prepared with 4 g of TS-720 in 100 ml of hexane. For R812S, the dispersion employed uses 8 g of R812S in 100 ml of hexane. The fumed silica dispersion is sprayed onto the base coat using a Binks Model 2001 or 2001V air spray gun.

Method 2:

The fumed silica is delivered to the surface of the base coat without hexane. The fumed silica is sprayed on at a high air pressure (20-100 psi) onto the base coat. The pressure of spray is critical to get a good bond with the base coat using a Binks Model 2001 or 2001V air spray gun.

In method 2 excess fumed silica is recovered by a dust collection system from the spray booth and can be reused.

Sample 1: Plunger Prepared with Two-Step Coating Using a Base Coat (Containing No First Particles)

A plunger cup and a part of the handle adjacent to the cup (part most likely to contact water/sewage) are coated with the above-described strobe white POLANE® containing base coat. A total of 10 g of the POLANE® containing base coat is applied by spraying the inside and outside of the cup and part of the handle. The base-coated cup and handle are subsequently coated with a second (top) coat of ml of composition comprising 4 g of TS-720 fumed silica suspended in 100 ml of hexane within 30 min after spraying the base coat to maximize the bonding of the fumed silica top coat to the base coat.

The coated plunger is cured at room temperature for 24 hours. After curing, the plunger is tested by inserting it in the toilet water. After 50 plunges, some water droplets remain on the edge of the top plunger and on the bottom side of the rim.

Sample 2: Two-Step Coating Employing Glass Bubble Second Particles (10%-15% S60 Particles)

A plunger is coated using the process described for Sample 1, except that the base coating of POLANE® contains 10%-15% (by weight) of S60 glass bubbles (see Table 1 for details). Quantities of the base and top coats are kept nearly the same. After curing, the plunger is tested in a toilet by repeated plunges. After about 100 plunges, some water droplets were seen on the bottom rim (7) and lip (8) of the cup. No droplets were seen on the edge of the top of the plunger as was the case in Example 1. The incorporation of S60 particles in the base coat approximately doubles the number of plunges with minimum droplet adherence at limited locations.

Sample 3: Base Coat with 5% K25 Glass Bubbles as Filler

A plunger is coated using the process described for Sample 1, except that the base coating of POLANE® contains 5% of K25 glass bubbles (see Table 1 for details) as first particles. After applying the top coat and curing at room temperature for 24 hours, the plunger is tested in a toilet. After about 100 plunges only one or two droplets are seen on the inside of the cup near the rim and lip.

Sample 4: Base Coat with 10-15% K25 Glass Bubbles

A plunger is coated using the process described for Sample 1, except that the base coating of POLANE® contains 10-15% K25. After curing at room temperature for 24 hours the plunger is tested by plunging 100 times in a toilet. This plunger, which has a slightly rougher surface than the plunger in Sample 3, shows no sticking of any water droplets in any location (outside or inside the cup).

Sample 5: Base Coat with 5% K20 Glass Bubbles and Top Coat Using R812S-Treated Silica A plunger is coated using the process described for Sample 1, except that the base coating of POLANE® contains K20 glass bubbles (5%) to limit the coating roughness. After applying the base coat by spraying, the top coat, which is prepared by suspending 8 g of R812S-treated fumed silica (Evonik Industries) in 50 ml of hexane is applied. Although the same quantity of top coat is used as in Sample 1, it contains only half the amount of hexane. After curing at room temperature for 24 hours, the plunger is tested by plunging a toilet 250 times, after which no water droplets are noted on any of the surfaces. In addition, even following 250 plunges no indication of any cracking or flaking of the coating is noted.

Sample 6: Base Coat with 5% K20 Glass Bubbles as Filler and Pressure Applied Dry Top Coat of TS-720

A plunger is coated with a base coating of POLANE® containing 5% K20 glass bubbles, as in Sample 5. A top coat of TS-720 fumed silica is applied within 10 minutes by high pressure (50 psi) spraying using a Binks Model 2001 or 2001 Vair spray gun in an enclosed box with dust collection system. After curing at room temperature for 24 hours, the plunger is tested by plunging in a toilet 300 times, without the adherence of any water droplets.

Sample 7: Base Coat with 5% K20 Glass Bubble Filler and Pressure Applied Dry Top Coat of R812S A plunger is coated with a base coating of POLANE® containing 5% K20 glass bubbles, as in Sample 6. However, the top coat of TS-720 applied by pressure spraying is replaced by a coating of R812S fumed silica applied using the same air pressure (50 psi). After curing at room temperature for 24 hours, the plunger is tested in a toilet by plunging 250 times without the adherence of any water droplets.

Example 3. Plunger Base and Coating and Top Coating Procedure

A base coat is prepared using POLANE® System and glass bubbles:

POLANE® B=6 parts (Sherwin-Williams (521-1404), Strobe White, F63W13)

POLANE® A Exterior Catalyst=1 part (Sherwin-Williams (500-1417), V66V29)

POLANE® Reducer=3 parts (Sherwin-Williams (530-2641), R7K69)

K20 Glass Bubbles=5.0% by weight to POLANE® mix (3M™, 70-0704-8403-8)

To a plastic mixing container whose empty weight is determined is added POLANE® B (6 parts), POLANE® A (1 part) and POLANE® Reducer (3 parts) by volume. Hazardous Air Pollutants (HAPS) free POLANE® Reducer (R7K95) can be used in place of POLANE® Reducer (R7K96). The mixture is stirred for 3 minutes using a mechanical mixer/drill with mixing blade. The container and its contents are weighed and the weight of the POLANE® components determined by deducting the empty weight of the container. K20 glass bubbles are added (5% by weight) and the mixture is stirred for 5 minutes to ensure complete mixing of K20 glass bubbles into the liquid components to form a K20/POLANE® base coat composition. The approximate pot-life of the base coat composition is 4-6 hours.

Plungers are prepared for the application of the base coat by scuffing of the handle and plunger head using an abrasive pad (e.g. Scotch-Brite™ pads), fine sandblast, and/or tumble blasting with aluminum oxide or steel ball bearings. The plunger is cleaned of debris from the scuffing process, for example using high pressure air or water, followed by drying.

The K20/POLANE® base coat composition is poured into a gravity fed spray gun (Central Pneumatic, 20 oz. (50-70 psi), Item #47016) and sprayed onto the plunger head and at least the portion of the handle closest to the plunger head (e.g., about 6 inches of the handle) (approximately 15-20 mL of K20/POLANE® mixture per plunger is sprayed in the process. Including overspray, the coating amounts to about 3.0 g of dried coating mixture. The thickness will depend upon the amount of material sprayed and the amount of overspray. Care must be taken to ensure complete coverage of all portions of the plunger cup, such as the inside of the cup and underneath parts of the rim/lip.

Top coats, such as those comprising silica and a hydrophobic moiety (e.g., a bound silane group), can be applied to the base coat after a period of about 60 to 120 seconds. The application of the top coat may be conducted by spraying the base coat with top coat composition comprising second particles using a stream of gas (e.g. air) in the presence or absence of a compatible solvent. Alternatively, the top coat may be applied by dipping a plunger into a coating composition comprising secondary particles.

Example 4. Abrasion Testing of Coatings

To assess the abrasion resistance of the hydrophobic coatings, and particularly the abrasion resistance of coatings that can be applied to flexible materials such as the cup of a plunger, a first coat binder composition as described in Example 2 including the indicated filler is applied to 4 inch by 4 inch aluminum plates. One of four different fillers (S60, K20, 512 Black or K25 Black) is added to the coating composition applied to each plate. Following the application of the first coat, second coats are applied to the plates using compressed air at the indicated pressures to apply TS-720 silica or R812S silica (see the columns marked "Dry Power Spraying") in the accompanying table. Control aluminum plates, where the second coat is applied by spraying them with a slurry comprising TS-720 or R812S hydrophobic fumed silica (4 g/100 ml w/v) in hexane, are also prepared.

After air drying at room temperature for 24 hours the plates are subjected to abrasion testing. Although resistance to abrasion may be measured using any method known in the art, for the purpose of this application abrasion testing is conducted using a Taber Model: 503 instrument equipped with CS-10 wheels with loads as indicated.

| Dry Powder Spraying (TS-720) | | Dry Powder Spraying (R812S) | | Filler | Taber Cycles (250 g load) |
|---|---|---|---|---|---|
| Spray Pressure | Taber Cycles (250 g load) | Spray Pressure | Taber Cycles (250 g load) | | |
| S60 Glass (10-15%) | | | | Hexane Spraying (TS-720) | |
| 10 psi | 20 cycles | 10 psi | 20 cycles | S60 Glass (10-15%) | 200 |
| 20 psi | 40 cycles | 20 psi | 40 cycles | K20 Glass (5%) | 350 |
| 30 psi | 80 cycles | 30 psi | 70 cycles | K25 Glass (5%) | 450 |
| 40 psi | 100 cycles | 40 psi | 105 cycles | 512 White or Black (10-15%) | 400 |
| Filler K20 Glass (5%) | | | | | |
| 10 psi | 20 cycles | 10 psi | 20 cycles | Hexane Spraying POLANE ® White/R812S | |
| 20 psi | 30 cycles | 20 psi | 40 cycles | | |
| 30 psi | 50 cycles | 30 psi | 65 cycles | S60 Glass (10-15%) | 180-220 |
| 40 psi | 85 cycles | 40 psi | 90 cycles | K20 Glass (5%) | 400 |
| K25 Black (10-15%) | | | | K25 Glass(5%) | 400 |
| 10 psi | 20 cycles | 10 psi | 15 cycles | 512 White or Black (10-15%) | 375-425 |
| 20 psi | 30 cycles | 20 psi | 30 cycles | | |
| 30 psi | 60 cycles | 30 psi | 55 cycles | | |
| 40 psi | 80 cycles | 40 psi | 80 cycles | | |
| 512 Black (10-15%) | | | | | |
| 10 psi | 125 cycles | 10 psi | 125 cycles | | |
| 20 psi | 150 cycles | 20 psi | 150 cycles | | |
| 30 psi | 200 cycles | 30 psi | 200 cycles | | |
| 40 psi | 200 cycles | 40 psi | 200 cycles | | |

Example 5. One-Step Coating Process Employing Water-Based Polyurethanes

A 40-g quantity of 40:60 ratio by volume of POLANE® 700T (Sherwin-Williams Co., Cleveland, Ohio) and Bayhydrol 124 (Bayer Material Science, Pittsburgh, Pa.) is prepared as a binder composition. Both 700T and Bayhydrol 124 are water-based polyurethanes. POLANE® 700T comes with pigment preloaded, whereas Bayhydrol 124 is provided from the manufacturer as an un-pigmented coating composition to which pigment can be added at will. A 40:60 blend of POLANE® 700T to Bayhydrol 124 achieves a desirable pigment content. Optional components such as silver nanoparticles (10-30 ppm) may be added to the coating composition to provide antimicrobial action.

To the 40-g mixture of POLANE® and Bayhydrol described above, 2 g of S60, glass spheres (first particles), 4.5 g of TS-720 (second particles of fumed silica treated with polydimethyl-siloxane), and 15 g of water are added. The components are mixed extensively to achieve a good dispersion of TS-720 in the polyurethane binder composition and to form a one-step coating composition. The one-step-coating composition can be applied to surfaces by any suitable means including, but not limited to, spraying for several hours provided it is periodically mixed.

There are several advantages to the use of one-step processes, including one-step processes that employ water based binder systems to prepare hydrophobic and/or oleophobic coatings. One advantage is a minimization of the time that is needed to coat objects. Another advantage of the process described in this example is that it releases very low amounts of VOCs because essentially no solvents are used. Any VOCs released are associated with the water-based binder components (POLANE® 700T and/or Bayhydrol 124).

To prepare hydrophobic and/or oleophobic coated objects (e.g., plungers), the composition comprising binder, first, and second particles is sprayed on to the desired portions of the object after surface preparation (e.g., the plunger cup and part of the handle after roughening and cleaning) such as by using an air spray gun. The coating is left to dry for a suitable period depending on local conditions such as temperature and humidity (generally about 3 to 4 hours for water based polyurethane compositions).

Two plungers treated by coating the plunger cup and a portion of the handle with the one-step POLANE® 700T-Bayhydrol composition described in this example are dried for 3-4 hours and tested. The coated plungers are tested by repeated plunging of a toilet. Each of the two plungers shows no water droplet sticking to any coated part of the plunger even after 500 plunges. The process yields hydrophobic and/or oleophobic coatings that are comparable in their ability to shed water to coatings that have been prepared by two step processes (e.g., the amount of water retained by the coating does not significantly increase even after repeated use such as in plunging tests).

Example 6. Two-Step Coating Process Employing Water-Based Polyurethanes

A mixture comprising a 40:60 ratio of POLANE® 700T and Bayhydrol 124 by volume is prepared. To that mixture water (7% by weight), K20 glass beads (5% by weight) and untreated M5 fumed silica (2.5% by weight) are added to form a base coating composition (i.e., to 100 g of the POLANE®/Bayhdrol mixture, 7 g of water, 5 g of glass beads, and 2.5 g of silica are added). The mixture is stirred and applied to prepared surfaces to form a base coat. After its application, the base coat is allowed to dry for a suitable period of time and a second coating (a 4% w/v mixture of TS-720 in acetone) is applied, for example by dipping. After application of the second coating composition, the two-step coating can be given a subsequent treatment, for example with the second coating, if desired or needed to produce a suitably hydrophobic and/or oleophobic surface. Optional components such as silver nanoparticles (10-30 ppm) may be added to the coating composition to provide antimicrobial action.

Four plungers are prepared for treatment using the two step process described above. Three of the plungers are prepared for coating by sandblasting and a fourth plunger is prepared by tumble blasting. Residue from the blasting step is removed by washing, and the plungers are dried prior to any subsequent treatment. Each of the four plungers is sprayed with the above-described base coating composition. After the base coat, the three sandblasted plungers are left to dry for 45, 60, and 75 minutes, respectively; the tumble blast plunger is dried for about 70 minutes. After the specified drying time, the plunger is dipped into a second coating composition of 4% w/v mixture of TS-720 silica in acetone. After dipping, each plunger is allowed to dry and then given 3 to 5 minutes in acetone, after which it is sprayed with the same second coating composition in critical areas such as at the base of the cup and areas around the cup and both inside and outside the cup. The plungers are left to cure for two days prior to testing. The following test results are noted for each of the plungers:

Plunger #1 (Sandblast, 45 minutes drying time before dipping in second coating): With the treatment used to apply the coating to this plunger, some tiny water droplets attach to the inside of the cup at points where cracking was observed after subjecting the plunger to testing. The cracking is apparently caused by the excess application of TS-720 during the dip application step. The first tiny droplets are observed to adhere to the plunger after about 50 plunges. Besides the adherence of droplets to that local area no other droplets are observed adhering to any other part of the plunger for 400 plunges.

Plunger #2 (Sandblast, 60 minutes drying time before dipping in second coating): The base coat applied to this plunger is drier than the base coat applied to plunger #1 at the time the second coating is applied by dipping. The cup still acquires excess TS-720 in small areas during the dipping process. With this plunger, the tiny droplets stick to the inside of the cup, but only after 100 plunges. Aside from this local effect, the plunger shows no additional droplets adhering to its surface for 400 plunges, at which point the testing is stopped.

Plunger #3 (Sandblast, 75 minutes drying time before dipping in second coating): The drying time for this plunger permits a more uniform coating with the second coating composition in the dipping process. As dipping the base coated plunger into the TS-720/acetone mixture does not cause any excess build-up in any areas of the plunger no cracking or water droplet adherence is observed. No water droplets are observed adhering to the inside of the cup, or elsewhere, even after 400 plunges, as compared to plungers #1 and #2.

Plunger #4 (Tumble blast, 70 minutes drying time before dip): This plunger performs in a manner similar to plunger #3, and does not show any excess pick-up of TS-720 during the dip process. The plunger can be subjected to 400 plunges without any droplets sticking to the cup.

As with the one-stop process using water-based polyurethanes described in Example 5, this two-step process advantageously limits the amount of VOCs released in the coating process (acetone is VOC exempt). For coatings applied after a drying time of about 60 to 70 minutes (for plungers), the plungers performed about as well as those prepared using the one step process regardless of the pretreatment of the surface (e.g., sandblasting or tumble blasting).

The invention claimed is:

1. A method of forming a hydrophobic coating on at least a portion of a surface comprising the steps:

i) applying a composition comprising water, a polymeric binder that can be diluted with water, and first particles on said at least a portion of a surface, wherein said first particles have a size of about 30 μm to about 225 μm; and ii) applying second particles having a size of about 1 nm to about 25 μm to said polymeric binder on said at least a portion of said surface; wherein said applying second particles to said polymeric binder comprises applying either a liquid composition comprising said second particles or a spray coating of said second particles, using a stream of gas wherein the second particles comprise less than 2% by weight of a solvent; and wherein the second particles, or the first particles and second particles, comprise one or more independently selected hydrophobic, or hydrophobic and oleophobic, moieties covalently bound to said first or second particles through a silicon atom independently selected from:

(a) $C_{6\ to\ 20}$ alkyl or cycloalkyl, either or both of which are optionally substituted with one or more fluorine atoms, or (b) $-Z-((CF_2)_q(CF_3))_r$, wherein Z is a $C_{1\ to\ 12}$ alkyl group, and where q is an integer from 1 to 12, and r is an integer from 1-4.

2. A method of forming a hydrophobic coating on at least a portion of a surface comprising applying a composition comprising water, a polymeric binder that can be diluted with water, first particles having a size of about 30 μm to about 225 μm, and hydrophobic second particles having a size of about 1 nm to about 25 μm on said at least a portion of a surface, wherein said second particles, or said first particles and second particles, comprise one or more independently selected hydrophobic, or hydrophobic and oleophobic, moieties covalently bound to said first or second particles through a silicon atom independently selected from:

(a) $C_{6\ to\ 20}$ alkyl or cycloalkyl, either or both of which are optionally substituted with one or more fluorine atoms, or (b) $-Z-((CF_2)_q(CF_3))_r$, wherein Z is a $C_{1\ to\ 12}$ alkyl group, and where q is an integer from 1 to 12, and r is an integer from 1-4.

3. A system for preparing a hydrophobic coating comprising as two separate components:

i) a first component comprising water, a polymeric binder that can be diluted with water, and first particles, wherein said first particles have a size from about 30 μm to about 225 μm; and ii) a second component comprising hydrophobic second particles having a size of about 1 nm to about 25 μm;

wherein said second particles, or said first particles and second particles, comprise one or more independently selected hydrophobic, or hydrophobic and oleophobic, moieties covalently bound to said first or second particles through a silicon atom independently selected from:

(a) $C_{6\ to\ 20}$ alkyl or cycloalkyl, either or both of which are optionally substituted with one or more fluorine atoms, or (b) $-Z-((CF_2)_q(CF_3))_r$, wherein Z is a $C_{1\ to\ 12}$ alkyl group, and where q is an integer from 1 to 12, and r is an integer from 1-4.

4. An article having a surface coated with the hydrophobic coating system of claim 3, wherein said coating has a hydrophobic exposed surface formed by i) applying the first component comprising the binder on least a portion of the surface; and ii) applying to the binder on at least a portion of the surface the second component comprising second particles; wherein the resulting coating has a greater amount of second particles on, at, or adjacent to the exposed surface than on, at, or adjacent to the surface of the article.

5. The system of claim 3, wherein the binder comprises a polyurethane, lacquer, fluoropolymer, or epoxy coating composition.

6. The system of claim 5, wherein the binder comprises a polyurethane or epoxy coating composition.

7. The system of claim 3, wherein said second particles, but not said first particles, comprise one or more independently selected hydrophobic, or hydrophobic and oleophobic, moieties covalently bound.

8. The system of claim 3, wherein said second particles have an average size in a range selected from about 1 nm to about 100 nm, about 100 nm to about 1 micron, about 1.0 micron to about 10 μm, and about 2.5 micron to about 25 μm.

9. The system of claim 3, wherein said second particles comprise: a metal oxide, an oxide of a metalloid, a silicate, or a glass.

10. A hydrophobic coating prepared by (i) applying the first component of the system of claim 3 to at least a portion of a surface, and (ii) applying the second component of the system of claim 3 to at least a portion of the surface coated by the first component,
wherein the coating is resistant to 40 abrasion cycles on a Taber Model 503 instrument using CS-10 wheels with 250 g load without loss of hydrophobicity.

11. A coating composition comprising: water, a polymeric binder that can be diluted with water, first particles having a size from about 30 μm to about 225 μm, and hydrophobic second particles having a size of about 1 nm to about 25 μm,
wherein said second particles, or said first particles and second particles, comprise one or more independently selected hydrophobic, or hydrophobic and oleophobic, moieties covalently bound to said first or second particles through a silicon atom, wherein said hydrophobic and/or oleophobic moieties are independently selected from:
(a) $C_{6\ to\ 20}$ alkyl or cycloalkyl, either or both of which are optionally substituted with one or more fluorine atoms, or
(b) —Z—$((CF_2)_q(CF_3))_r$, wherein Z is a $C_{1\ to\ 12}$ alkyl group, and where q is an integer from 1 to 12, and r is an integer from 1-4.

12. The composition of claim 11, wherein the binder comprises a polyurethane, lacquer, fluoropolymer, or epoxy coating composition.

13. The composition of claim 12, wherein the binder comprises a polyurethane or epoxy coating composition.

14. The composition of claim 11, wherein said second particles, but not said first particles, comprise one or more independently selected hydrophobic, or hydrophobic and oleophobic, moieties covalently bound.

15. The composition of claim 14, wherein said second particles are prepared by treating a particle having a size of about 1 nm to 25 μm with a silanizing agent selected from: tridecafluoro-1,1,2,2-tetrahydrooctyl)silane; (tridecafluoro-1,1,2,2-tetrahydrooctyl) trichlorosilane; (tridecafluoro-1,1,2,2-tetrahydrooctyl)trimethoxysilane; (heptadecafluoro-1,1,2,2-tetrahydrodecyl)dimethyl(dimethylamino)silane; (heptadecafluoro-1,1,2,2-tetrahydrodecyl)tris(dimethylamino)silane; n-octadecyltrimethoxysilane; n-octyltriethoxysilane; and nonafluorohexyldimethyl(dimethylamino)silane.

16. The composition of claim 11, wherein said second particles have an average size in a range selected from about 1 nm to about 100 nm; about 100 nm to about 1 micron; about 1.0 micron to about 10 μm; and about 2.5 micron to about 25 μm.

17. The composition of claim 11, wherein said second particles comprise: a metal oxide, an oxide of a metalloid, a silicate, or a glass.

18. A hydrophobic coating prepared by applying a composition according to claim 11 to at least a portion of a surface,
wherein said coating is resistant to 40 abrasion cycles on a Taber Model 503 instrument using CS-10 wheels with 250 g load without loss of hydrophobicity.

19. A system for preparing a hydrophobic coating comprising as two separate components:
i) a first component comprising water, a polymeric binder that can be diluted with water, and first particles, wherein said first particles have a size from about 30 μm to about 225 μm; and
ii) a second component comprising hydrophobic second particles having a size of about 1 nm to about 25 μm;
wherein said second particles comprise one or more independently selected fluoroalkyl or perfluoroalkyl moieties covalently bound to the second particles through a silicon atom.

20. The system of claim 19, wherein said second particles are prepared by treating a particle having a size of about 1 nm to 25 μm with a silanizing agent selected from: tridecafluoro-1,1,2,2-tetrahydrooctyl)silane; (tridecafluoro-1,1,2,2-tetrahydrooctyl) trichlorosilane; (tridecafluoro-1,1,2,2-tetrahydrooctyl)triethoxysilane; (tridecafluoro-1,1,2,2-tetrahydrooctyl)trimethoxysilane; (heptadecafluoro-1,1,2,2-tetrahydrodecyl)dimethyl(dimethylamino)silane; (heptadecafluoro-1,1,2,2-tetrahydrodecyl)tris(dimethylamino)silane; n-octadecyltrimethoxysilane; n-octyltriethoxysilane; and nonafluorohexyldimethyl(dimethylamino)silane.

21. The system of claim 19, wherein said fluoroalkyl or perfluoroalkyl moieties comprise from six to twenty carbon atoms.

22. A system for preparing a hydrophobic coating comprising as two separate components:
i) a first component comprising water, a polymeric binder that can be diluted with water, and first particles, wherein said first particles have a size from about 30 μm to about 225 μm, and wherein said first particles do not comprise a hydrophobic moiety; and
ii) a second component comprising hydrophobic second particles having a size of about 1 nm to about 25 μm;
wherein said second particles comprise one or more independently selected hydrophobic, or hydrophobic and oleophobic, moieties.

23. A coating composition comprising: water, a polymeric binder that can be diluted with water, first particles having a size from about 30 μm to about 225 μm, and hydrophobic second particles having a size of about 1 nm to about 25 μm, wherein said second particles, or said first particles and second particles, comprise one or more independently selected hydrophobic and/or oleophobic moieties covalently bound to said first or second particles through a silicon atom, wherein said hydrophobic and/or oleophobic moieties are independently selected from:

(a) $C_{1\ to\ 20}$ alkyl or cycloalkyl, either or both of which are optionally substituted with one or more fluorine atoms, or (b) —Z—$((CF_2)_q(CF_3))_r$, wherein Z is a $C_{1\ to\ 12}$ alkyl group, and where q is an integer from 1 to 12, and r is an integer from 1-4; and wherein said first particles are hollow microspheres.

24. The composition of claim 23, wherein said first particles are hollow microspheres that have an average diameter greater than about 30 μm and less than about 200 μm.

25. The composition of claim 23, wherein said second particles are prepared by treating a particle having a size of about 1 nm to about 25 μm with a silanizing agent selected from: dimethyldichlorosilane, octyltrimethoxysilane, or tridecafluoro-1,1,2,2-tetrahydrooctyl trichlorosilane.

26. A coating composition comprising: water, a polymeric binder that can be diluted with water, first particles having a size from about 30 μm to about 225 μm, and hydrophobic second particles having a size of about 1 nm to about 25 μm, wherein said second particles, or said first particles and second particles, comprise one or more independently selected hydrophobic and/or oleophobic moieties covalently bound to said first or second particles through a silicon atom, wherein said hydrophobic and/or oleophobic moieties are independently selected from:

(a) $C_{1\ to\ 20}$ alkyl or cycloalkyl, either or both of which are optionally substituted with one or more fluorine atoms, or (b) —Z—$((CF_2)_q(CF_3))_r$, wherein Z is a $C_{1\ to\ 12}$ alkyl group, and where q is an integer from 1 to 12, and r is an integer from 1-4; and wherein said one or more hydrophobic, or hydrophobic and oleophobic, moieties comprise one or more independently selected fluoroalkyl or perfluoroalkyl moieties.

27. A coating composition for preparing a hydrophobic coating comprising: water, a polymeric binder that can be diluted with water, first particles having a size from about 30 μm to about 225 μm, and hydrophobic second particles having a size of about 1 nm to about 25 μm, wherein said first particles do not comprise a hydrophobic moiety wherein, upon curing the coating formed from the coating composition is hydrophobic with a contact angle greater than 90° with water at 23° C., and wherein the second particles comprise one or more independently selected hydrophobic moieties covalently bound to said first or second particles through a silicon atom independently selected from:

(a) $C_{6\ to\ 20}$ alkyl or cycloalkyl, either or both of which are optionally substituted with one or more fluorine atoms, or (b) —Z—$((CF_2)_q(CF_3))_r$, wherein Z is a $C_{1\ to\ 12}$ alkyl group, and where q is an integer from 1 to 12, and r is an integer from 1-4.

28. The composition of claim 27, wherein upon curing the coating formed from the coating composition is resistant to 60 abrasion cycles on a Taber Model: 503 instrument using CS-10 wheels with 250 g load without loss of hydrophobicity.

\* \* \* \* \*